US010092129B2

(12) United States Patent
Jenkins et al.

(10) Patent No.: US 10,092,129 B2
(45) Date of Patent: Oct. 9, 2018

(54) AUTOMATED COOKING CONTROL VIA ENHANCED COOKING EQUIPMENT

(71) Applicant: Meyer Intellectual Properties Limited, Kowloon (CN)

(72) Inventors: Jonathan A. Jenkins, Seattle, WA (US); Darren Erik Vengroff, Seattle, WA (US); Matthew Goyer, Seattle, WA (US)

(73) Assignee: Meyer Intellectual Properties Limited (VG)

( * ) Notice: Subject to any disclaimer, the term of this patent is extended or adjusted under 35 U.S.C. 154(b) by 152 days.

(21) Appl. No.: 14/830,581

(22) Filed: Aug. 19, 2015

(65) Prior Publication Data

US 2016/0051078 A1    Feb. 25, 2016

Related U.S. Application Data

(60) Provisional application No. 62/039,262, filed on Aug. 19, 2014, provisional application No. 62/143,655, filed on Apr. 6, 2015.

(51) Int. Cl.
*A47J 27/62* (2006.01)
*F24C 3/12* (2006.01)
(Continued)

(52) U.S. Cl.
CPC ............... *A47J 27/62* (2013.01); *A47J 36/32* (2013.01); *F24C 3/12* (2013.01); *F24C 3/126* (2013.01);
(Continued)

(58) Field of Classification Search
CPC .... A47J 27/62; F24C 3/12; F24C 7/08; H05B 3/014; H05B 6/065; H05B 6/1209; H05B 3/02
(Continued)

(56) References Cited

U.S. PATENT DOCUMENTS 3,742,178 A    6/1973  Harnden, Jr.
4,381,438 A    4/1983  Goessler et al.
(Continued)

FOREIGN PATENT DOCUMENTS

CN           101273834 A      10/2008
DE    20 2014 004 271 U1       8/2014
(Continued)

OTHER PUBLICATIONS

International Search Report issued in connection with PCT/US2015/045944.

(Continued)

*Primary Examiner* — Thien S Tran
(74) *Attorney, Agent, or Firm* — Akerman LLP

(57) ABSTRACT

Techniques are described for automated control of portions of a cooking process, such as to control activation and heating for a cooking location having a piece of cooking equipment. Such automated control may include executing an automated control recipe having defined instructions used to automatically control at least some aspects (e.g., surface temperature) of the cooking equipment piece (e.g., a pan on a stove cooking surface) as part of a cooking episode to prepare one or more dishes, and may further include coordinating actions of a human user who is participating in the cooking episode by providing instructions or other information to the user. Related food preparation systems and cookware devices and components are also provided in connection with which the described automated cooking control techniques and methods may be used.

26 Claims, 21 Drawing Sheets

(51) Int. Cl.
*F24C 7/08* (2006.01)
*H05B 3/00* (2006.01)
*H05B 3/02* (2006.01)
*H05B 6/06* (2006.01)
*H05B 6/12* (2006.01)
*A47J 36/32* (2006.01)

(52) U.S. Cl.
CPC ............... *F24C 7/08* (2013.01); *F24C 7/082* (2013.01); *H05B 3/0014* (2013.01); *H05B 3/02* (2013.01); *H05B 6/065* (2013.01); *H05B 6/1209* (2013.01)

(58) Field of Classification Search
USPC .............. 99/325, 331, 337, 342, 375, 421 R; 219/209, 396, 448.11, 620, 660
See application file for complete search history.

(56) References Cited

U.S. PATENT DOCUMENTS

| | | | |
|---|---|---|---|
| 5,441,344 | A | 8/1995 | Cook, III |
| 5,746,114 | A | 5/1998 | Harris |
| 6,170,509 | B1 | 1/2001 | Karta |
| 6,206,564 | B1 | 3/2001 | Adamczewski |
| 6,578,469 | B2 | 6/2003 | Sharpe |
| 7,156,367 | B1 | 1/2007 | Huang et al. |
| 2003/0037681 | A1 | 2/2003 | Zhu et al. |
| 2004/0016348 | A1* | 1/2004 | Sharpe ............... A47J 37/10 99/331 |
| 2006/0234177 | A1* | 10/2006 | Yu ..................... F23N 5/22 431/86 |
| 2008/0055241 | A1* | 3/2008 | Goldenberg ............ G06F 3/016 345/156 |
| 2011/0253693 | A1 | 10/2011 | Lyons et al. |
| 2012/0000903 | A1 | 1/2012 | Baarman et al. |
| 2012/0111852 | A1* | 5/2012 | Bach ................. H05B 1/0266 219/448.11 |
| 2012/0175539 | A1* | 7/2012 | Nebbia ................ F23N 5/102 251/129.09 |
| 2012/0186459 | A1 | 7/2012 | Tisselli et al. |
| 2013/0003490 | A1 | 1/2013 | Kemker et al. |
| 2013/0112683 | A1 | 5/2013 | Hegedis et al. |
| 2013/0260320 | A1* | 10/2013 | Townsend ............. F24C 7/08 431/2 |
| 2014/0039650 | A1 | 2/2014 | Baraille et al. |
| 2014/0113039 | A1 | 4/2014 | Barkhouse |
| 2014/0120219 | A1 | 5/2014 | Ewell, Jr. et al. |
| 2014/0234496 | A1* | 8/2014 | Siegel ................. A47J 27/62 426/231 |
| 2014/0345474 | A1 | 11/2014 | Trench Rocha et al. |
| 2015/0153048 | A1* | 6/2015 | Moro .................. F23N 5/107 99/332 |
| 2015/0208845 | A1 | 7/2015 | Robbins et al. |
| 2015/0208858 | A1 | 7/2015 | Robbins et al. |

FOREIGN PATENT DOCUMENTS

| | | | |
|---|---|---|---|
| EP | 2 312 218 | A1 | 4/2011 |
| JP | 11-51385 | A | 2/1999 |
| JP | 2006-105557 | A | 4/2006 |
| JP | 2010-192274 | A | 9/2010 |
| WO | 99/41950 | A2 | 8/1999 |
| WO | 01/01432 | A1 | 1/2001 |
| WO | 2008/119207 | A1 | 9/2008 |
| WO | 2008/119207 | A1 | 10/2008 |
| WO | 2008/154763 | A1 | 12/2008 |
| WO | 2011/113334 | A1 | 9/2011 |
| WO | 2012/006674 | A1 | 1/2012 |
| WO | 2012/092863 | A1 | 7/2012 |
| WO | WO 2013175441 | A1 * | 11/2013 ............. F23N 5/107 |
| WO | 2012/124349 | A1 | 7/2014 |

OTHER PUBLICATIONS

Written Opinion issued in connection with PCT/US2015/045944.
International Preliminary Report on Patentability, dated Feb. 21, 2017, for International Application No. PCT/US2015/045944, 16 pages.
International Search Report and Written Opinion of the International Searching Authority, dated Jan. 27, 2016, for International Application No. PCT/US2015/045944, 15 pages.
"Pantelligent: Intelligent Pan—Cook Everything Perfectly," Kickstarter, Screenshot of https://www.kickstarter.com/projects/hevans/pantelligent-intelligent-pan-cook-everything-perfe/description, taken on May 12, 2015, 13 pages.
"Paragon | Indiegogo: Pre-order your Paragon on Indiegogo today," Paragon, Screenshot of http://paragon.webflow.io/, taken May 12, 2015, 4 pages.
Wall, Alix, "Smart Pan Creator Hopes to Revolutionize Cooking with "Smarts Pans"," Bay Area Bites, Sep. 25, 2014, retrieved from http://ww2.kqed.org/bayareabites/2014/09/25/smart-pan-creator-hopes-to-revolutionize-cooking-with-smartypans/, on Feb. 18, 2016, 8 pages.
First Examination Report dated Nov. 3, 2017 issued in connection with New Zealand Patent Application No. 729778.
Examination Report No. 1 dated Dec. 19, 2017 issued in connection with corresponding Australian Patent Application No. 2015305556.
Examiner's Report dated Jan. 29, 2018 issued in connection with corresponding Canadian Patent Application No. 2,957,723.
Further Examination Report dated Mar. 19, 2018 issued in connection with New Zealand Patent Application No. 729778.
Notice of Reasons for Refusal dated May 1, 2018 issued in connection with corresponding Japanese Patent Application No. 2017-508687, along with an English language translation.

* cited by examiner

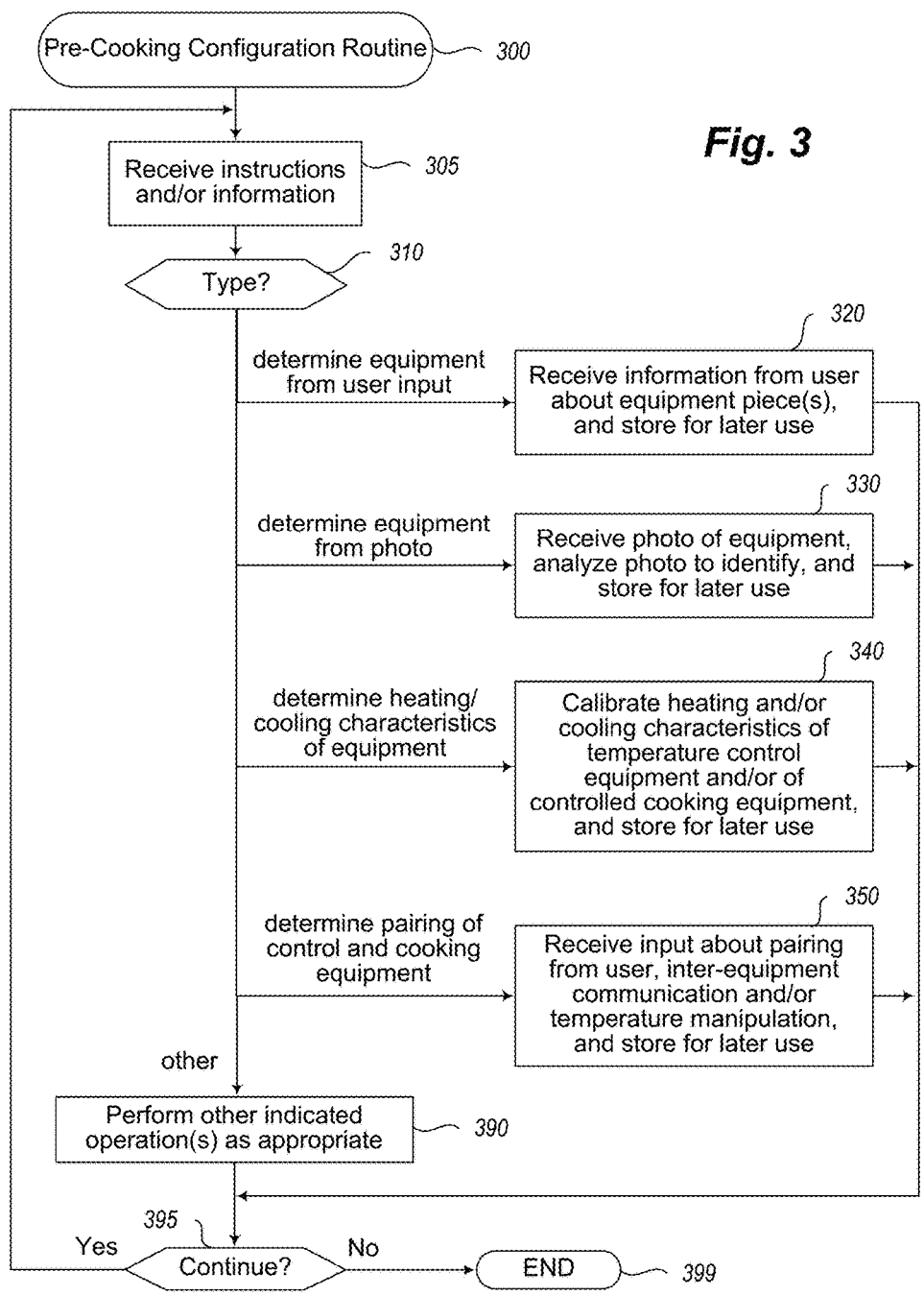

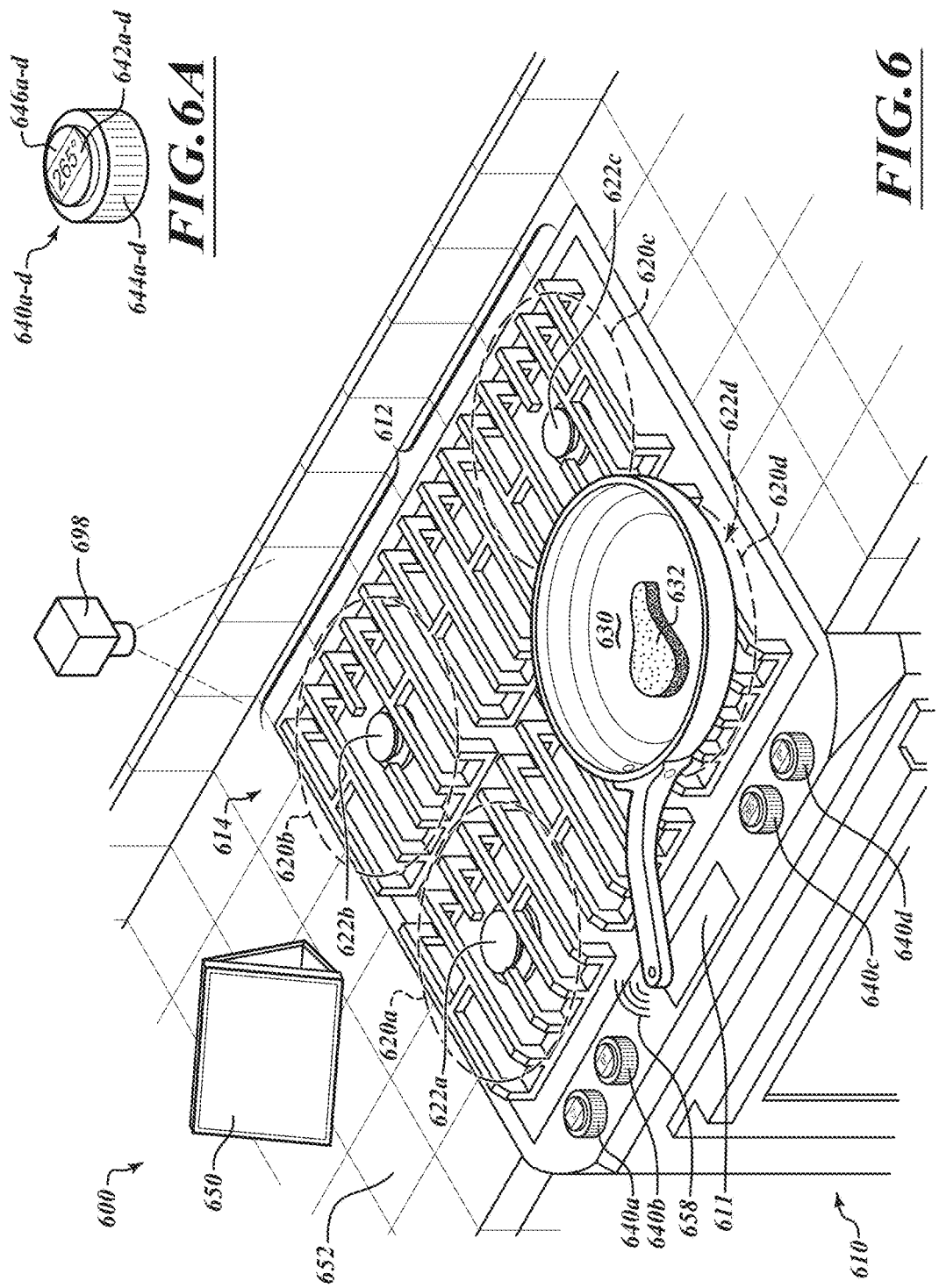

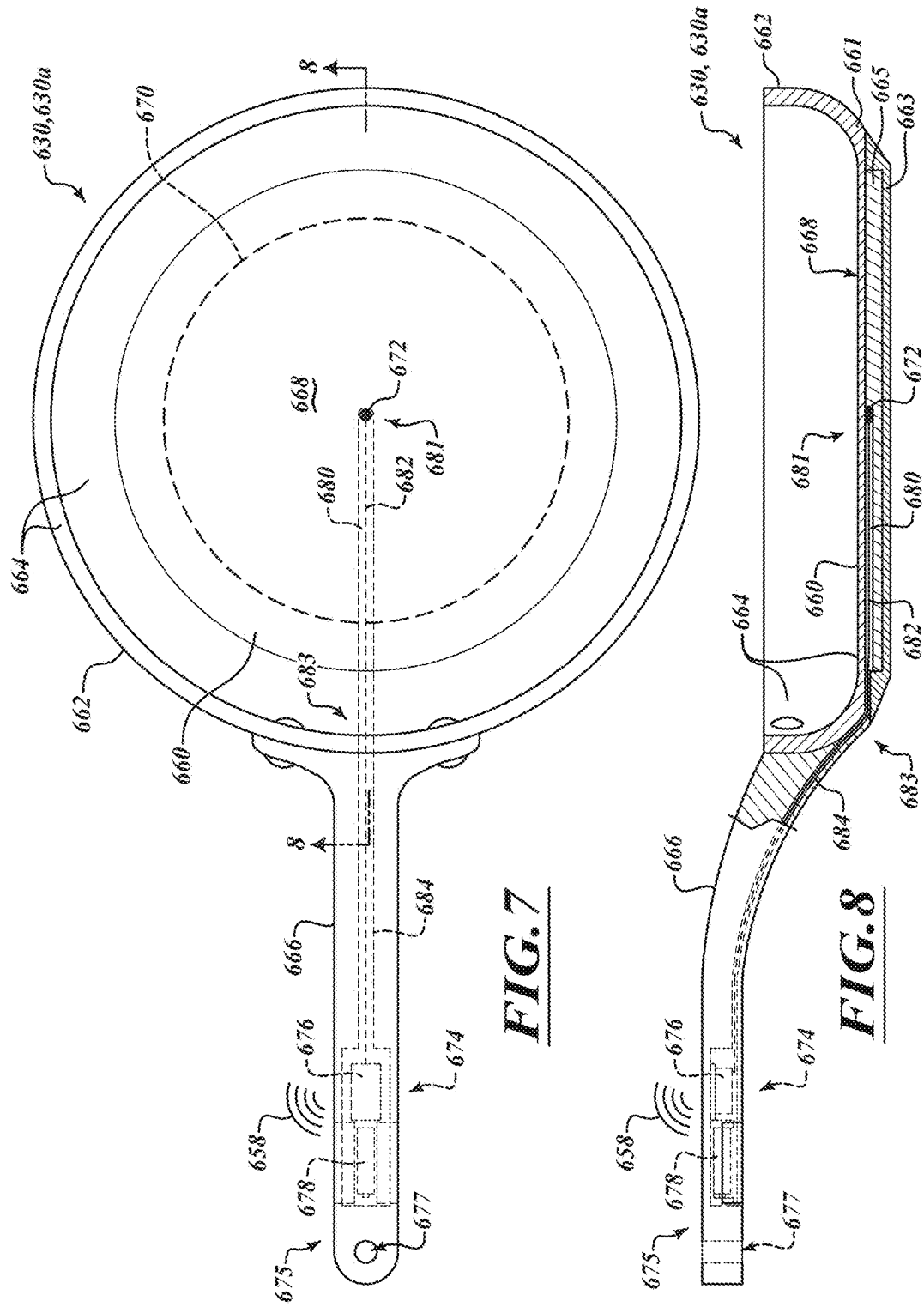

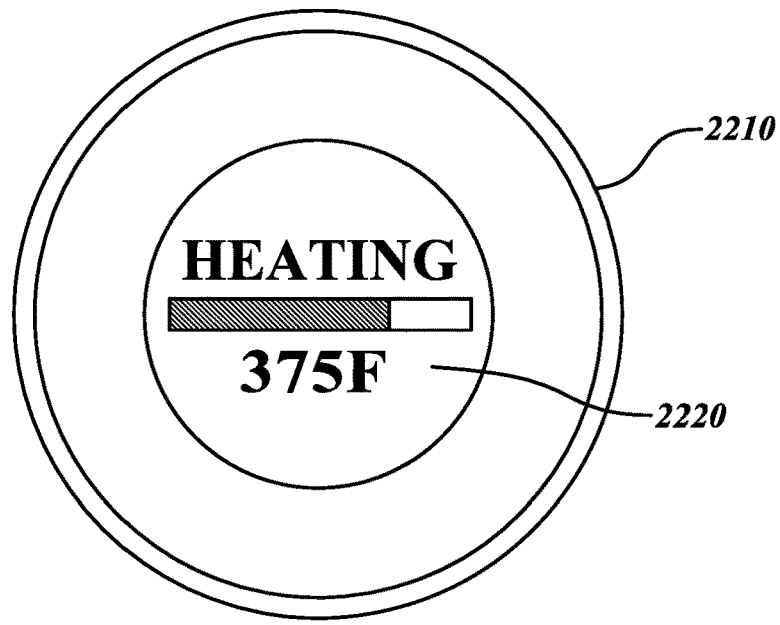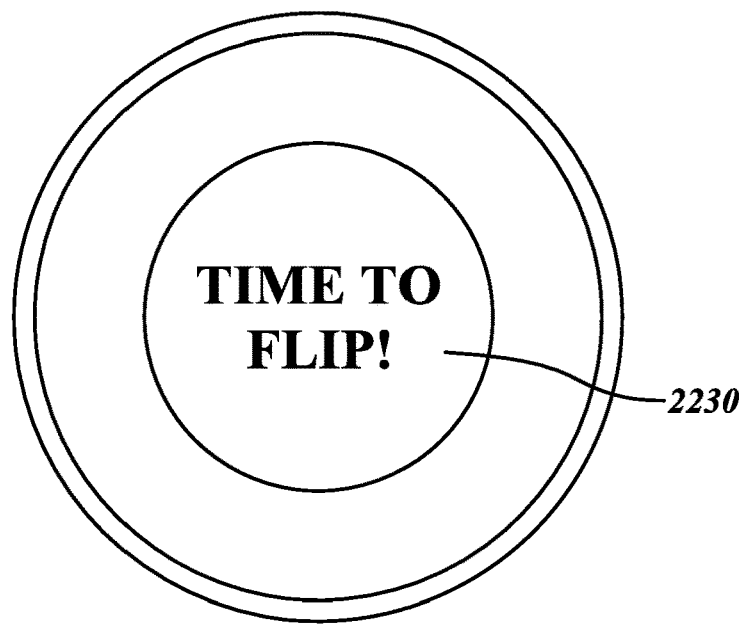
*FIG.22*

AUTOMATED COOKING CONTROL VIA ENHANCED COOKING EQUIPMENT

TECHNICAL FIELD

The following disclosure relates generally to systems and methods to facilitate cooking activities and related cookware devices and components.

BACKGROUND

Individuals tend to cook various food items using simple pots and pans on a gas stovetop or electric cooktop, for example, by following instructions or recipes contained in a cookbook or committed to memory. While many individuals can attain superior cooking skills through repetition and practice, others may lack the time or patience to develop such skills or may otherwise struggle to perfect cooking skills necessary to prepare food items to high standards despite repeated practice.

BRIEF SUMMARY

Embodiments described herein relate to systems, methods, techniques and related cookware devices and components that are particularly well adapted to facilitate cooking activities.

BRIEF DESCRIPTION OF THE DRAWINGS

FIG. 3 is a flow diagram of an example embodiment of a Pre-Cooking Configuration routine.

FIG. 6 is an isometric view of a food preparation system, according to one example embodiment, in connection with which the automated cooking control systems and techniques described herein may be used.

FIG. 6A is an isometric view of a representative control device of the food preparation system of FIG. 6.

FIG. 7 is a top plan view of a piece of cooking equipment of the food preparation system of FIG. 6.

FIG. 8 is a partial cross-sectional view of the piece of cooking equipment of FIG. 7 taken along line 8-8 in FIG. 7.

FIG. 22 illustrates examples of a display mechanism integrated in a top portion of a smart control knob control device.

DETAILED DESCRIPTION

Figure 1:
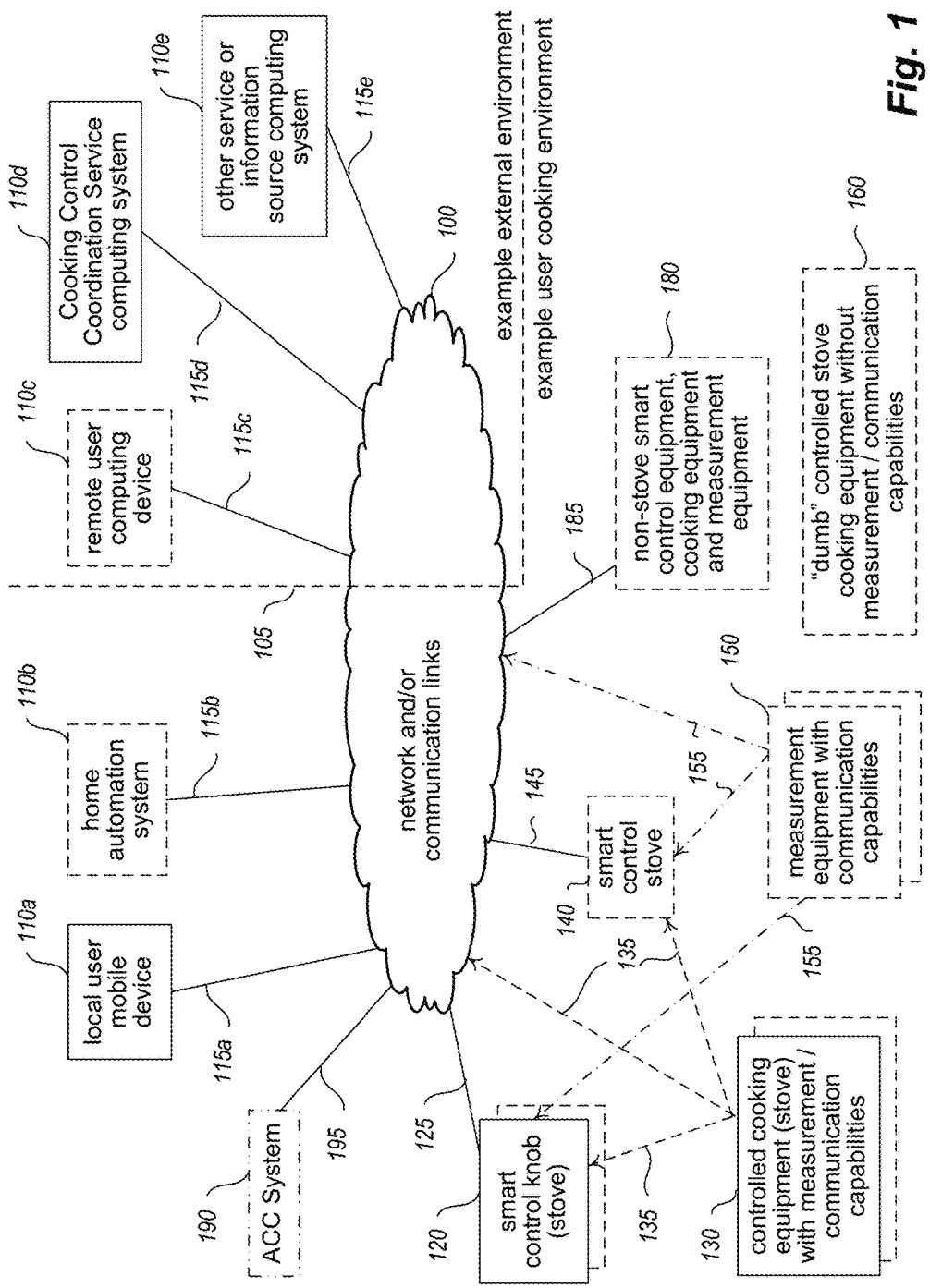
FIG. 1 is a network diagram illustrating an example environment in which the described automated cooking control techniques may be used.

In the following description, certain specific details are set forth in order to provide a thorough understanding of various disclosed embodiments. However, one of ordinary skill in the relevant art will recognize that embodiments may be practiced without one or more of these specific details. In other instances, well-known techniques, structures and devices associated with cooking equipment and cooking activities may not be shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein relate generally to systems, methods, techniques and related cookware devices and components that are particularly well adapted to facilitate cooking activities.

Among other things, techniques are described herein for automated control of at least some parts of a food cooking process, such as to control activation and heating (or other temperature modification) for one or more cooking locations (e.g., one or more cooking surfaces or other pieces of cooking equipment, such as a stove top heating element, an oven, etc.). In at least some such embodiments, such automated control includes using an automated control recipe that has defined instructions used to automatically control at least some aspects (e.g., surface temperature) of one or more cooking equipment pieces (e.g., a pan on a stove cooking surface) as part of a cooking episode that involves cooking or otherwise preparing one or more food dishes or other pieces of food, as discussed in greater detail below and elsewhere herein. Use of such an automated control recipe for a particular cooking episode may further include coordinating actions of a human user who is participating in the cooking episode, including to display or otherwise provide instructions or other information to the user, such as to manipulate a particular cooking equipment piece in a particular manner (e.g., to place a particular pan on a particular stove cooking surface), to manipulate food being prepared in a particular manner (e.g., to place indicated food in the pan, to stir or flip the food already in the pan, etc.), as is also discussed in greater detail below and elsewhere herein. At least some of the described techniques may be automatically performed in at least some embodiments by automated operations of a computer-implemented Automated Cooking Control ("ACC") system, which may optionally include multiple executable software modules, as described in greater detail below.

In addition to automated control of the cooking of particular dishes or other food in conjunction with particular automated control recipes, the ACC system may further perform a variety of other described techniques in at least some embodiments. For example, the automated operations of the ACC system may in some embodiments include assisting a user in creating a new automated control recipe (e.g., by recording at least some cooking-related actions taken by the user during a cooking episode) and/or disseminating a created automated control recipe to other users for their use. In addition, various additional cooking-related functionality may be provided, such as to assist a user in selecting one or more automated control recipes (e.g., via a GUI, or graphical user interface, of the ACC system), to automatically adjust one or more automated controls recipes to be used during a particular cooking episode in order to reflect various types of factors, to automatically coordinate and integrate use of multiple automated control recipes and/or cooking equipment pieces and/or cooking locations together, to automatically monitor for various types of problems that may occur before or during a cooking episode and to take corresponding actions if detected (including to implement defined safety procedures), etc. Additional details are included below and elsewhere herein related to types of automated cooking-related operations that may be performed.

In addition, the ACC system may perform various automated configuration operations before cooking begins, such as to identify particular cooking-related equipment that is available for use by a particular copy of the ACC system (e.g., in a particular home or other cooking environment), to calibrate or otherwise determine the performance of particular cooking-related equipment, to determine particular environmental conditions that may affect cooking (e.g., altitude, ambient temperature, humidity, etc.), to associate particular pieces of cooking-related equipment together for a cooking episode (e.g., to associate a particular control knob or other cooking-equipment mechanism that adjusts temperature for a particular cooking location, such as rate of gas flow, electric current, or air flow, with a particular pan or other piece of cooking equipment to be used at that cooking location during the cooking episode), etc. The calibrating or other determining of the performance of particular cooking-related equipment may include, for example, one or more of the following: determining, for a control knob or other control device that has multiple possible positions or other possible settings, a location of the control knob or other control device for one or more specified positions or settings, such as an 'off' setting and/or a 'maximum' setting and/or one or more defined intermediate settings (e.g., by instructing a user to place the control knob or other control device in a particular setting, and detecting or otherwise recording the corresponding location or position of the control knob or other control device for that setting; by manipulating the control knob or other control device and monitoring corresponding changes, such as to treat a position that results in a highest amount of heating as the maximum setting and to treat a position that results in no heating as the off setting; etc.); determining an amount of change in temperature and/or other condition that occurs to a piece of cooking equipment and/or cooking location in response to an amount of change in an associated control knob and/or amount of heat being provided; etc. Additional details are included below and elsewhere herein related to types of automated configuration operations that may be performed.

The ACC system may further perform various types of automated analysis operations at various times, such as to analyze cooking performance of one or more pieces of cooking-related equipment (e.g., to determine differences in their behavior relative to expected behavior, such as based on comparison to other similar cooking-related equipment pieces; to determine predicted future events, such as an amount of time until a particular fuel tank or other fuel source for the cooking-related equipment is exhausted, etc.), to analyze cooking episodes of a particular user (e.g., to recommend additional automated control recipes of potential interest to the user; to recommend alternative dishes or food, such as for health reasons; etc.), to analyze multiple cooking episodes of one or more users (e.g., to determine adjustments to be made to improve non-optimal cooking results), etc. Additional details are included below and elsewhere herein related to types of automated analysis operations that may be performed.

The ACC system may use various types of cooking-related equipment in various embodiments. For example, the cooking-related equipment may include one or more pieces of control equipment that can affect cooking-related operations of other cooking equipment, such as a smart control knob with a motor or other mechanism that is operable to adjust temperature for a cooking surface or cooking location on a stove or grill or oven (e.g., by modifying a flow of gas or electricity or other fuel to a cooking surface or other cooking location, by adjusting an amount of air flow to a cooking location using fire, etc.). Thus, a stove with, for example, N burners or other heating locations may include zero to N smart control knobs, with each smart control knob controlling an associated cooking location. Control equipment may further include smart cooking devices in some embodiments and situations, such as a smart oven or smart stove or smart grill that is designed or configured to enable automated operation of some or all of the cooking locations of the smart cooking device. It will be appreciated that a 'smart' device as discussed herein refers to a device that has sufficient hardware computing resources (e.g., CPU cycles, RAM or other volatile memory, a hard disk or ROM or flash memory or other non-volatile memory, etc.) to participate in executing one or more ACC system modules in the manner described herein, including communication capabilities to enable interactions with other devices, and may further optionally include various types of I/O (input/output) components for interacting with a user and/or other devices, unless indicated otherwise.

The cooking-related equipment used by the ACC system may further include cooking equipment whose temperature or other operation is controlled by control equipment, such as a pan or pot with an integrated surface temperature sensor and communication capabilities (whose temperature is controlled by an associated smart control knob), an oven grate or other interior, a grill surface or interior, a dome lid with integrated air temperature sensor, etc. In addition, the cooking-related equipment may include measurement equipment to measure one or more aspects of a cooking environment, such as a temperature sensor (e.g., a temperature probe) to measure temperature of a cooking location or for a piece of cooking equipment (e.g., surface, air, contents, etc.), a scale to measure weight (e.g., as a stand-alone device or as integrated in a piece of cooking equipment or in a surface on which cooking equipment may rest, such as a stove grate or oven grate), or other types of sensors to measure other aspects (e.g., sensors to measure the volume, moisture, acidity, color, or other attributes of cooking equipment contents; accelerometers to measure a user's physical movement of cooking equipment; motion sensors or other location sensors to determine if a user is at a particular location, such as proximate to a piece of cooking equipment; etc.). It will be appreciated that a particular piece of cooking-related equipment may serve multiple such roles, such as to act as control equipment and/or as cooking equipment and/or as measurement equipment (e.g., an electric toaster oven with a temperature control and a temperature sensor). Additional details are included below and elsewhere herein related to types of cooking-related equipment.

In addition, a copy of the ACC system (or particular ACC system module copies) for use with a particular cooking environment may execute in various manners, such as on one or more computing devices located in the cooking environment and/or on one or more remote computing devices that are not part of the cooking environment (e.g., that are in a different geographical location from a geographical location of the cooking environment, and that send instructions or other electronic communications over one or more public computer networks or other networks). Such devices may each execute one or more ACC system modules (including an entire ACC system) and may include, for example, a smart phone of a user in the cooking environment, one or more smart control knobs, one or more smart temperature-sensing probes (also referred to herein as smart temperature probes), one or more smart cooking devices (e.g., a smart stove, smart oven, smart grill, etc.), a separate computing device (e.g., a tablet) in a kitchen or other cooking environment, one or more devices of a home automation system controlling an area that includes the cooking environment, one or more remote computing systems separated from a cooking environment (e.g., from a user's home) by one or more intervening computer networks (e.g., the Internet), etc. In addition, one or more particular ACC system modules may execute on a single device in some situations and embodiments, while in other situations and embodiments one or more particular ACC system modules may execute in a distributed manner on multiple devices (e.g., via a wired or wireless network, such as Ethernet, I2C, SPI, Bluetooth, XBee, etc.). Additional details are included below and elsewhere herein related to execution of ACC system modules.

In some embodiments, at least some ACC system copies are distributed by or otherwise interact with an online Cooking Control Coordination service to enable additional capabilities that are provided. For example, such a Cooking Control Coordination service may serve to distribute automated control recipes to ACC system copies, such as automated control recipes that are predefined by the Cooking Control Coordination service, are provided by organizations or other entities affiliated with the Cooking Control Coordination service (e.g., a celebrity chef, a cooking institute, etc.), or are provided in a peer-to-peer manner by other users of ACC system copies (e.g., to any other users; to specified friends, such as specified via the Cooking Control Coordination service or one or more other social networking services or communication services; to designated users; etc.)—in some such embodiments and situations, the Cooking Control Coordination service and/or other sources of automated control recipes may charge fees to distribute at least some such automated control recipes, while such fees may not be charged in other embodiments and situations. Similarly, such a Cooking Control Coordination service may distribute other types of information to ACC system copies, whether in addition to or instead of automated control recipes, such as instructional videos (e.g., to be played to users together with the execution of one or more automated control recipes as part of a cooking episode), representative food images (e.g., to be displayed to users together with the execution of one or more automated control recipes as part of a cooking episode), updates to ACC system modules, etc. The Cooking Control Coordination service may further facilitate interactions with other entities, such as to provide capabilities of cooking experts to particular ACC system copy users (e.g., to diagnose a problem with a particular cooking episode, to provide training or answer questions, etc.), to exchange information between users of ACC system copies, etc. In some embodiments, some or all ACC system modules may execute on computing devices of the Cooking Control Coordination service on behalf of one or more ACC system copy users, including to perform execution of automated control recipes and to control particular cooking-related equipment over one or more networks. In addition, some or all ACC system copies may provide various types of information to the Cooking Control Coordination service related to cooking-related operations, such as cooking times, measured temperatures, other observed conditions, etc. Furthermore, users of the Cooking Control Coordination service may, in some embodiments, provide feedback on their impressions or opinions of recipes (e.g., using a numeric rating system, written reviews, images, video, etc.), and if so the Cooking Control Coordination service may collect, manage, aggregate and publish this feedback to some or all other users. Additional details are included below and elsewhere herein related to the Cooking Control Coordination service and its capabilities.

Furthermore, in some embodiments a particular markup language is used to specify automated control recipes, including to control execution of the automated control recipes specified in that markup language. The markup language may, for example, include tags or other constructs to specify instructions to be executed to modify operations of smart control knobs and other smart control devices, to specify information to be displayed or otherwise presented to users, to specify to obtain and use measurements from measurement equipment and/or from users (e.g., conditional logic, looping constructs and other control flow statements to take or delay action based on measured values and/or user input and/or amounts of time or other specified values), etc. The markup language may also support metadata parameters enabling specification of various user-desired aspects of a recipe being cooked (e.g., desired doneness level, such as rare, medium rare, well-done, etc.), information about the food being cooked (e.g., the size, shape, and/or weight), etc. The user's choice of values for such metadata parameters may be used to adjust cooking-related operations to produce the desired effects (e.g., if the user has selected well-done, one or more timed steps may be adjusted to run longer than if they had selected rare, and/or temperature targets for different steps or temperature-driven control decisions may be altered). Furthermore, the markup language may allow the definition of conditions upon which a next step can be initiated (e.g., upon 5 minutes elapsing, upon a pan reaching a certain temperature, upon a specified rate of change of temperature of a pan, etc.), including to use BOOLEAN logic (e.g., AND, Oreg., NOT, etc.) or other modifiers in conjunction with other specified conditions. The markup language may further support various information about steps of a recipe (whether for steps that occur during cooking or before cooking starts), such as a specification of which steps in a recipe may be done in parallel, how long a step is estimated to take, a type and/or amount of space that a step is estimated to use, possible substitutions for ingredients, etc.—for example, if a step is to occur before cooking starts, it may be advantageous to indicate whether it should be performed just before the cooking begins or instead could be performed significantly in advance. Such automated control recipes may each further include or have additional associated information for use with the automated control recipe, such as to indicate particular types of cooking-related equipment to use with the automated control recipe, particular ingredients and other cooking-related materials (e.g., oil) to be used with the automated control recipe, etc.

Use of the described techniques may provide a variety of benefits in various situations, including improved results of cooking episodes for particular users (including enhanced consistency across multiple related cooking episodes), such as to decrease overall cost and food waste; the ability for users to cook particular dishes in the most efficient manner, such as by decreasing wasted time and energy or otherwise allowing the cooking to be performed more quickly; enhancements to safety, such as to initiate and/or maintain cooking only if specified conditions are true (e.g., a parent's smartphone is present); enhancements to cooking skills of particular users via training and other feedback; a new ability of particular users to prepare dishes that they otherwise would not be able to prepare (e.g., do not have sufficient knowledge and/or skills); enhanced ability of users to share their recipes and cooking techniques (including in some situations to receive monetary rewards for doing so) and/or to receive the benefits of others' recipes and cooking techniques; etc. Furthermore, while fully automated control of cooking episodes may be implemented by the ACC system in some embodiments and situations, in other embodiments a cooking episode may include at least one manual portion in which one or more human users manually manipulate one or more smart control knobs or other smart control devices, and at least one automated portion in which the ACC system performs automated manipulations of the one or more smart control knobs or other smart control devices. As one non-exclusive example, the ACC system may perform an initial automated portion of a cooking episode, and a user may take over the cooking episode and perform a further manual portion of the cooking episode (e.g., by explicitly providing an instruction or other indication to the ACC system to suspend its automated operations or that the user is assuming manual control; by beginning to perform a manual manipulation of the one or more smart control knobs or other smart control devices; etc.)—if so, the user may optionally further return control of a remaining final portion of the cooking episode to the ACC system (e.g., by explicitly providing an instruction or other indication to the ACC system to resume its suspended automated operations from a current situation or from a previous state at which the suspension began). As another non-exclusive example, a user may begin an initial manual portion of a cooking episode, but provide control to the ACC system to perform an additional automated portion of the cooking episode. It will be appreciated that various other combinations of automated and manual control of cooking episodes may be performed, and that the automated portions may be based at least in part on previous calibration activities that are performed, as discussed in greater detail elsewhere herein.

For illustrative purposes, some embodiments are described below in which specific types of functionality are provided in specific manners using specific types of cooking-related equipment and based on specific types of user activities. These examples are provided for illustrative purposes and are simplified for the sake of brevity, and the inventive techniques may be used in a wide variety of other situations, some of which are discussed below, with the techniques not being limited to use with particular types of cooking-related equipment, cooking techniques, foods, automated control recipes, users, etc. In addition, while the description herein uses the term 'user' in particular situations to refer to particular humans who are using at least some aspects of the Automated Cooking Control system, it will be appreciated that the described techniques may also be used with other types of users (e.g., a group of multiple humans working together, a business or other organization, etc.), and that the term 'user' is intended to include any such other types of users, unless indicated otherwise.

FIG. 1 is a network diagram illustrating an example environment in which an embodiment of the Automated Cooking Control ("ACC") system may be used in an example cooking environment to control cooking episodes involving various cooking-related equipment located in the cooking environment. In particular, the example user cooking environment may include a stove with one or more cooking surfaces and optionally various other types of cooking-related equipment, with other computing devices and systems 110*c*-110*e* optionally being located external to the user's cooking environment (e.g., separated from the user's cooking environment by one or more networks, such as the Internet) but remotely participating in some capabilities of the ACC system. The user's cooking environment in this example may, for example, include a kitchen and possibly additional portions of the user's home, but may have other forms in other embodiments. In other embodiments, a cooking environment may not include any stoves and/or may include additional types of cooking equipment.

In the example cooking environment of FIG. 1, various cooking-related equipment 120-180 may be present and used by a copy of the ACC system 190 that is operating on behalf of a user (not shown) located in the cooking environment. The ACC system 190 copy may execute on one or more of various computing devices, as discussed in greater detail elsewhere, including on one or more of a local mobile device 110a of the user (e.g., a smart phone or tablet), one or more computing devices of an automated home automation system 110b that controls some devices in the user's home, one or more smart control knobs 120 of one or more stoves in the user's home, one or more other smart cooking equipment pieces 140 or 180 (e.g., a stove or oven with sufficient computing and communication resources), etc. In other embodiments or situations, the ACC system copy may instead execute in part or in whole on one or more computing devices external to the cooking environment, such as a remote computing device 110c of the user (e.g., a work computer of the user), one or more computing systems provided by an embodiment of the Cooking Control Coordination service 110d, etc. In the illustrated embodiment, the various computing devices and other equipment with communication capabilities may interact with each other via one or more networks and/or direct communication links 100, such as via a wireless local network (e.g., using Wi-Fi), via direct device-to-device communications (e.g., via Bluetooth), via cabled or wired communication links such as Ethernet, I2C, SPI, etc. (not shown), etc. In addition, computing devices and systems external to the cooking environment may in some embodiments communicate with at least some devices and cooking-related equipment within the cooking environment over one or more external networks (e.g., the Internet).

In the example environment of FIG. 1, the cooking-related equipment includes control equipment such as one or more smart control knobs 120 for one or more stoves, and may optionally include a smart control stove 140 and/or other non-stove smart control equipment 180 (e.g., non-stove smart control knobs, such as for an oven, grill, microwave, etc.; and/or other non-stove smart control cooking equipment pieces, such as an oven, grill, microwave, etc.). Thus, where cooking equipment contains control electronics that can be interfaced with directly (e.g., via proprietary wired interface or standard wired or wireless protocol such as RS-232, USB, I2C, Bluetooth, etc.), such as smart equipment 180, the ACC system 190 copy may communicate directly with such cooking equipment to issue commands and gather feedback on status of the cooking equipment. In addition, the example cooking environment includes one or more pieces of cooking equipment with embedded or attached measurement and communication capabilities, including one or more pieces of cooking equipment 130 (e.g., pots, pans, kettles, griddles, dishware, etc.) that are controlled for use on a stove. Such controlled cooking equipment pieces 130 may include communication capabilities and perform one or more communications or interactions 135 with corresponding smart control knobs 120 to which the cooking equipment pieces are paired or otherwise associated (e.g., on a temporary basis for a particular cooking episode) such as via direct device-to-device communications or instead via a network to which the cooking equipment pieces and smart control knobs belong. If one or more optional smart control stoves 140 are also present, such controlled cooking equipment pieces 130 may similarly perform communications or other interactions 135 with such smart control stoves 140. In the illustrated embodiment, the communications from the controlled cooking equipment pieces 130 may be one-way communications to the smart control knobs 120 and/or smart control stove 140, such as to provide temperature measurements or other measurements from the cooking equipment pieces 130, while in other embodiments the communications or interactions may be two-way (e.g., to allow the smart control knobs and/or smart control stoves to send instructions or information to the cooking equipment pieces 130). In other embodiments and situations, the cooking equipment pieces 130 may not interact directly with the smart control knobs 120 and/or smart control stove 140, with all of those cooking-related equipment pieces instead interacting directly with an ACC system copy executing elsewhere (e.g., on the mobile device 110a), and with the ACC system copy acting as an intermediary for interactions between the cooking-related equipment pieces.

The cooking-related equipment in the cooking environment may further optionally include other measurement equipment 150 that does not cook food but may be used in conjunction with controlled cooking equipment pieces 130, such as temperature sensors, weight sensors, etc.—such measurement equipment 150 may similarly have communication capabilities used to send communications or otherwise perform interactions 155 with the smart control knobs 120 and/or smart control stove 140 and/or ACC system 190. In addition, the cooking-related equipment in the example cooking environment may further optionally include cooking equipment pieces 160 that lack communication and computing capabilities, referred to generally herein as a "dumb" or "traditional" cooking equipment piece. In addition, as noted, the cooking-related equipment in a particular cooking environment may in some environments include various types of non-stove equipment 180, whether instead of or in addition to stove-related cooking equipment 120-160.

As the ACC system 190 copy operates, it may receive various instructions from one or more users (not shown), such as local users present in the cooking environment and/or users of one or more remote user computing devices 110c, such as to initiate or participate in one or more cooking episodes, or to otherwise manipulate the cooking-related equipment 120-180 in various manners. As one example, the ACC system 190 may select appropriate pieces of cooking-related equipment to use for a particular cooking episode, and may select and execute an automated control recipe for the cooking episode that includes sending automated instructions to particular control equipment and/or sending instructions to one or more local users in the cooking environment in order to control the cooking of one or more dishes or other pieces of food using the cooking-related equipment 120-180. As part of performing such automated operations, the ACC system may send communications or otherwise perform interactions 195 with the cooking-related equipment that includes sending instructions 125 to one or more smart control knobs 120 of one or more stoves (e.g., to activate, deactivate or otherwise modify operation of an associated stove cooking surface), and may similarly receive information 125 from such smart control knobs (e.g., indications of detected problems, reported measurements, status information for the smart control knobs or associated controlled cooking equipment, etc.). Similarly, the ACC system 190 may send communications or otherwise perform interactions 195 with one or more smart control stoves 140 (if present) via communications or other interactions 145, and may similarly receive information via interactions 145 from such smart control stoves. In addition, if other optional non-stove smart control equipment 180 is present, the ACC system 190 may also send communications or otherwise perform interactions 195 with such other non-stove smart control equipment via communications or other interactions 185, and may similarly receive status and other information from the non-stove smart control equipment via communications or other interactions 185.

In the illustrated embodiment, the ACC system 190 may further perform interactions with computing systems external to the cooking environment in various manners and for various reasons, such as to interact with a computing system 110d that is part of an embodiment of the Cooking Control Coordination Service in order to obtain or provide automated control recipes and/or to otherwise access capabilities available via the Cooking Control Coordination Service. In a similar manner, in some embodiments other computing systems 110e may be available that provide services or information of various types (e.g., a source of additional automated control recipes, expert services to review and diagnose problematic cooking episodes, etc.), and if so the ACC system 190 copy may similarly interact with such other computing systems 110e as appropriate, such as in a manner directed by one or more users of the ACC system 190. As discussed in greater detail elsewhere, the ACC system 190 may perform various other types of operations as well, including configuration operations and information analysis operations.

While only a single copy of the ACC system 190 is illustrated in the example cooking environment of FIG. 1, it will be appreciated that in other embodiments two or more copies of the ACC system 190 may be present and operating, such as to control different pieces of cooking-related equipment, to assist different local users in the cooking environment, etc., and in some such embodiments may interact with each other in various manners (e.g., to share information, to coordinate actions, etc.). For example, a single instance of one component may be present, but may communicate with multiple instances of another component.

Figure 2:
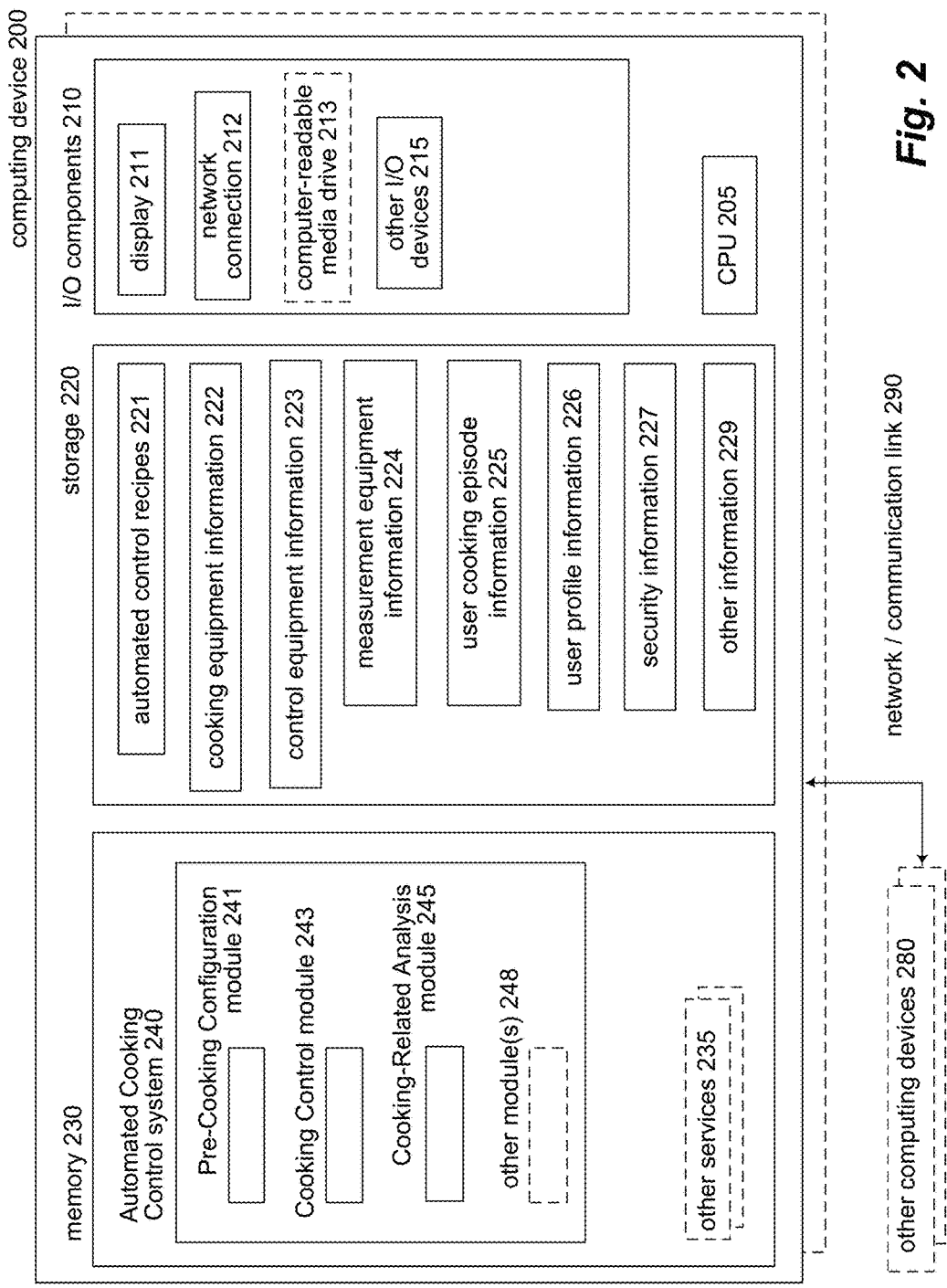
FIG. 2 is a block diagram illustrating example computing devices suitable for executing an automated cooking control system that performs at least some of the described techniques.

FIG. 2 is a block diagram illustrating example computing devices suitable for executing an example embodiment of the ACC system, in order to perform automated operations to provide at least some of the described techniques. In particular, FIG. 2 illustrates a computing device 200 suitable for executing an embodiment of the Automated Cooking Control system 240, as well as one or more optional other services 235. In this example embodiment, the computing device 200 may interact with one or more other computing devices or systems 280 over one or more networks or communications links 290. As discussed in greater detail elsewhere, various devices may serve as the computing device 200 in order to execute some or all of an embodiment of the ACC system 240, such as a user's mobile device, one or more smart control knobs, one or more pieces of smart cooking equipment, one or more other computing systems, etc.

In the illustrated embodiment, the computing device 200 has hardware components that include one or more CPU processors 205, various I/O components 210, storage 220, and volatile memory 230, with the illustrated I/O components including a display 211, a network connection 212, an optional computer-readable media drive 213 (e.g., a USB port or other comparable port), and optional other I/O devices 215 (e.g., speakers, a microphone, one or more user input surfaces or devices, etc.). In other embodiments, the computing device 200 may have other types of components, whether in addition to or instead of some of the illustrated components. The optional other computing devices 280 may also have hardware components similar to those of computing device 200, although particular components are not illustrated in this example for the sake of brevity.

In the example of FIG. 2, the ACC system 240 embodiment is executing in memory 230 of computing device 200, such as by executing software instructions of system 240 that configure processor(s) 205 and the computing device 200 to perform corresponding automated operations, including to perform some or all of the techniques described with respect to FIGS. 1 and 3-5 and elsewhere. In this illustrated embodiment, the system 240 includes several modules, including a Pre-Cooking Configuration module 241, a Cooking Control module 243, a Cooking-Related Analysis module 245, and optionally one or more other modules 248. In addition, various types of information may be stored and used by the system 240 during operation, such as on storage 220 and/or on one or more external storage devices (not shown). Such information includes, for example, automated control recipes 221, information about cooking-related equipment that includes cooking equipment information 222 and control equipment information 223 and measurement equipment information 224, information about particular user cooking episodes 225, profile information for one or more users 226, security information 227 for use in controlling access to some or all operations of the system 240 and/or controlled cooking-related equipment, and optionally other information 229.

The Pre-Cooking Configuration module 241 may perform various automated configuration operations, with additional details related to the various automated configuration operations being included elsewhere herein, including with respect to FIG. 3. As part of such automated operations, the module 241 may use various information about cooking-related equipment 222-224, including to retrieve stored information and/or to store new information.

Figure 4A:
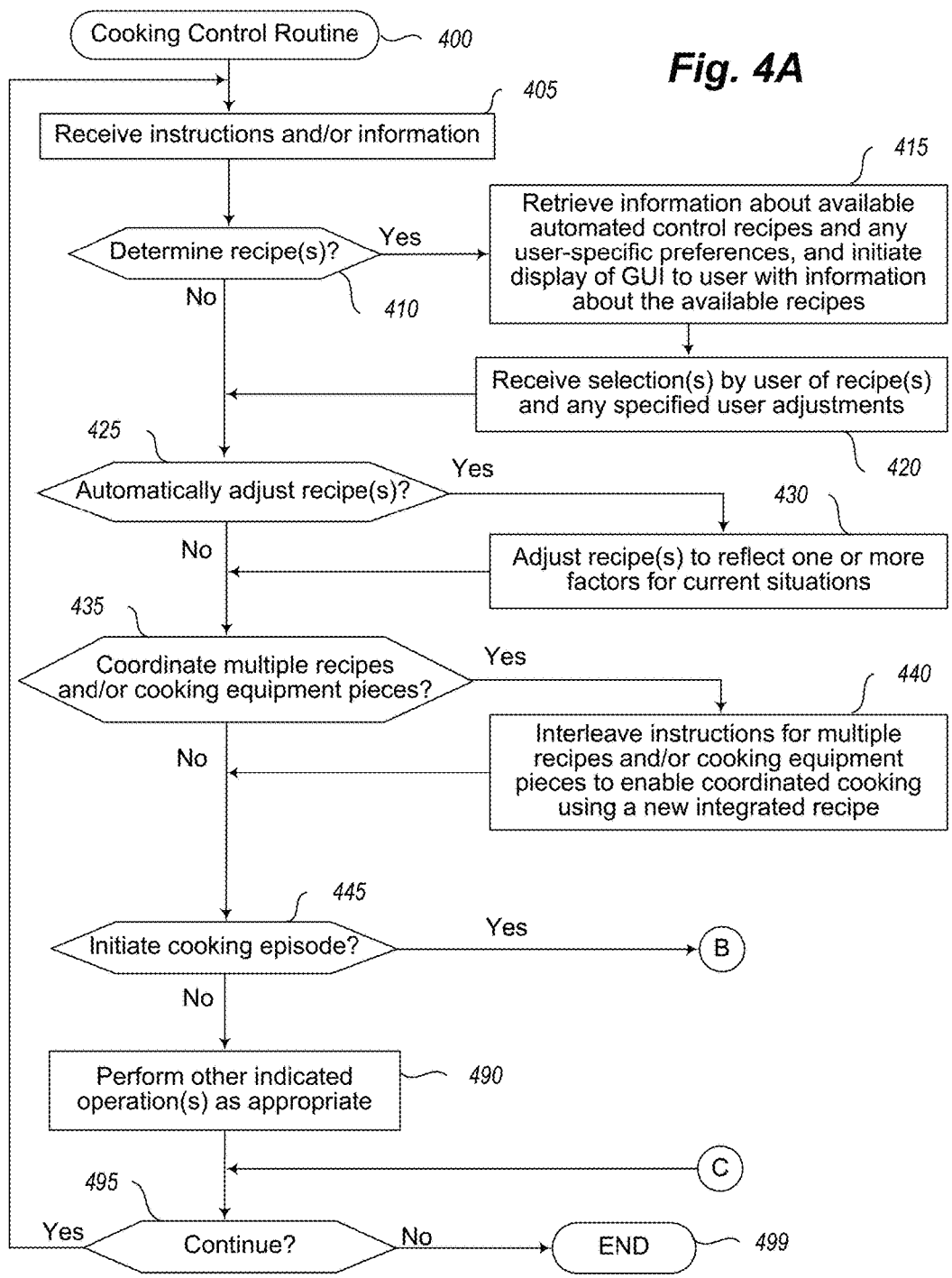
FIGS. 4A-4B are a flow diagram of an example embodiment of a Controlled Cooking routine.
Figure 4B:
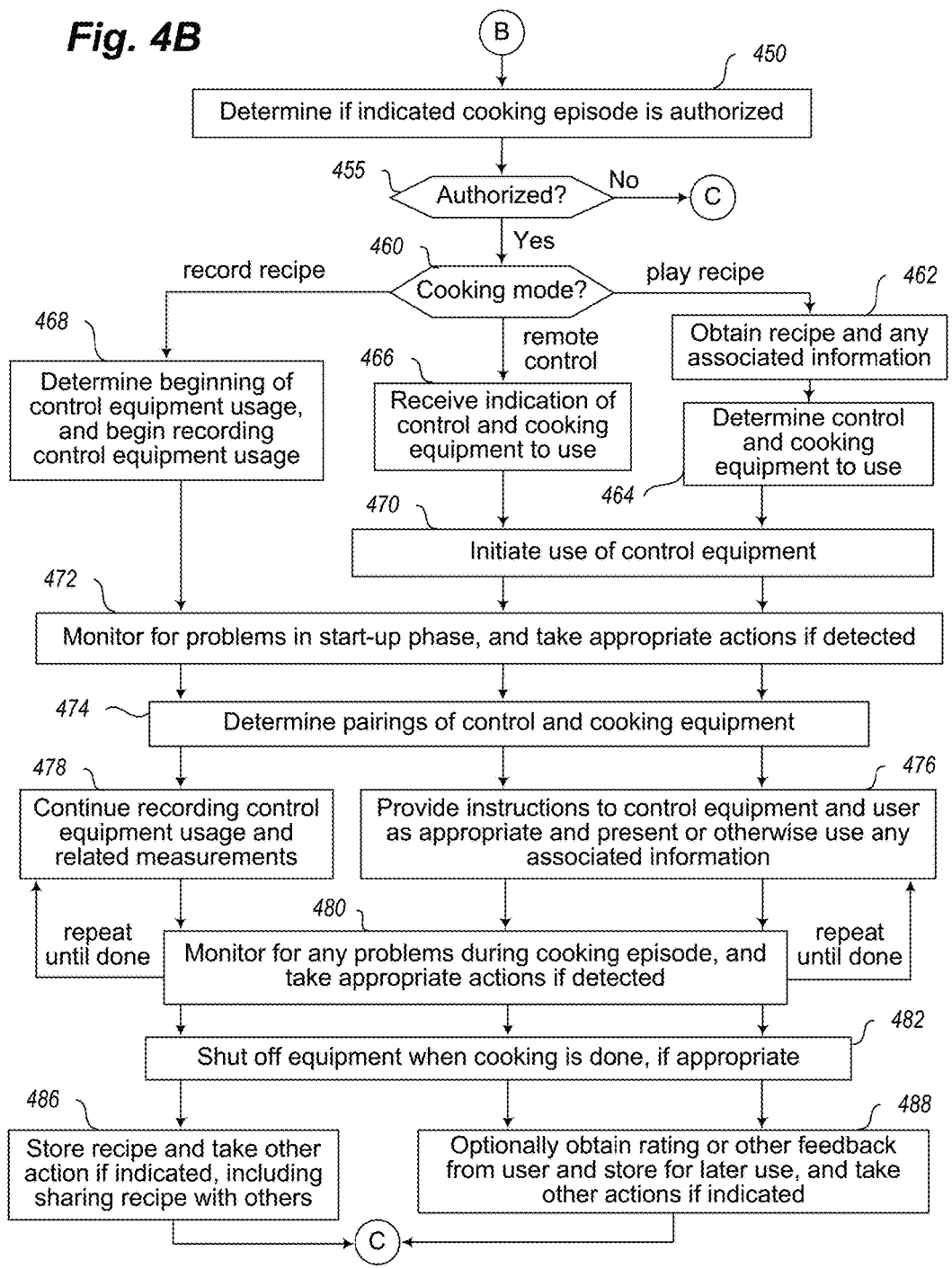

The Cooking Control module 243 may perform automated control of various types of cooking-related operations, with additional details related to the various automated cooking-related operations being included elsewhere herein, including with respect to FIGS. 4A-4B. As part of such automated operations, the module 243 may use various information including automated control recipes 221, cooking-related equipment information 222-224, user profile information 226, and security information 227, including to retrieve stored information and/or to store new information. The module 243 may further record and store information 225 about particular cooking episodes, as well as to provide such information to other computing devices 280.

Figure 5:
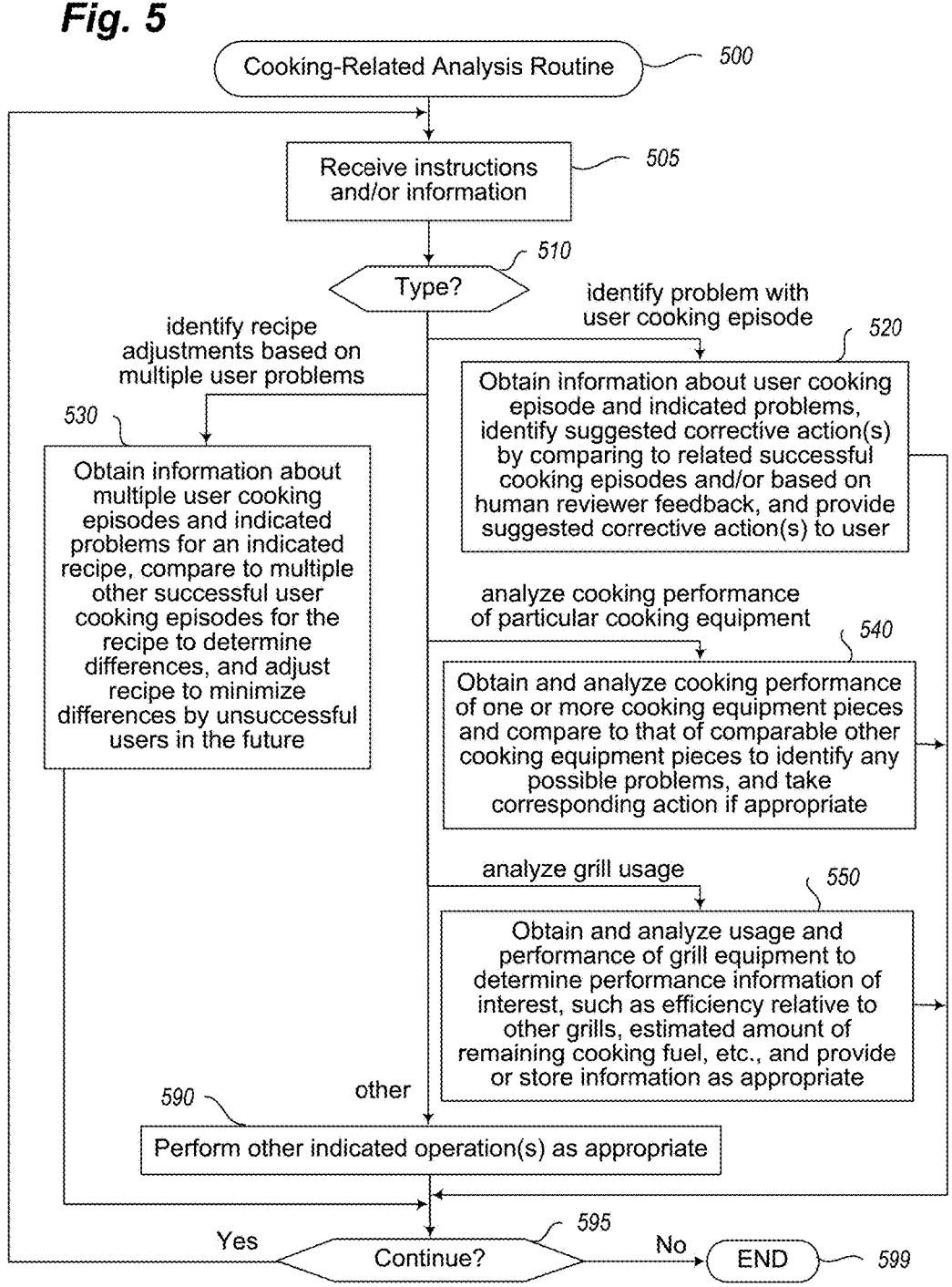
FIG. 5 is a flow diagram of an example embodiment of a Cooking-Related Analysis routine.

The Cooking-Related Analysis module 245 may perform various types of automated analysis operations at various times, with additional details related to the various automated analysis operations being included elsewhere herein, including with respect to FIG. 5. As part of such automated operations, the module 245 may use various information including automated control recipes 221, cooking-related equipment information 222-224, cooking episode information 225 and other information 229, including to retrieve stored information and/or to store new information.

It will be appreciated that computing devices 200 and 280 are merely illustrative and are not intended to limit the scope of the present invention. For example, computing device 200 may be connected to other devices that are not illustrated, including through one or more networks, such as the Internet or via private networks (e.g., mobile communication networks, etc.), or via the World Wide Web. More generally, a computing device or other computing system may comprise any combination of hardware that may interact and perform the described types of functionality, such as when programmed or otherwise configured with appropriate software, including, without limitation, desktop or laptop or tablet or slate computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), specialized controller devices, and various other consumer products that include appropriate communication capabilities. For example, the illustrated system 240 and/or its modules may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. In addition, the functionality provided by the illustrated ACC system 240 may in some embodiments be distributed in additional modules or combined in fewer modules. Similarly, in some embodiments some of the functionality of the ACC system 240 may not be provided and/or other additional functionality may be available.

Thus, in at least some embodiments, the illustrated modules and/or systems are software-based modules/systems including software instructions that, when executed by the CPU(s) 205 or other processor means, program the processor means to automatically perform the described operations for that module/system. Furthermore, in some embodiments, some or all of the systems and/or modules may be implemented or provided in other manners, such as at least partially or wholly in designed and configured firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also be transmitted as generated data signals (e.g., by being encoded as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 3 is a flow diagram of an example embodiment of a Pre-Cooking Configuration routine 300. The routine may be provided by, for example, execution of an embodiment of the module 241 of the ACC system 240 of FIG. 2 and/or as part of an ACC system 190 discussed with respect to FIG. 1, such as to perform various types of configuration operations at various times. The routine 300 may be initiated in various manners, such as when an ACC system embodiment is first initialized in a cooking environment, at the beginning of a cooking episode, upon user instructions, etc.

The illustrated embodiment of the routine 300 begins at block 305, where instructions and/or information is received. The routine then continues to block 310 to determine the type of instructions or information, and to proceed accordingly. In particular, if instructions or information are received in block 305 related to determining the cooking-related equipment available to use in a particular cooking environment based at least in part on user input (e.g., to reflect a new use of the ACC system in that cooking environment or to reflect changes to that cooking environment), the routine in block 320 receives information from one or more users about some or all of the cooking-related equipment that is available for use by the ACC system, and stores the information for later use (e.g., in cooking-related information 222-224 of FIG. 2).

If the instructions or information received in block 305 instead indicate to determine one or more pieces of cooking-related equipment that are available for use based on a photo or other image of the equipment (e.g., to reflect a first use of the ACC system with that cooking-related equipment), the routine in block 330 receives one or more such photos or other images of one or more equipment pieces, and performs analysis of the photos (e.g., based on a comparison to stored photos of various products) to attempt to identify a make and model or other information about the corresponding equipment pieces, with any such identified information being similarly stored for later use (e.g., in cooking-related information 222-224 of FIG. 2)—if the analysis is not successful, the user may be notified in various manners. It will be appreciated that in other embodiments particular cooking pieces may be identified in other manners, such as by scanning a UPC code or a QR code or a serial number, based on wireless or other communication interactions between the ACC system and a cooking equipment piece that supports such interactions, etc.

If the instructions or information received in block 305 instead are to determine the performance characteristics of one or more cooking-related equipment pieces (e.g., to reflect a first use of the ACC system with that cooking-related equipment), the routine in block 340 performs automated operations to measure and calibrate the performance characteristics of the equipment pieces, and stores such information for later use (e.g., in the cooking-related equipment information 222-224 of FIG. 2). For example, if the cooking equipment pieces include a stovetop heating element and a corresponding pan or pot, the operations in block 340 may include instructing the user to place the pot or pan on the stovetop surface, and further include performing automated modifications of a corresponding smart control knob to adjust the heating controls and monitor for corresponding temperature changes in the pot or pan. Such automated measurement and calibration operations may also include instructing a user to perform additional activities, such as adding a specified amount of water to a pan being calibrated so that the calibration system can measure time and temperature responses as part of the calibration process. In this manner, various types of information may be determined, such as an amount of heat produced at different settings of the smart control knob, how quickly the pot or pan heats or cools at various corresponding settings of the smart control knob, etc. It will be appreciated that other types of characteristics than temperature may similarly be measured in other embodiments and situations. In addition, such determined performance characteristics information may be used in various manners, such as to adjust automated cooking recipes that use such cooking-related equipment, identify possible problems with the cooking-related equipment, etc.

If it is instead determined that the instructions or information received in block 305 are to determine a pairing or other association of particular control and cooking equipment pieces, the routine in block 350 performs automated operations to determine a temporary or permanent pairing between the control and cooking equipment pieces, and stores the information for later use (e.g., in cooking-related equipment 222-224 and/or other information 229 of FIG. 2). The pairing or other association of a particular control equipment piece and cooking equipment piece may be performed in various manners in various embodiments, including based on manual input from a user, by a signal or other communication between the control and cooking equipment pieces (e.g., by detecting a Bluetooth signal between a smart control knob and a controlled cooking equipment piece that has Bluetooth transmission capabilities, such as to use signal strength to determine a most likely pairing when multiple smart control knobs and/or multiple pieces of cooking equipment with communication capabilities are proximate to each other; by activating the control equipment and monitoring temperature changes of a corresponding cooking equipment piece with temperature measurement capabilities; by obtaining data from accelerometers or other weight or motion sensors embedded in cooking-related equipment that indicate a user has picked up or moved a particular pan, whether in response to a prompt or on their own; etc.). It will be appreciated that non-cooking measurement pieces may similarly be paired with control and/or cooking equipment pieces in at least some embodiments.

If the instructions or information received in block 305 are of another type, the routine continues instead to block 390 to perform one or more other indicated operations as appropriate. Such other operations may include, for example, determining pairings or other association of measuring equipment with control equipment and/or cooking equipment (such as in a manner similar to that discussed with respect to block 350), updating and storing user-specific preference information (e.g., with respect to the preparation of particular types of foods, such as to prefer steaks medium-well, to avoid salt, to prefer particular types of foods, etc.), to download or otherwise access automated control recipes for later use, to initiate one or types of security information or procedures to be used with an ACC system copy in one or some or all cooking environments (such as during a first use of the ACC system in a cooking environment, or instead at later times) based on interactions with an authorized user and/or associated device, etc. Such security procedures may include, for example, configuring whether/when/how to lock out or otherwise prevent operation of particular cooking-related equipment (e.g., if a specified smart phone or other portable computing device is not within a specified location or area at the beginning of a cooking episode and/or at any time during a cooking episode, such as based on the lack of a wireless connection existing between the smart phone or other portable computing device and one or more smart cooking-related devices in the specified location or area; if a specified security PIN or other security information is not provided at the beginning of a cooking episode and/or as otherwise requested by the ACC system; to prevent remote operation of some or all cooking-related equipment in a cooking environment or to allow it only under specified conditions, such as if an authorized user or device is present in the cooking environment and optionally approves the remote operation; if a specified smart phone or other device does not provide a predefined secret key or other information known to the ACC system; etc.)—such prevention of operation may include, for example, using a motor of a smart control knob to prevent its movement from an 'off' setting and/or to turn the smart control knob to the 'off' setting, or may otherwise include reduce the setting or position of such a smart control knob (e.g., to a lowest setting that is not 'off'). In some embodiments, security information to be provided by a user may include spoken information, with voice recognition and/or speech recognition used to validate such information when later provided, or may instead include a user's biometric data, such as fingerprints or retina scans performed by sensors on a user's computing device or in other locations.

After block 320, 330, 340, 350 or 390, the routine continues to block 395 to determine whether to continue, such as until an explicit indication to terminate is received. If it is determined to continue, the routine returns to block 305, and otherwise continues to block 399 and ends.

FIGS. 4A-4B are a flow diagram of an example embodiment of a Cooking Control routine 400. The routine may be provided by, for example, execution of an embodiment of the module 243 of the ACC system 240 of FIG. 2 and/or as part of the ACC system 190 of FIG. 1, such as to perform various types of automated operations related to controlling cooking-related equipment as part of related cooking episodes. The routine 400 may be initiated in various manners, such as when an ACC system embodiment is first initialized in a cooking environment, at the beginning of a cooking episode, upon user instructions, etc.

The illustrated embodiment of the routine 400 begins at block 405, where instructions and/or information are received. The routine then continues to block 410 to determine whether the instructions or information received in block 405 indicate to determine one or more automated control recipes to use based on user input. If so, the routine continues to block 415 to obtain information about available automated control recipes, as well as any related user-specific preferences and cooking environment information, including to optionally filter possible automated control recipes that are inconsistent with such user-specific preferences or with cooking-related equipment available in the cooking environment—such filtered recipes may, for example, not be displayed to the user at all, or may instead be displayed in an alternative manner (e.g., using different colors, symbols, icons, fonts, or other graphical formats) as compared to available recipes, along with optional indications of what additional equipment or components would be necessary to enable them. The routine further proceeds in block 415 to initiate a display or other presentation to the user with information about one or more such available automated control recipes. Obtaining the information about the available automated control recipes may include retrieving locally stored information of a copy of the ACC system and/or performing communications over one or more networks or other communication links in order to retrieve at least some such information from one or more external sources. In block 420, the routine then receives one or more selections by the user of one or more automated control recipes, as well as optionally associated instructions (e.g., to use to initiate a current cooking episode, to save as a favorite for later use, etc.). In addition, in at least some embodiments, the user may further be provided with a GUI that enables the user to modify a particular automated control recipe in one or more manners (e.g., to adjust times, temperatures, portion sizes, etc.), to select metadata about the automated control recipe (e.g., desired doneness level, such as rare, medium rare, etc.; thickness, size, or weight of a particular instance of food to be cooked, such as a 1" thick steak, etc.), and/or to indicate to integrate or otherwise coordinate multiple automated control recipes in various manners, and if so the routine may further store any such user instructions for current or later use.

After block 420, or if it was instead determined in block 410 that the instructions or information received in block 405 did not include an indication to determine one or more automated control recipes, the routine continues to block 425 to determine whether the instructions or information received in block 405 include an indication to automatically adjust one or more automated control recipes for use in a current cooking episode, such as for recipes just selected in block 420 or instead for one or more recipes indicated in information received in block 405. If so, the routine continues to block 430 to adjust the one or more automated control recipes to reflect one or more factors for the current situation. Such adjustments may include adjusting times, temperatures, or other aspects of the automated control recipes for one or more reasons, such as to reflect user preferences, an amount/size/shape of food being prepared, environmental conditions (e.g., altitude, humidity, external temperature, etc.), etc. The factors used for the adjustments may further be determined in various manners, such as based on input from the user and/or based on automated readings or other determinations of the ACC system.

After block 430, or if it was instead determined in block 425 that the instructions or information received in block 405 do not include automatically adjusting one or more automated control recipes, the routine continues to block 435 to determine whether the instructions or information received in block 405 include coordinating multiple automated control recipes and/or multiple cooking-related equipment pieces that are to be used together during a particular cooking episode, and if so continues to block 440. It will be appreciated that multiple automated control recipes may be those selected in block 420 and/or adjusted in block 430, or instead may be indicated as part of information received with respect to block 405. In addition, with respect to coordinating the use of multiple pieces of cooking-related equipment, those equipment pieces may be indicated by one or more currently selected automated control recipes, or may be otherwise indicated with respect to information received in block 405. In block 440, operations are performed to, if multiple automated control recipes are to be coordinated, coordinate the instructions of those automated control recipes in one or more manners in order to create a new integrated recipe, such as based on time to provide a single time-ordered set of instructions that can be issued to control equipment pieces in use and/or an associated user. Similarly, if multiple cooking equipment pieces are to be coordinated, the instructions of the one or more automated control recipes may be adjusted if needed to reflect the availability of the multiple cooking equipment pieces, such as to reflect instructions to provide the one or more users to move food between cooking equipment pieces or to otherwise coordinate the use of the multiple cooking equipment pieces in one or more manners. The resulting new integrated automated control recipe may be put into use as part of a current episode and/or stored for later use. In addition, a summary of a proposed cooking plan and/or total time required may be presented to the user for approval in at least some embodiments. The user may further optionally enter a desired time for all parts of a meal to be ready to serve in some embodiments, in order to obtain information about when to begin the cooking process to achieve that goal.

After block 440, or if it was instead determined in block 435 that the instructions or information received in block 405 are not to coordinate multiple automated control recipes and/or multiple cooking equipment pieces, the routine continues to block 445 to determine whether the instructions or information received in block 405 are to initiate a cooking episode, such as based on one or more automated control recipes selected in block 420 and/or adjusted in block 430 and/or generated as a new integrated recipe in block 440, or instead as indicated in the information received in block 405. If so, the routine continues to block 450 of FIG. 4B, and otherwise continues to block 490 to perform any other indicated operations as appropriate. Such other indicated operations may include, for example, retrieving one or more automated control recipes from an external Cooking Control Coordination Service or other external source, receiving and storing user preference information, sharing information (e.g., a new created automated control recipe, a photo or other indication of results of a user cooking episode, etc.) with one or more other indicated users or other external sources, specifying security information or procedures of one or more types, etc.

If it is determined in block 445 to initiate a cooking episode, the routine continues to block 450 to optionally determine if the indicated cooking episode is authorized. Such a determination may be based on various factors, such as to reflect configurations previously specified by the user or determined by the ACC system. For example, the ACC system may be configured to allow use of some or all cooking-related equipment only if a configured device is sufficiently proximate, such as if a user's smart phone (e.g., that is executing at least some of the ACC system) is in the same room as that cooking-related equipment or is otherwise within a specified distance or a range (e.g., based on signal strength or the ability to interact between the device and the cooking-related equipment using a particular type of signal) or in a specified location (e.g., based on GPS or other location information). In addition, a user may have specified a PIN or other security information that needs to be entered by a user initiating a cooking episode for at least some types of cooking-related equipment and/or types of cooking episodes, and if so the routine in block 450 may confirm whether such security information is received. Furthermore, the local ACC system copy and/or local cooking equipment pieces may be configured to initiate operation only if a predefined protocol is followed between a computing device and the control equipment pieces, such as the exchange of predefined secret information or other interactions, and if so the routine may determine in block 450 whether such a protocol is followed. It will be appreciated that a variety of other types of security or authorization methods may be used in other embodiments and situations. After block 450, the routine continues to block 455 to determine whether the indicated cooking episode is authorized, and if not, continues to block 495, optionally after providing a corresponding error message.

If it is determined in block 455 that the indicated cooking episode is authorized, or if such an authorization determination is not performed, the routine continues to block 460 to determine a type of cooking mode for the current cooking episode, and proceeds accordingly. In particular, if the indicated cooking episode includes a user performing manual manipulations of some or all of the control equipment to enable recording a new automated control recipe based on the user actions, the routine continues to block 468 to identify the beginning of the control equipment usage by the user (e.g., based on a user indication, or by detecting initial manipulation of one or more such control equipment pieces), and begins recording the control equipment usage actions taken by the user. The user may further specify information about particular cooking equipment pieces and food and other cooking-related materials being used, or the ACC system may be able to automatically determine at least some such information. In other embodiments and situations, a user may initiate a cooking episode that is based on manual actions of a user but without recording a new automated control recipe, and if so the ACC system may perform assistive actions in some such embodiments and situations without automatic control of any control equipment, such as to display a related instructional video but to allow the user to otherwise control the cooking episode. For example, it may be beneficial to show the user a graph of temperature during the cooking episode, to start a timer when it is detected that food has been added to a pan (e.g., based on a sudden drop in temperature), etc.

Alternatively, if the cooking mode determined in block 460 is to execute or play a previously defined automated control recipe, the routine continues to block 462 to obtain the automated control recipe and any associated information (e.g., an instructional video or photos to present to the user as part of the cooking episode). After block 462, the routine continues to block 464 to determine one or more control equipment pieces and cooking equipment pieces to use as part of the cooking episode, and instructs one or more associated users to prepare the cooking equipment pieces and any corresponding food and other materials to be used.

If is instead determined in block 460 that the indicated cooking mode is based on remote control of one or more cooking-related equipment pieces in a local cooking environment by one or more computing devices external to the local cooking environment, the routine continues instead to block 466 to receive an indication of the control equipment and cooking equipment to use, as well as food and other cooking-related materials that are needed, and to provide instructions for one or more users in the local cooking environment related to preparing the cooking equipment pieces and food and other cooking-related materials to be used.

After blocks 464 or 466, the routine continues to block 470 to initiate use of the control equipment for the automated control recipe being played or as otherwise instructed by the remote control from the one or more remote computing systems. As discussed in greater elsewhere, such control equipment usage may include activating and setting a particular amount of heat to be supplied to one or more cooking surfaces or other cooking locations, or using other types of control equipment. After blocks 468 or 470, the continues to block 472 to optionally monitor for any problems in the start-up phase of the cooking episode, such as to identify that a gas burner did not light correctly (e.g., based on using a microphone in a smart control knob or other smart control device to monitor for clicking sounds associated with the repeated attempt to light such a burner), to detect that a piece of cooking equipment or measurement equipment is not reflecting a correct amount of heating (e.g., is not correctly placed on the correct cooking surface or in the cooking location, based on not heating at all, heating partially or inconsistently, etc.; or is heating too fast, such as to reflect indicated food or other cooking-related materials not being placed in the cooking equipment as instructed), etc. If any such problems are detected, corresponding actions may be taken, such as to immediately shut off the relevant control equipment, to provide additional instructions or warning to a user participating in the cooking episode, to optionally track an amount of time (e.g., after a user warning or instructions) after which additional actions may be taken if the problem is not then corrected, etc.

After block 472, the routine continues to block 474 to determine the current pairings of control equipment and cooking equipment being used, such as in a manner described with respect to block 350 of FIG. 3 and elsewhere. In other embodiments, the determined pairing operations of block 474 may be performed instead at other times, such as before blocks 470 or 472, or instead may be performed repeatedly throughout the cooking episode to ensure that appropriate pairings or other associations continue throughout the cooking episode.

After block 474, if the cooking mode is to record a new automated control recipe, the routine continues to block 478 to continue recording the control equipment usage and corresponding measurements from any measurement equipment involved in the cooking episode, as well as to monitor in block 480 for any problems that occur during the cooking episode and to take appropriate actions if detected, with blocks 478 and 480 being repeated until the user indicates to stop recording or otherwise indicates the end of the cooking episode (e.g., by turning off all of the control equipment). Problems monitored for in block 480 may be similar to those discussed with respect to block 472, as well as to include additional types of problems, such as a change in security authorization for the cooking episode (e.g., if a smartphone or other device was in the vicinity of the cooking-related equipment at the beginning of the cooking episode but moves away from the cooking-related equipment during the cooking episode, such as for a minimum amount of time or a minimum distance; to determine rapid heating or cooling of particular cooking equipment or contents that are not expected, such as to reflect all of the liquid being boiled off in a piece of cooking equipment or a piece of cooking equipment being moved out of the correct location; etc.). If problems are identified, corresponding actions may be taken, such as to initiate a shutoff of some or all control equipment, and/or to provide an alert or other notification to a user (e.g., via a message sent to a smartphone device of the user, visual or auditory displays from a smart control knob or other smart control device in use, etc.).

In a similar manner to that described with respect to blocks 478 and 480, if the current cooking mode is play an automated control recipe or to allow remote control of the cooking-related equipment, the routine continues from block 474 to block 476 to provide instructions to the control equipment and any associated users as appropriate throughout the cooking episode, and to present or otherwise use any associated information in timed coordination for the automated control recipe, and with monitoring being similarly performed in block 480 for any problems that occur during cooking to enable corresponding appropriate actions to be taken if needed. Blocks 476 and 480 are similarly repeated for the play recipe cooking mode or remote control cooking mode until the automated control recipe is done, or the remote control instructions indicate that the cooking episode is done or otherwise terminate the remote control session. While not illustrated in FIGS. 4A-4B, it will be appreciated that a particular cooking episode may include a combination of one or more manual portions and one or more automated portions in some embodiments and situations, as discussed in greater detail elsewhere herein, and that blocks 460-480 may be modified accordingly in such embodiments and situations to accommodate the manual and automated portions.

After block 480, the routine continues to block 482 to take actions related to the end of the cooking episode, including shutting off any control equipment if needed, providing any final instructions to the user, etc. After block 482, if the cooking mode is the record mode, the routine continues to block 486 to store the new automated control recipe based on the recorded control usage actions, optionally along with corresponding measurements or other information available (e.g., images of the final results and/or intermediate steps of the cooking episode, such as may be supplied by the user throughout the cooking episode or at the end), such as in accordance with any user instructions. In addition, the routine in block 486 may further initiate actions to share the new created automated control recipe with one or more other users if so instructed.

While not illustrated in the current embodiment, the record mode may further be used in other manners, such as based on instructions by a user to record multiple distinct cooking episodes related to cooking the same or related dishes multiple times but with one or more variations for each attempt (e.g., different temperatures and/or times, different pieces of cooking equipment, etc.)—such multiple related cooking episodes may enable the user to evaluate the results of each of the related cooking episodes in order to select zero or one or a subset of the cooking episodes to be retained (e.g., a single best automated control recipe to use, two or more automated control recipes for use in different indicated situations or conditions, etc.). If so, the operations with respect to block 486 may include storing a current recording episode on a temporary basis until the multiple cooking episodes are completed and compared, after which one automated control recipe or a subset may be selected. In addition, the user may further in some embodiments optionally combine different subsets of different cooking episodes, such as to reflect different phases or stages in the cooking episode, as part of creating one overall new automated control recipe.

In a similar manner, if the indicated cooking mode is to play an automated control recipe or to use remote control, the routine continues from block 482 to block 488 to optionally obtain rating information or other feedback from the user regarding the results of the cooking episode and/or regarding the automated control recipe itself (e.g., to reflect that certain instructions are unclear or that other problems exist with the automated control recipe), and to store such feedback information for later use. The routine may further initiate other actions as appropriate based on such user feedback (e.g., to combine current feedback information in an aggregated manner with other feedback for other cooking episodes, such as from the same user and/or other users, as well as to initiate corrective action if sufficient feedback is received to reflect one or more problems with an automated control recipe). The routine may further take additional steps with respect to the play automated control recipe mode and/or the remote control mode to reflect problems with the results being less than optimal, based on information that is recorded and stored about measurements and user actions during the cooking episode. For example, as discussed in greater detail elsewhere, the routine may in some embodiments send information about such recorded measurements and user actions to one or more external human experts for review and possible suggested corrective actions to improve future results, such as when requested by the user or as otherwise automatically initiated by the ACC system, and in exchange for one or more fees paid by the user for such capabilities in some embodiments and situations. In addition, the ACC system may use such feedback or other information to perform various types of analyses with respect to multiple related user cooking episodes in some embodiments and situations, as discussed in greater detail with respect to FIG. 5.

After blocks 486, 488, or 490, or if the current actions are determined to not be authorized in block 455, the routine continues to block 495 to determine whether to continue, such as until an explicit indication to terminate is received. If it is determined to continue, the routine returns to block 405, and otherwise continues to block 499 and ends.

FIG. 5 is a flow diagram of an example embodiment of a Cooking-Related Analysis routine 500. The routine may be provided by, for example, execution of an embodiment of the Cooking-Related Analysis module 245 of the ACC system 240 of FIG. 2 and/or as part of the ACC system 190 of FIG. 1, such as to perform various types of automated analysis operations at various times. The operations of the routine 500 may be initiated by, for example, instructions of a user of an ACC system copy or instead based on an automated initiation by the ACC system.

The illustrated embodiment of the routine 500 begins at block 505, where instructions or other information are received. The routine continues to block 510 to determine the type of instructions or information, and to proceed accordingly. In particular, if the instructions or information received in block 505 include an indication to identify a problem with a particular user cooking episode, the routine continues to block 520 to obtain information about the user cooking episode and about one or more indicated problems (e.g., based on feedback from the user or other automated determination of such problems), and identifies possible suggested corrective actions to be taken by the user by comparing information about measurements and user actions taken during the user cooking episode with those of other related successful cooking episodes in order to determine differences that may result in the indicated problems, or instead by supplying such information to one or more human reviewers and obtaining corresponding information from them. After one or more suggested corrective actions are identified, they are provided to the user, or instead information is indicated to the user that suggested corrective actions were not identified in a current situation.

If it is instead determined with respect to block 510 that the instructions or information received with respect to block 505 include an indication to identify adjustments to be made for an automated control recipe to reflect problems that have repeatedly occurred in multiple user episodes, the routine continues to block 530 to obtain information about those multiple user cooking episodes and their corresponding problems, as well as to obtain information about multiple other related user cooking episodes that were successful for the same or similar automated control recipes. For example, such a recipe adjustment may be determined to be initiated based on bimodal feedback ratings being received for a particular automated control recipe, such that a first group of users report successful results while a second group of users report problems, to enable analysis and comparison of the information for the users in the second group to the information for the users in the first group. The routine in block 530 further attempts to identify differences between the successful user cooking episodes and the unsuccessful user cooking episodes to determine differences that would reflect persistent problems with actions of the users in the second group and/or persistent problems with respect to cooking equipment used by users in the second group, and to adjust the automated control recipe if possible to minimize or eliminate the differences for future use. If so, the adjusted automated control recipe may be automatically saved for future use, such as replace the prior version of the automated control recipe, or instead may be submitted for further manual approval before such use.

If it is instead determined in block 510 that the instructions or information received with respect to block 505 are to analyze the cooking performance of particular cooking equipment, the routine continues to block 540 to obtain information about the cooking performance of the cooking equipment and to analyze that performance, such as by comparing its performance to performance information from comparable other cooking equipment pieces to identify differences that reflect possible problems, and to take corresponding actions if appropriate. For example, with respect to a particular target cooking surface or cooking location, the ability of that target cooking location to heat a target cooking equipment piece in the cooking location may be compared to that of other comparable cooking surfaces or cooking locations and other comparable cooking equipment pieces, such as to identify if the target cooking location has capabilities that differ from those of the comparable equipment by at least a minimum threshold amount—if possible problems with the target cooking location and/or target cooking equipment are identified, an associated user may be notified. As another example, performance of a target cooking equipment piece may indicate that it heats or cools in a non-uniform or non-linear manner, such as to reflect possible problems with the composition of the cooking equipment or a persistent user placement error of the cooking equipment in a corresponding cooking location. In addition to reporting information to the user about possible problems, corresponding actions in particular situations may include automatically shutting off or otherwise preventing use of a particular piece of cooking-related equipment, or storing information for use in adjustments of automated control recipes with that cooking-related equipment (e.g., to adjust heating times if a particular piece of heating equipment consistently performs above or below the expected performance for that equipment).

If it is instead determined with respect to block 510 that the instructions or information received with respect to block 505 are to analyze the use of a grill with respect to one or more factors of interest, the routine continues to block 550 to obtain and analyze usage and performance information for the grill equipment to determine the one or more types of performance information of interest. For example, the heating efficiency of a particular grill may be measured and compared to that of other comparable grills, with corresponding information being provided to a user, such as to enable the user to correct problems with the grill or to replace an inefficient grill model with a more efficient one. In addition, the analysis in block 550 may in some embodiments include estimating or otherwise measuring an amount of cooking fuel that has been used over a period of time (e.g., since a new fuel tank of a specified capacity was put into use with the grill), to enable estimation of an amount of cooking time or cooking fuel left, including to indicate to a user whether sufficient fuel is likely available for one or more indicated planned cooking episodes before those cooking episodes are initiated. Corresponding information from the analysis may similarly be provided to a user, stored, or otherwise used as appropriate, including to perform operations similar to those discussed with respect to block 540 if appropriate.

If it is instead determined in block 510 that one or more other types of instructions or information are received in block 505, the routine continues instead to block 590 to perform one or more of those other indicated types of operation as appropriate. Such other indicated operations may include, for example, analyzing information about a user's food intake or eating patterns for various purposes, such as to provide recommendations of corresponding automated control recipes and/or related foods to the user, to identify possible eating improvements or alternative foods to consider, etc. Such food-related information and analyses may further be used in additional manners in some embodiments, including to provide to the Cooking Control Coordination Service or other external computing systems, optionally after user approval and/or after removal of user-specific identifying information (e.g., by aggregating together information for multiple users). It will be appreciated that other types of analysis of information about cooking episodes may be performed and used in other manners in other embodiments.

After blocks 520, 530, 540, 550, or 590, the routine continues to block 595 to determine whether to continue, such as until an explicit indication to terminate is received. If it is determined to continue, the routine continues to block 505, and otherwise continues to block 599 and ends.

Those skilled in the art will also appreciate that in some embodiments the various described systems and modules may each perform functionality that may be expressed in one or more routines, such as to perform various steps or operations in various manners (e.g., in serial or in parallel, in a synchronous or asynchronous manner, in a particular order, in real-time or not, etc.), including as is discussed above. It will also be appreciated that in some embodiments the functionality provided by the routines discussed above may be provided in alternative ways, such as being split among more routines, being executed at different times and/or in different locations (e.g., executed after a cooking episode is completed in a cooking environment to perform further analysis, either locally in that cooking environment or in a remote embodiment of Cooking Control Coordination service), etc. Similarly, in some embodiments the illustrated routines may provide more or less functionality than is described. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

FIG. 6 shows a food preparation system 600, according to one example embodiment, in connection with which the automated cooking control systems and techniques described above may be used. The food preparation system 600 includes a cooking unit 610 having a cooktop 614 that defines a cooking environment 612 with at least one cooking location 620*a*-620*d* or surface within or upon which to receive temperature sensing cooking equipment 630. In this example embodiment, the cooking unit 610 is shown as a stove having a cooktop with four independently controlled gas burners 622*a*-622*d*. A piece of temperature sensing cooking equipment 630 in the form of a temperature sensing pan is shown supported above one of the gas burners 622*d*. An example food item 632 is shown received in the piece of temperature sensing cooking equipment 630 for cooking. In other example embodiments, the cooking unit may include a cooktop with at least one cooking surface provided by an induction or radiant electric cooking device, and a piece of temperature sensing cooking equipment, such as a temperature sensing pan, may be positioned on or above the cooking surface.

With continued reference to FIG. 6, a plurality of control devices 640a-640d, each in the form of a knob or dial, are coupled to the cooking unit 610 to independently control a flow of fuel to a respective one of the burners 622a-622d so as to adjust the amount of heat supplied to the respective cooking locations 620a-620d within the cooking environment 612 during cooking episodes. In other example embodiments, control knobs or other control devices may be provided in connection with induction or radiant electric cooking systems and may be configured to adjust a heat output of the induction or radiant electric cooking systems during cooking episodes, such as, for example, adjusting voltage, current, frequency, etc. of a power source that produces the heat output.

With reference again to FIG. 6, a computing device 650 in the form of a tablet computer is shown in the vicinity of the cooking environment 612, namely on a counter 652 next to the cooktop 614 of the cooking unit 610. Aspects and/or modules of the ACC systems described herein may execute on the computing device 650 to provide at least some of the functionalities described herein. As an example, the ACC system may execute on the computing device 650 and may be configured to receive temperature information wirelessly from the piece of cooking equipment 630 during a cooking episode, as indicated by the wireless signal labeled 658 in FIG. 6. The ACC system may also be configured to provide cooking adjustment information for adjusting one or more of the plurality of control devices 640a-640d during the cooking episode based at least in part on the received temperature information. For example, in some embodiments, the ACC system may receive temperature information from the piece of cooking equipment 630 throughout at least a portion of a cooking episode from which a temperature profile history of the piece of cooking equipment 630 may be monitored and recorded. The temperature profile history of the piece of cooking equipment 630 may be directly or indirectly indicative of the temperature of the food item 632 received therein. The ACC system may then provide cooking adjustment information for adjusting a corresponding one of the plurality of control devices 640a-640d during the cooking episode for approaching and arriving at a desired temperature and/or maintaining a desired temperature for a select period of time in connection with one or more cooking activities, for example. Various control algorithms may be employed such that, for example, a control device 640a-640d may be automatically manipulated to bring the piece of cooking equipment 630 to a desired temperature in a particularly steady, accurate and consistent manner.

According to some embodiments, control algorithms employed may manipulate a control device 640a-640d in response to deviations from the desired temperature, rates of change of deviation from the desired temperature, past history of deviation from the desired temperature and other parameters in a manner that is different when the actual temperature of the cooking equipment 630 is or has been above the desired temperature than when the actual temperature is or has been below the desired temperature.

According to some embodiments, optimal or otherwise desirable parameters of the control algorithms for a may be inferred or learned based on sensor data collected in a plurality of past cooking episodes on the cooking unit 610 and stored in non-volatile memory on a plurality of computing devices 650 in a plurality of cooking environments, on a plurality of control devices 640a-640d in a plurality of cooking environments, or other computing devices and systems external to the cooking environment via one or more external networks (e.g., the Internet). According to some embodiments this data includes data collected from cooking episodes initiated by a plurality of users. According to some embodiments these parameters will be learned or inferred by algorithms running on the computing device 650, the control devices 640a-640d or other computing devices and systems external to the cooking environment via one or more external networks (e.g., the Internet) or a distributed combination of such devices working cooperatively.

Figure 21:
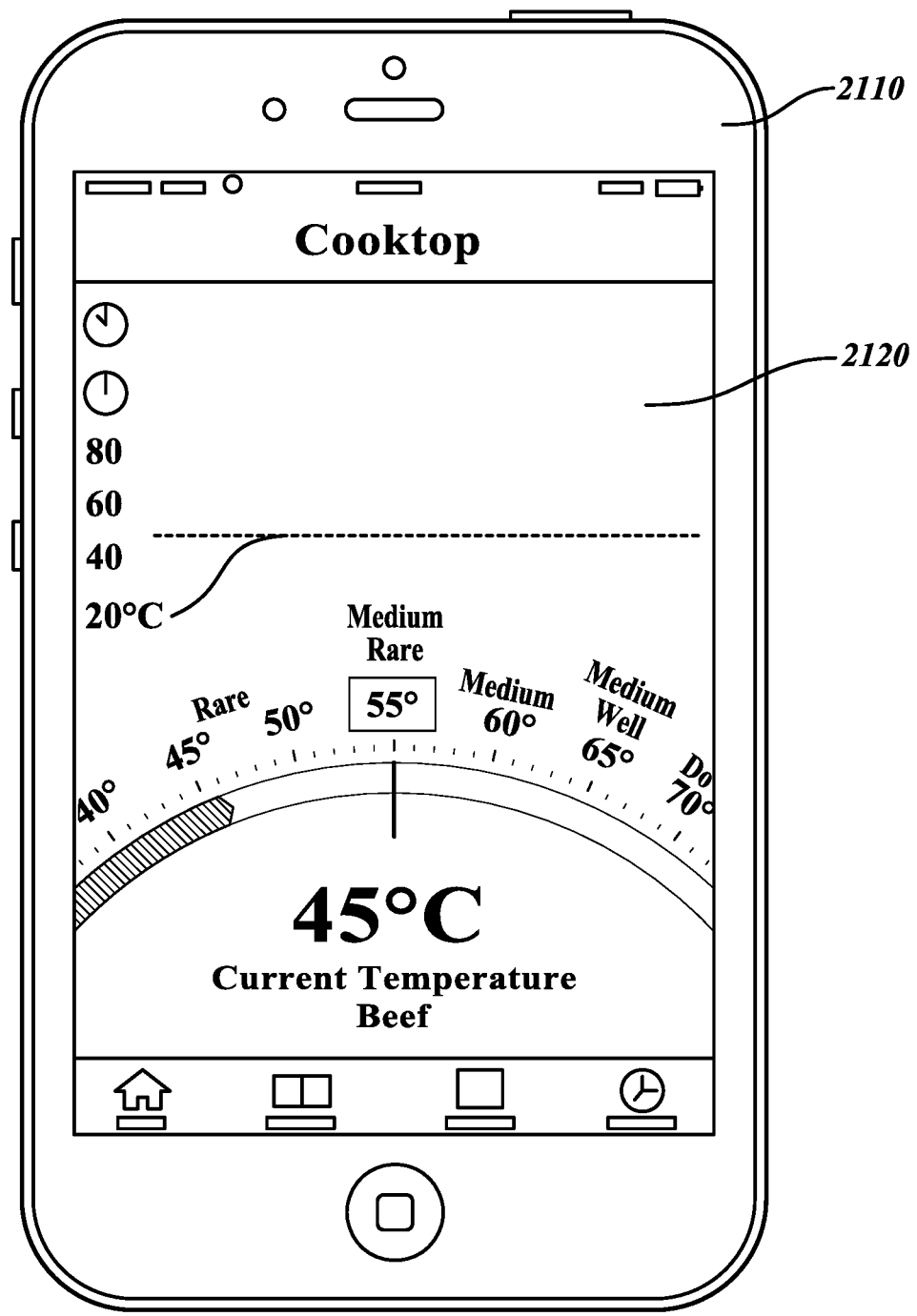
FIG. 21 illustrates a mobile computing device and an example of a user interface with which the described automated cooking control techniques may be used.

According to some embodiments, the cooking information generated by the ACC system may include visual cooking information or cooking instructions that are conveyed to a user through one or more display units, such as a display of the computing device 650 itself, a separate display 611 on the cooking unit 610, and/or displays 642a-642d of the control devices 640a-640d. The cooking information or cooking instructions may include, for example, an indication of a current temperature reading, a target temperature reading, a time remaining until arrival at a desired temperature, an elapsed time at the desired temperature or other information to assist in cooking activities. The cooking information or cooking instructions may include discrete instructions specific to particular food items or dishes, such as, for example, a "time to flip" instruction for preparing steak to a desired doneness. An example screenshot from a GUI displayed on a mobile computing device is shown in FIG. 21, and other screenshots (not shown) from such an example GUI may further illustrate additional types of information and functionality, including to display cooking information and instructions to a user.

In some embodiments, different cooking information and/or cooking instructions may be displayed simultaneously on more than one of the control devices 640a-640d for each of the cooking locations 620a-620d that may be active in the particular cooking episode. In this manner, a user may use multiple burners 622a-622d of the cooking unit 610 simultaneously to coordinate the preparation of multiple dishes or ingredients and/or to facilitate the preparation of relatively more complex dishes or food items.

When provided, the display on each respective control device 640a-640d may be centrally located and a circumferential dial 644a-644d may be provided at the periphery of the control device 640a-640d to rotate about a central portion 646a-646d. The circumferential dial 644a-644d may be coupled to a corresponding shaft of the heat source adjustment assembly of the cooking unit 610, such as, for example, a "D" shaft of the heat source adjustment assembly. In other embodiments, the control devices 640a-640d may have a variety of different forms and may resemble various knobs and/or dials of conventional stoves and the other cooking appliances.

According to some embodiments, one or more of the control devices 640a-640d may further include an audio input device (not shown) that is configured to receive audio signals for adjusting the control devices in response to cooking adjustment information provided by the cooking control system during the cooking episode. For example, cooking information provided by the ACC system may prompt a user to adjust a temperature of one or more cooking locations and the user may instruct or command the respective control device to move to a different position via spoken commands (e.g., "set front right burner to 50%") using, for example, speech recognition occurring on the computing device 650, on the control devices 640*a*-640*d* themselves, or computing devices and systems external to the cooking environment via one or more external networks (e.g., the Internet). In some embodiments, one or more of the control devices 640*a*-640*d* may further include an audio output device (not shown) that is configured to output an audible signal containing cooking adjustment information provided by the ACC system during a cooking episode (e.g., "time to stir contents on front right burner"). In some embodiments, cooking adjustment information provided by the ACC system may be communicated to a user by audio signals generated by an audio output device of the computing device 650 itself.

According to some embodiments, the cooking information generated by the ACC system may include instructions for manually manipulating the control devices 640*a*-640*d* based at least in part on the received temperature information. In such instances, each of the control devices 640*a*-640*d* may include or operate in the vicinity of a respective position sensor (not shown). When provided, each position sensor may be communicatively coupled to the ACC system to communicate data indicative of a position of the respective control device 640*a*-640*d* to the ACC system upon manual adjustment of the control device 640*a*-640*d* for positional feedback purposes. Supplemental cooking instructions may then be provided by the ACC system based on such positional feedback, and a user may continue to manually adjust each control device 640*a*-640*d* until a desired position thereof is reached. In some instances, a display may be provided on one or more of the control devices 640*a*-640*d*, a portion of the cooking unit 610, and/or the computing device 650 to display positional feedback information to assist a user in manually adjusting the control devices 640*a*-640*d* to desired positions during a cooking episode.

Figure 12:
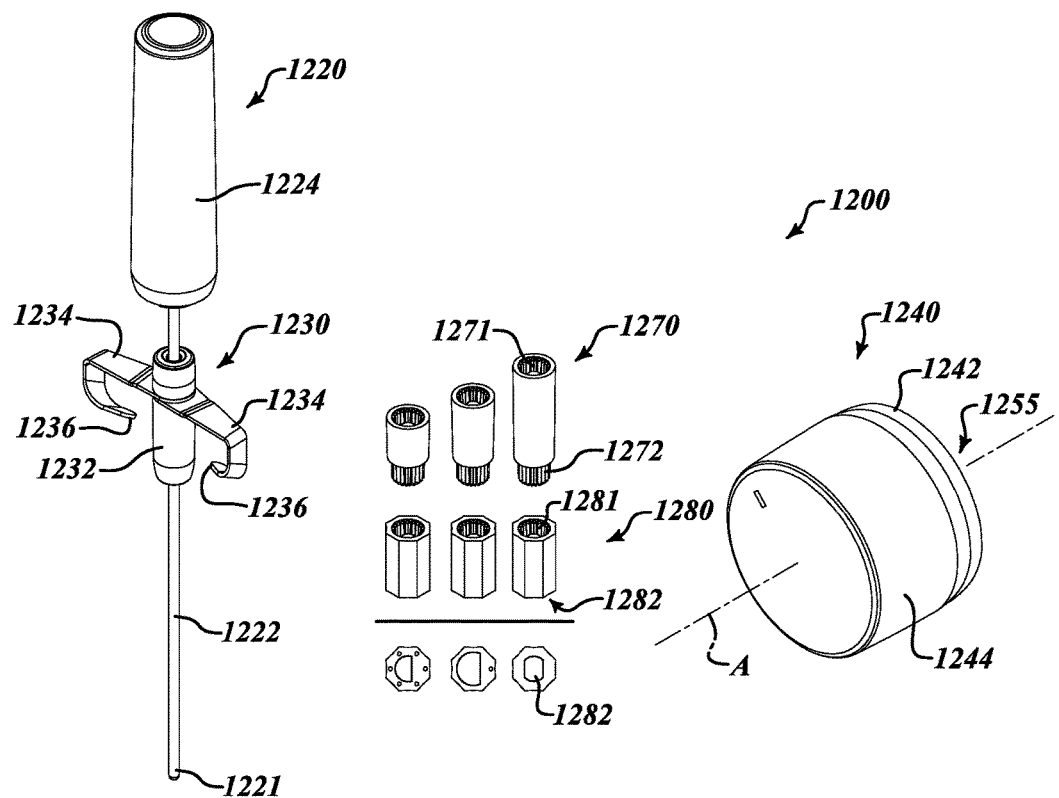
FIG. 12 is an isometric view of components of a food preparation system, according to one example embodiment, which includes a temperature probe, a probe mounting device for attaching the probe to a piece of cooking equipment (e.g., a pot or a pan), and a control device in the form of a control knob for controlling a burner of a conventional a stove or other heating location of a cooking apparatus or appliance.
Figure 14:
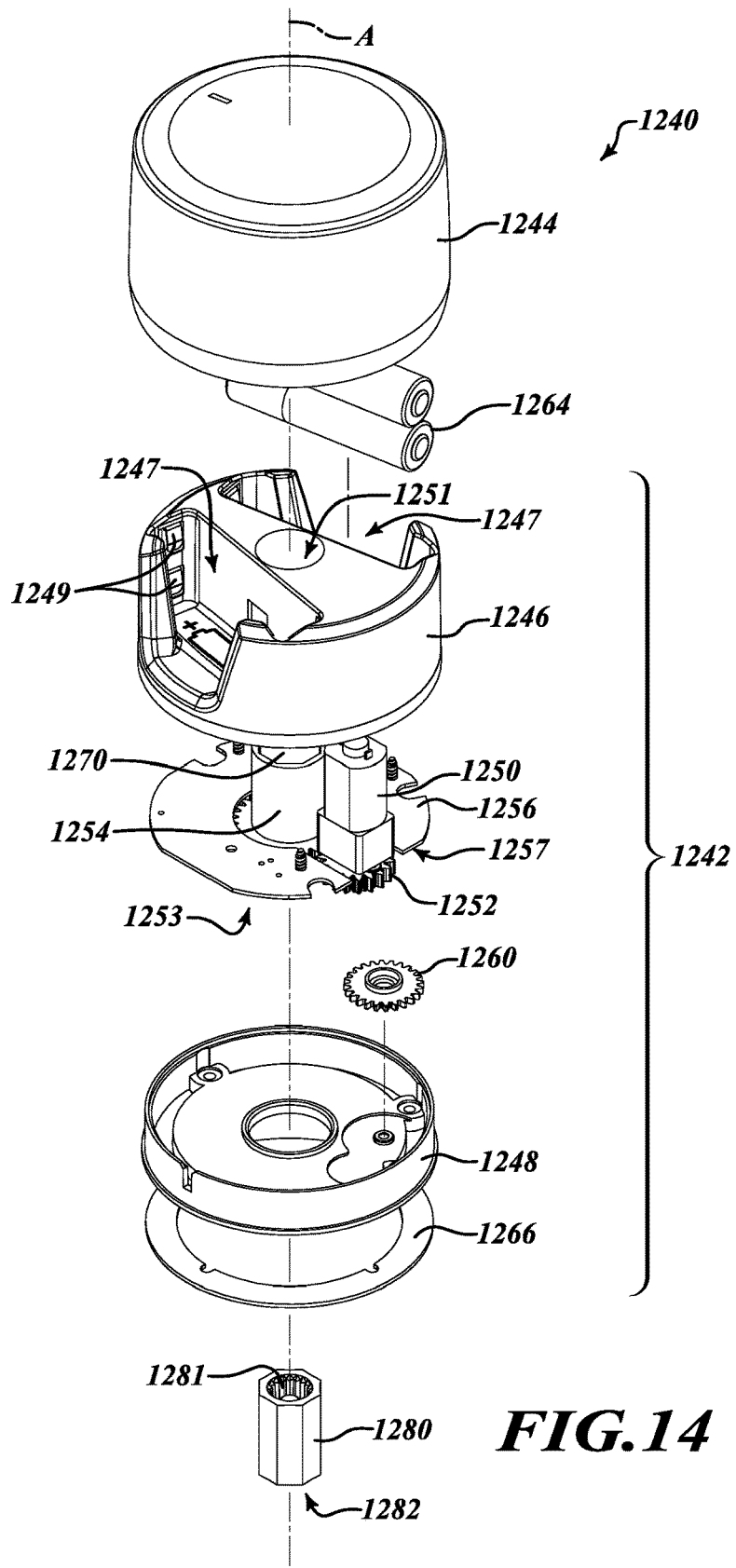
FIG. 14 is an exploded isometric view of the control knob shown in FIG. 12 from a top perspective.
Figure 15:
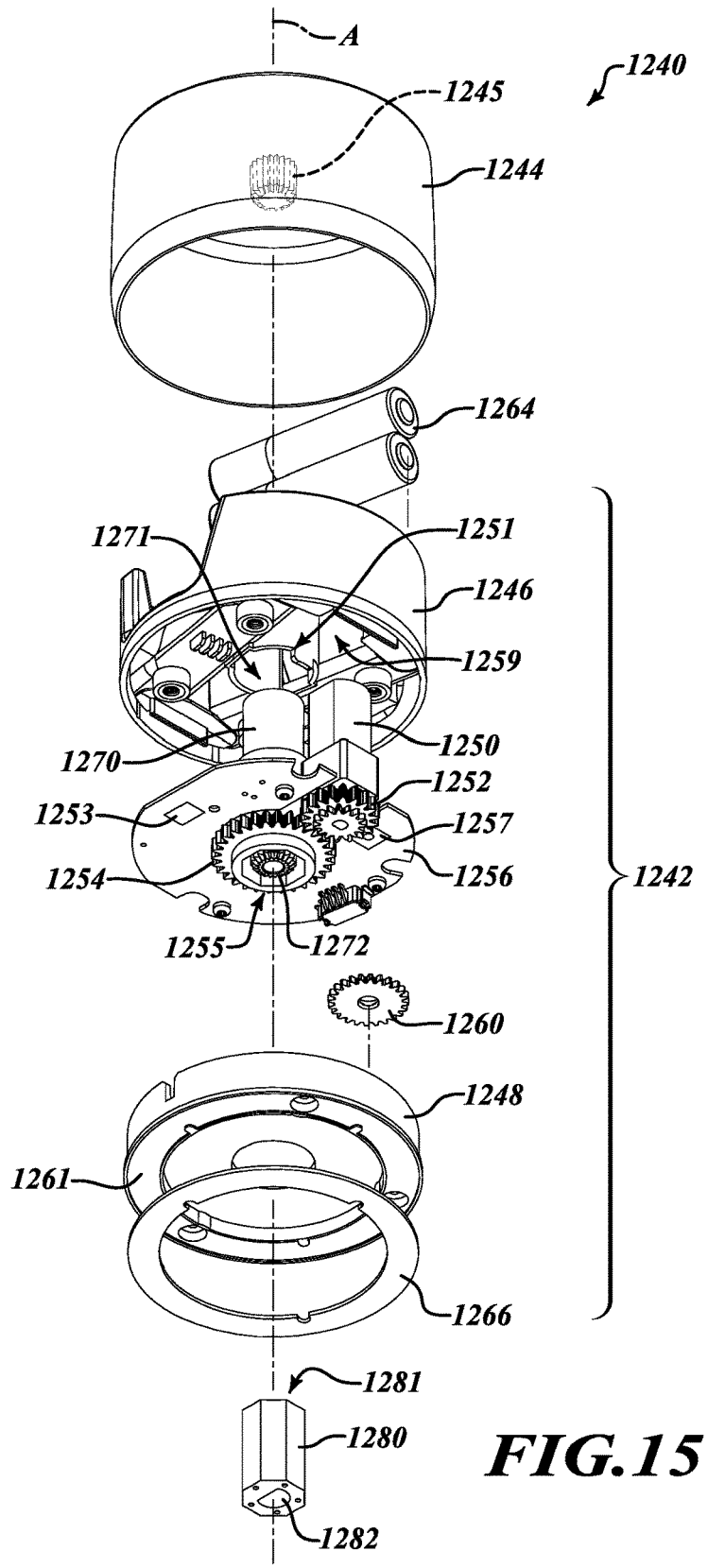
FIG. 15 is an exploded isometric view of the control knob shown in FIG. 12 from a bottom perspective.

According to some embodiments, the cooking information generated by the ACC system may include instructions for automatically manipulating the control devices 640*a*-640*d* based at least in part on the received temperature information. In such instances, each of the control devices 640*a*-640*d* may be provided with a motor (e.g., a stepper motor) that is configured to rotate a shaft of a heat source adjustment assembly of the cooking unit 610 in response to the cooking adjustment information provided by the ACC system. More particularly, the motor may include a drive shaft coupler that is sized and shaped to interface with a corresponding shaft of the heat source adjustment assembly of the cooking unit 610, such as, for example, a "D" shaft of the heat source adjustment assembly. In some instances, the drive shaft coupler of the motor may resemble that of D shaft knobs of conventional stoves and other cooking appliances. When a motor is provided, a base portion of the motor may be fixedly secured to the cooking unit 610 and/or a portion of an adjacent one of the control devices 640*a*-640*d* to fix the base portion of the motor while the drive shaft is enabled to rotatably drive the corresponding shaft of the heat source adjustment assembly. As an example, a key may extend from the base portion of the motor or other portion of the control device 640*a*-640*d* to which the base portion is fixedly coupled to engage a face or other portion of the cooking unit 610. In other instances, a stabilizing bar, plate, bracket or other structure may extend between adjacent control devices 640*a*-640*d* to effectively lock the base portions of the motors of the adjacent control devices 640*a*-640*d* from rotating while each drive shaft is able to selectively drive a respective adjustment assembly of the cooking unit 610. In other instances, the base portion of the motor may be fixed to a base assembly of the control device which in turn is fixedly secured to a face or other portion of the cooking unit 610 via adhesive or other joining device or technique. One example embodiment of such a control device is shown in FIGS. 12, 14 and 15 in the form of a control knob 1240. As can be appreciated from FIGS. 14 and 15, the control knob 1240 shown therein includes a base assembly 1242 including among other features, a drive motor 1250, a printed circuit board assembly (PCBA) 1256, and a power supply 1264. The control knob 1240 is configured to be fixedly secured directly to a cooking unit (e.g., via non-marking adhesive 1266 or the like) and is operable to rotate an internal drive shaft 1270 of the control knob 1240 via a drive gear 1254 meshed with a pinion 1252 of the drive motor 1250. The internal drive shaft 1270 is coupleable via one or more couplers or adapters 1280 to a control shaft of the cooking unit (not shown) which is associated with a respective burner or cooking location. A control knob cover 1244 is provided to cover the base assembly 1242 and provides a user-manipulatable control for alternatively adjusting the control knob 1240 manually. More particularly, according to the example embodiment shown in FIGS. 12, 14 and 15, the cover 1244 is operatively coupled to the motor 1250 via the internal drive shaft 1270 that is keyed or otherwise configured to rotate in unison with the drive gear 1254 about an axis of rotation A. The cover 1244 may include a coupling feature 1245 (e.g., a spline arrangement) shaped to engage a corresponding feature provided at a distal end 1271 of the internal drive shaft 1270, as illustrated in FIG. 15. The opposing end 1272 of the internal drive shaft 1270 may include a coupling feature (e.g., a spline arrangement) for engaging and rotating in unison with one of a variety of different couplers or adapters 1280. For this purpose, one end 1281 of the coupler or adapter 1280 may include a corresponding coupling feature and the opposing end 1282 of the coupler or adapter 1280 may have a different coupling feature (e.g., a D-shaped or other shaped keyway) for engaging the control shaft of the cooking unit (not shown) which is associated with a respective burner or cooking location. The external profile of the couplers or adapters 1280 may be sized and shaped to engage a corresponding aperture 1255 provided in the drive gear 1254. For example, the couplers or adapters 1280 may have an octagonal cross-sectional profile for engaging an aperture in the drive gear 1254 having a similarly sized octagonal cross-sectional profile, as shown in FIG. 15.

As can be appreciated from FIG. 12, a kit may be provided which includes a variety of different couplers or adapters 1280 each having a different shaped coupling feature at end 1282 for enabling a user to selectively attach the control knob 1240 to any of a variety of control shafts of conventional cooking appliances having a corresponding coupling feature. A few select profiles of such coupling features are shown in FIG. 12. In addition, the kit may include a variety of drive shafts 1270 having different lengths to accommodate variations in the length of the control shafts of various conventional cooking appliances. In this manner, a user may pair one of a selection of couplers or adapters 1280 with one of a selection of drive shafts 1270 to configure the control knob 1240 for attaching securely to the control shaft of the user's particular cooking appliance. A user need only remove the pre-existing knob provided with his or her conventional appliance and position the control knob 1240 onto the exposed control shaft of the appliance such that it mates with the coupler or adapter 1280 while securing the control knob 1240 to a face of the appliance with the adhesive 1266. Once installed, the control knob 1240 may be controlled to move via the control systems and methods described herein or alternatively may be adjusted manually by a user by manipulating the cover 1244 of the control knob in a manner similar to adjusting the knob provided with the appliance that was replaced. As such, the control knob 1240 provides a versatile device for controlling a select burner or cooking location in a particular compact and efficient form factor.

To facilitate alternative manual and automated control of the control knob 1240, the control knob 1240 may further include a position sensor including, for example, an encoder 1257 (e.g., magnetic encoder, optical encoder, resistive encoder or other encoder) for detecting a rotational position of the user-manipulatable cover 1244 relative to the base assembly 1242 to provide positional feedback information, such as, for example, via detection of an encoder gear 1260 driven by the drive motor 1250 during automated adjustments and by manual rotation of the cover 1244 and the drive gear 1254 during manual adjustments. In this manner, even after manual adjustments of the control knob 1240, the system is able to determine the precise position of the manipulatable portion (e.g., cover 1244) of the control knob 1240 and make subsequent automated movements based thereon. The control system may also be configured to detect physical interaction by a user, such as feedback signals generated as the motor 1250 experiences certain increases or decreases in resistance when a user attempts to manually adjust the control knob 1240. In some instances, the system may detect manual interaction from a user based on the amperage to advance the motor 1250 exceeding a defined threshold, or possibly based on detecting a change in magnetic encoder values within the control knob 1240. In such instances, automated movement of the control knob 1240 may be temporarily suspended or disabled and the motor 1250 may be disengaged accordingly.

Figure 13:
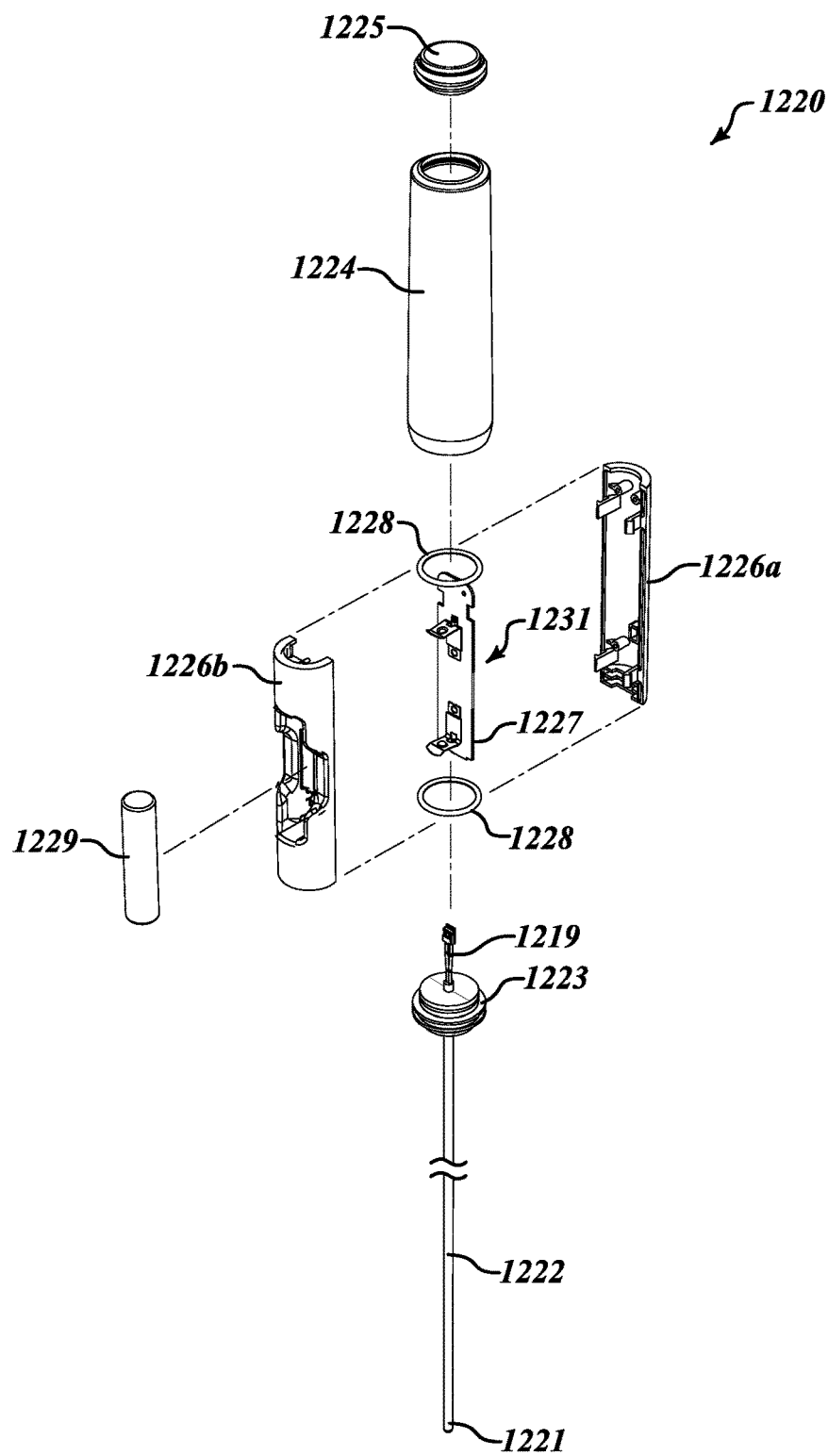
FIG. 13 is an exploded isometric view of the temperature probe shown in FIG. 12.

With reference to FIGS. 14 and 15, the control knob 1240 further includes a wireless communication device 1253 (e.g., Bluetooth module) such that the control knob 1240 may, among other things, receive control information and/or instructions based on temperature data acquired with a piece of temperature sensing cooking equipment, such as, for example, the temperature sensing pan 630*a*, as shown in FIG. 6 and discussed in detail further below, or a temperature sensing probe 1220, as shown in FIGS. 12 and 13 and described in further detail elsewhere.

With continued reference to FIGS. 14 and 15, the base assembly 1242 may include a plurality of base housing portions 1246, 1248 that are coupleable together via snaps, fasteners or other fastening devices or techniques to accommodate or otherwise support some or all of the aforementioned functional components of the knob 1240 (e.g., the power source 1264, PCBA 1256, drive motor 1250, encoder 1257, wireless communication module 1253). As shown in FIGS. 14 and 15, one of the base housing portions 1246 may include or define one or more cavities 1247 for receiving the power source (two of four AAA batteries being illustrated), which may be removably received therein to make contact with electrical contacts 1249 that are electrically coupled to the PCBA 1256 for supplying power to the electrical components of the control knob 1240. The base housing portion 1246 may also include a central cavity 1251 to accommodate the drive shaft 1270 and a motor cavity 1259 for the drive motor 1250. Another base housing portion 1248 may provide a base flange 1261 upon which the adhesive 1266 is provided for attaching the control knob 1240 to a host cooking appliance. The base housing portions 1246, 1248 may nest together to capture and rotationally support the drive gear 1254 and to at least partially enclose the PCBA 1256.

With reference to FIG. 12, one or more control knobs 1240 may be provided in a kit 1200 with a variety of drive shafts 1270 and adapters 1280 for selectively securing the one or more control knobs 1240 to a wide variety of conventional cooking appliances, as discussed earlier. In some instances, the kit 1200 may further include one or more temperature probes 1220 for use in connection with the one or more control knobs 1240 and one or more probe mounting devices 1230 for mounting the one or more temperature probes 1220 to a piece of cooking equipment or other structure for obtaining temperature data from a cooking location. Advantageously, the kit 1200 provides a collection of devices in compact and robust form factors to facilitate aspects the cooking systems and methods described herein, including the automated control of one or more burners of a stove or other cooking appliance.

Further details of the example piece of temperature sensing cooking equipment 630 from the example food preparation system 600 of FIG. 6 are shown in FIGS. 7 and 8. As can be appreciated, the temperature sensing cooking equipment 630 may be provided in the form of a pan 630*a*. The pan 630*a* may include a base 660 and a sidewall 662 that collectively define a receptacle 664 to receive food items for cooking activities. The pan 630*a* may further include a handle 666 for manipulating the pan 630*a* in a cooking environment, such as the cooking environment 612 defined by the cooking unit 610 of FIG. 6. In some instances, such as the example pan 630*a* of FIGS. 7 and 8, the handle 666 may extend away from the base 660 and the sidewall 662 in a cantilevered manner. In some instances, more than one handle 666 may be provided. The handle 666 or handles may take on a variety of forms and shapes.

Figure 9:
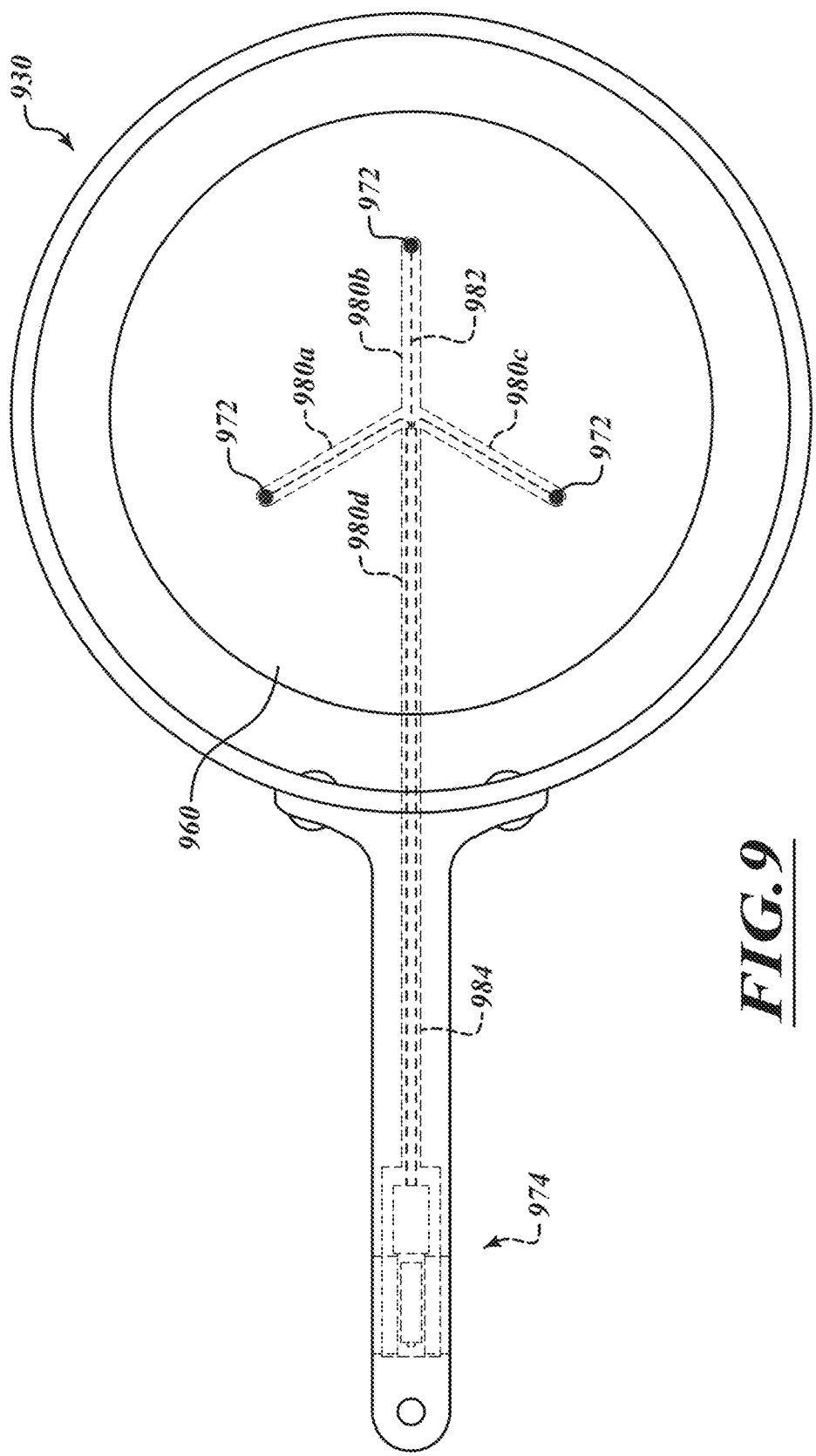
FIG. 9 is a top plan view of a piece of cooking equipment, according to another embodiment.

With continued reference to FIGS. 7 and 8, the pan 630*a* may further include a temperature sensor 670 (e.g., a thermocouple or thermistor) integrated into the base 660 to sense temperature information indicative of a temperature of the pan 630*a* and/or a food item received on a cooking surface 668 of the pan 630*a* within a cooking location 670. According to the example embodiment of FIGS. 7 and 8, the pan 630*a* includes a single temperature sensor 672 in the form of a thermocouple having a lead end or hot junction located in a center area of the base 660 within the cooking location 670 and below the cooking surface 668. It is appreciated, however, that a plurality of temperature sensors 672 may be distributed within the base 660 in various arrangements and may be used to collectively gather temperature data indicative of the amount of heat or energy that is being supplied or applied to one or more food items during cooking activities. As an example, the variation of the example pan 930 shown in FIG. 9 includes three temperature sensors 972 in the form of thermocouples each having a respective lead end or hot junction that are distributed in a circular array within the base 960 in equal intervals. Readings from the temperature sensors 972 may be averaged or otherwise evaluated relative to each other to provide temperature information. For example, in some instances, readings from one or more of the temperature sensors 972 may be used to check or confirm the accuracy of one or more of the other temperature sensors 972 by providing a comparable baseline reading or readings.

With reference again to FIGS. 7 and 8, the pan 630*a* may further include a wireless communication module 674 that is provided in or coupled to the handle 666 to communicate the temperature information derived from the pan 630*a* to the ACC system such that at least one characteristic of a cooking environment, such as, for example, the cooking environment 612 defined by the cooking unit 610 shown in FIG. 6, may be adjusted during a cooking episode based at least in part on the communicated temperature information. The wireless communication module 674 may include a wireless transmitter 676 (e.g., an RF transmitter) and a power source 678 (e.g., a battery) for powering the wireless transmitter 676 and/or other circuitry components. The wireless communication module 674 may be concealed or sealed entirely within the handle 674, and may be removably or irremovably coupled thereto. In some embodiments, the wireless communication module 674 may be positioned at a distal end 675 of the handle 674, and may be insulated from the receptacle 664 that is defined by the base 660 and sidewall 662. The distal end 675 of the handle 666 may further include an aperture or hole 677 through which the pan 630*a* can be hung for storage.

According to some embodiments, a heat sink (not shown) may also be provided and coupled to the power source 678 of the wireless communication module 674, and may be configured to recharge the power source 678 using heat obtained from an external heat source during one or more cooking episodes.

With continued reference to FIGS. 7 and 8, the base 660 of the pan 630*a* may include a base passage 680 that extends between a first location 681 underlying the cooking surface 668 and a second location 683 at or near a periphery of the receptacle 664. The handle 666 may also include a handle passage 684 in communication with the base passage 680. The temperature sensor 672 may be a thermocouple having a lead end or hot junction that is positioned at the first location 681 at the one end of the base passage 680, an intermediate portion 682 that extends through the base passage 680 and the handle passage 684 toward the wireless communication module 674, and a cold junction located at or near the wireless communication module 674. The temperature sensor 672 may be communicatively coupled to the wireless communication module 674 in the handle 666 to enable temperature information sensed by the temperature sensor 672 to be transmitted from the pan 630*a* by the wireless communication module 674, as indicated by the wireless signal labeled 658. The temperature information may relate to differential temperature readings between a lead end or hot junction of the temperature sensor 672 within the base 660 and an opposing end or cold junction in the handle 666.

More than one base passage 680 may be provided in embodiments that have more than one temperature sensor 672. For example, the pan 930 shown in FIG. 9, which includes three temperature sensors 972 in the form of thermocouples each having a respective lead end or hot junction that are distributed in a circular array within a base 960, may include a separate passage or passage portion 980*a*-980*c* for each of the temperature sensors 972. The separate passages or passage portions 980*a*-980*c* may combine into a common passage portion 980*d* before interfacing with a handle passage 984 that leads to a wireless communication module 974. In other embodiments, separate passages may run from the temperature sensors 972 to separate handles (not shown) of multi-handled cookware and may connect the sensors 972 to more than one wireless communication module 974, for example.

According to some embodiments, and with reference again to FIGS. 7 and 8, the pan 630*a* may further include a weight sensing arrangement (not shown) communicatively coupled to the wireless communication module 674 to sense a weight of the food item or items received in the pan 630*a* and to communicate such weight information to the ACC system. In some instances, the weight sensing arrangement may be provided in the handle 674 and may include at least one strain gauge arranged to sense an approximate weight of the food item or items based on deformation of the handle 674 with the pan 630*a* in a lifted configuration. The weight sensing arrangement may further include an accelerometer or other device to account for or to compensate for motion of the pan 630*a* when obtaining weight information. In other embodiments, a weight measurement device or apparatus may be provided apart from the pan 630*a* to obtain and communicate weight data to the ACC system independent of the pan 630*a*. For example, a separate scale with data communication functionality may be provided in some embodiments of the food preparation systems described herein. Cooking information or instructions provided by the ACC system can be modified or supplemented with use of the obtained weight information.

According to some embodiments, the pan 630*a* may further include a supplemental sensor (not shown) communicatively coupled to the wireless communication module 674 to sense non-temperature information about the food item or items received in the pan 630*a* and to communicate such information to the ACC system. For example, a moisture sensor may be integrated into the pan 630*a* to sense moisture characteristics of one or more food items received in the pan 630*a*. As another example, a color sensor may be integrated into the pan 630*a* to sense a color or color profile of one or more food items received in the pan 630*a*. As yet another example, a chemical sensor may be integrated into the pan 630*a* to sense acidity, alkalinity, and/or other properties related to the flavor of one or more food items received in the pan 630*a*. The ACC system may modify or augment cooking instructions or cooking information based on non-temperature information received from the supplemental sensor.

According to some embodiments, the pan 630*a* may further include an audio input device (not shown) that is communicatively coupled to the wireless communication module 674. The audio input device may be configured to receive audio signals indicative of a burner ignition event, for example, or other events and to wirelessly communicate such event information from the pan 630*a* to the ACC system. The ACC system may use this event information to modify and/or augment cooking information and/or cooking instructions provided in connection with the one or more cooking episodes. For example, the ACC system may control one of the control devices 640*a*-640*d* (FIG. 6) to an ignition position and may leave the control device in said ignition position until an audible indication of a successful ignition event at which time the control device may be controlled to a different position to continue with the cooking episode.

In some embodiments, the pan 630*a* may further include an audio output device (not shown) that is communicatively coupled to the temperature sensor 672 or sensors and configured to output an audible signal based at least in part on the temperature information sensed by the temperature sensor 672 or sensors. For example, the audio output device may produce an audible alarm or series or alarms if the temperature sensed by the temperature sensor 672 exceeds one or more threshold temperatures or if the rate of temperature change exceeds one or more threshold rates.

Although the food preparation system 600 of FIG. 6 is shown and described as including or otherwise operating in conjunction with a piece of temperature sensing cooking equipment 630 in the form of a pan 630*a*, in other instances, the food preparation system 600 may include or otherwise operate in conjunction with a temperature sensing cooking implement in the form of a temperature probe. An example temperature probe 1220 operable with embodiments of the systems and methods described herein is shown in FIGS. 12 and 13. The probe 1220 includes a handle 1224 and an elongated probe member 1222 extending therefrom for obtaining temperature data from or adjacent cook surfaces, such as, cook surfaces of a conventional pot or pan. For example, the temperature probe 1220 may be positioned during a cooking episode to extend into a pot of soup to obtain temperature data indicative of the temperature of the soup and to communicate the data to other components of the food preparation system 600. With reference to FIG. 12, the probe 1220 may be attached to a conventional pot or other piece of cooking equipment by a probe mounting device 1230 that is configured to removably couple the probe 1220 to a pot or other piece of cooking equipment and to space the handle 1224 and a stem portion of the elongated probe member 1222 away from a sidewall of the pot or other piece of cooking equipment to reduce or minimize heat transfer from the pot or other piece of cooking equipment to the probe 1220 while also maintaining the handle 1224 substantially aligned with the sidewall so as to reduce or minimize the exposure of the handle 1224 to heat rising from the contents within the pot or other piece of cooking equipment or from heat sweeping up the outside of the sidewall from the heat source operating below the pot or other piece of heating equipment. In this manner, the probe 1220 may be protected from damaging heat exposure while nevertheless enabling a leading end 1221 of the probe to be positioned at a desired location from which to obtain the temperature data.

The temperature probe 1220 shown in FIGS. 12 and 13 may include similar features as the example pan 630*a* described above to assist in gathering temperature data from which to assist in controlling various cooking activities. For example, with reference to FIG. 13, the temperature probe 1220 may include a temperature sensor (e.g., a thermocouple assembly 1219) integrated into the elongated probe member 1222 to sense temperature information indicative of a temperature of the piece of cooking equipment to which it is removably attached and/or a food item received on a cooking surface thereof. As another example, the probe 1220 may further include a wireless communication module 1231 that is provided within or coupled to the handle 1224 to communicate the temperature information sensed by the elongated probe member 1222 to the ACC system such that at least one characteristic of a cooking environment, such as, for example, the cooking environment 612 defined by the cooking unit 610 shown in FIG. 6, may be adjusted during a cooking episode based at least in part on the communicated temperature information. The wireless communication module 1231 may include a wireless transmitter (e.g., an RF transmitter) and may be coupled to a power source 1229 (e.g., a battery) for powering the wireless transmitter and/or other circuitry components. The wireless communication module 1231 may be concealed or sealed entirely within the handle 1224, and may be removably or irremovably coupled thereto.

For example, according to the example embodiment of the probe 1220 shown in FIG. 13, the probe 1220 includes a printed circuit board assembly (PCBA) 1227 including the wireless communication module 1231 and a power management module integrated therewith, and further including electrical contacts coupled thereto for removably receiving the power source 1229. The PCBA 1227 is enclosable within opposing housing portions 1226*a*, 1226*b* and sealed within an internal cavity of the handle 1224 by an end cap 1225 that is removably coupleable to the butt end of the handle 1224 and a base cap 1223 provided at a base end of the probe member 1222 that is removably coupleable to the other end of the handle 1224 opposite the butt end. The end cap 1225 and the base cap 1223 further include corresponding seals 1228 (e.g., o-ring seals) for sealing and protecting the PCBA 1227 within the handle 1224. The temperature sensor in the form of a thermocouple assembly 1219 extends from the probe member 1222 and is electrically coupleable to the PCBA 1227 within the handle such that temperature information gathered via the probe 1220 may be communicated wirelessly for controlling one or more aspects of the cooking systems and methods described herein.

Figure 16:
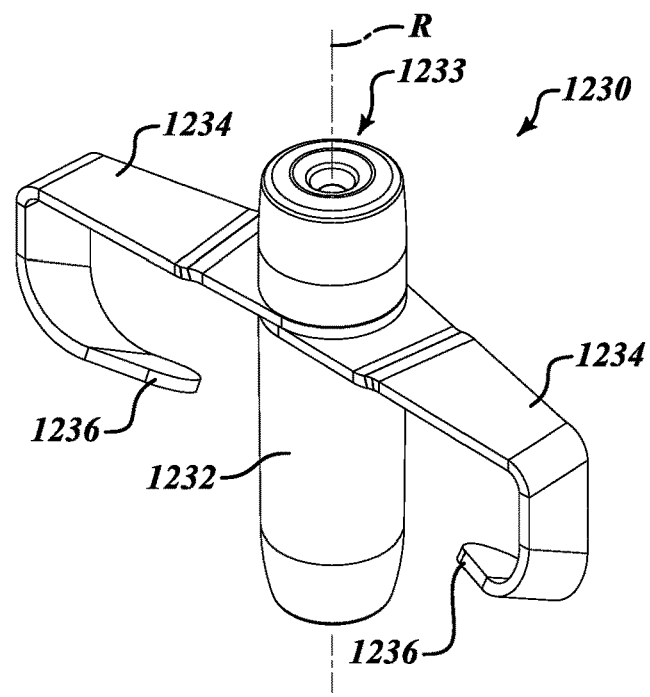
FIG. 16 is an isometric view of the probe mounting device shown in FIG. 12.
Figure 17:
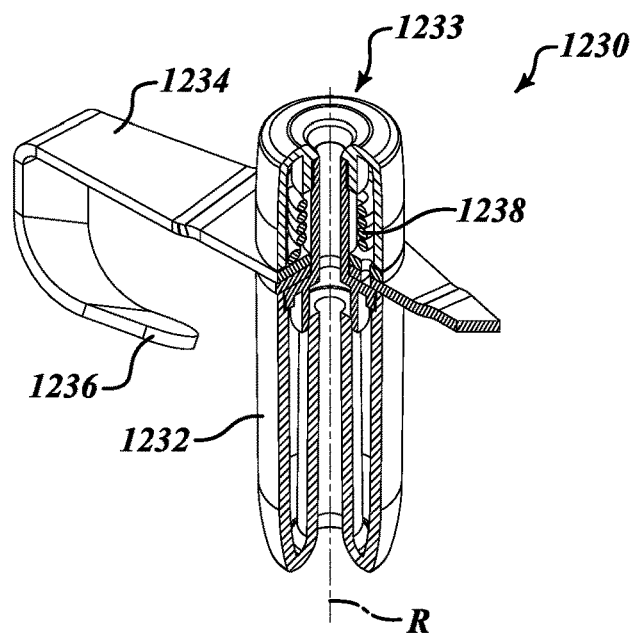
FIG. 17 is an isometric partial cross-sectional view of the probe mounting device of FIG. 16 revealing an internal bias member.

As previously discussed, a probe mounting device may be provided for attaching the probe 1220 to a piece of cooking equipment (e.g., pot) or other structure for obtaining temperature data from a cooking location. One example embodiment of a probe mounting device 1230 is shown in FIGS. 12, 16 and 17. The probe mounting device 1230 of the example embodiment includes a body 1232 that includes a cavity 1233 extending therethrough in a longitudinal direction to receive the probe member 1222 in a friction fit to enable the probe mounting device 1230 to be selectively adjusted along a length of the probe member 1222. The probe mounting device 1230 further includes opposing arm members 1234 that are biased into the position shown in FIG. 16 by a bias member 1238 (e.g., a coil spring), which is revealed in the partial cross-sectional view of FIG. 17. The bias member 1238 may be enclosed within the body 1232. The body 1232 may include body portions that couple together to completely or partially enclose the bias member 1238. In addition, the body portions may couple together to retain the arm members 1234 therebetween and may provide bearing surfaces for the arm members 1234 as they are displaced rotationally about a rotational axis R defined by the aperture 1233 extending through the body 1232. The arm members 1234 may be provided with contact portions 1236 that are configured relative to the body 1232 to provide, in conjunction with the body 1232, three-point contact between the probe mounting device 1230 and a host piece of cooking equipment, such as, for example, a pot. The arm members 1234 may be displaced by a user and the probe mounting device 1230 positioned such that a sidewall of the host piece of cooking equipment is located between the body 1232 and the contact portions 1236 of the arm members 1234, the body portion 1232 being located on an interior side of the sidewall and the contact portions 1236 of the arm members 1234 being located on an exterior side of the sidewall. The arm members 1234 may then be released and urged back toward the configuration shown in FIG. 16 such that the body 1232 makes contact with the interior side of the sidewall and the contact portions 1236 of the arm members 1234 make contact with the exterior side of the sidewall. In this manner, the probe mounting device 1230 may clamp onto the sidewall under the force of the bias member 1238. Although the example embodiment is shown as including two separate arm members 1234 that are each rotatable about the rotation axis R and rotationally biased by a separate bias member 1238, it is appreciated that in other embodiments one or more arm members may be provided as flexible, resilient members that may be elastically deformed to mount to the host piece of cooking equipment and a separate bias member may be omitted.

Although the example temperature probe 1220 is shown in FIGS. 12 and 13 as an elongated wand-like probe device, it is appreciated that temperature probes of various other form factors may be provided in connection with the cooking systems and methods described herein. For example, in some embodiments, a floating temperature sensor may be provided in addition to or in lieu of the temperature probe 1220 discussed above to obtain temperature data from fluid foodstuffs, such as, for example, soups and sauces. The floating temperature sensor may be generally spherical, tear-dropped shaped or otherwise shaped like a conventional buoy. The floating temperature sensor may include ballast such that the sensor floats with a protruding thermocouple thereof oriented downward to be submerged in the fluid foodstuff. At least the lower portion of the floating temperature sensor may be insulated to protect against heat damage. The electronics (e.g., power source, wireless communication module, etc.) of the floating temperature sensor may be sealed within a housing thereof. An antenna for facilitating wireless communication of temperature data may be provided in an upper end of the floating temperature sensor generally opposite the protruding thermocouple. In some instances, temperature data may be obtained from a location near the upper surface of fluid foodstuffs with such a floating temperature sensor, and also at or near the lower surface of the cookware within which the fluid foodstuffs is received with a different temperature probe, such as, for example, the aforementioned temperature probe 1220. In this manner, the system may take into account differences in temperature readings from the different temperature probes/sensors.

Figure 18:
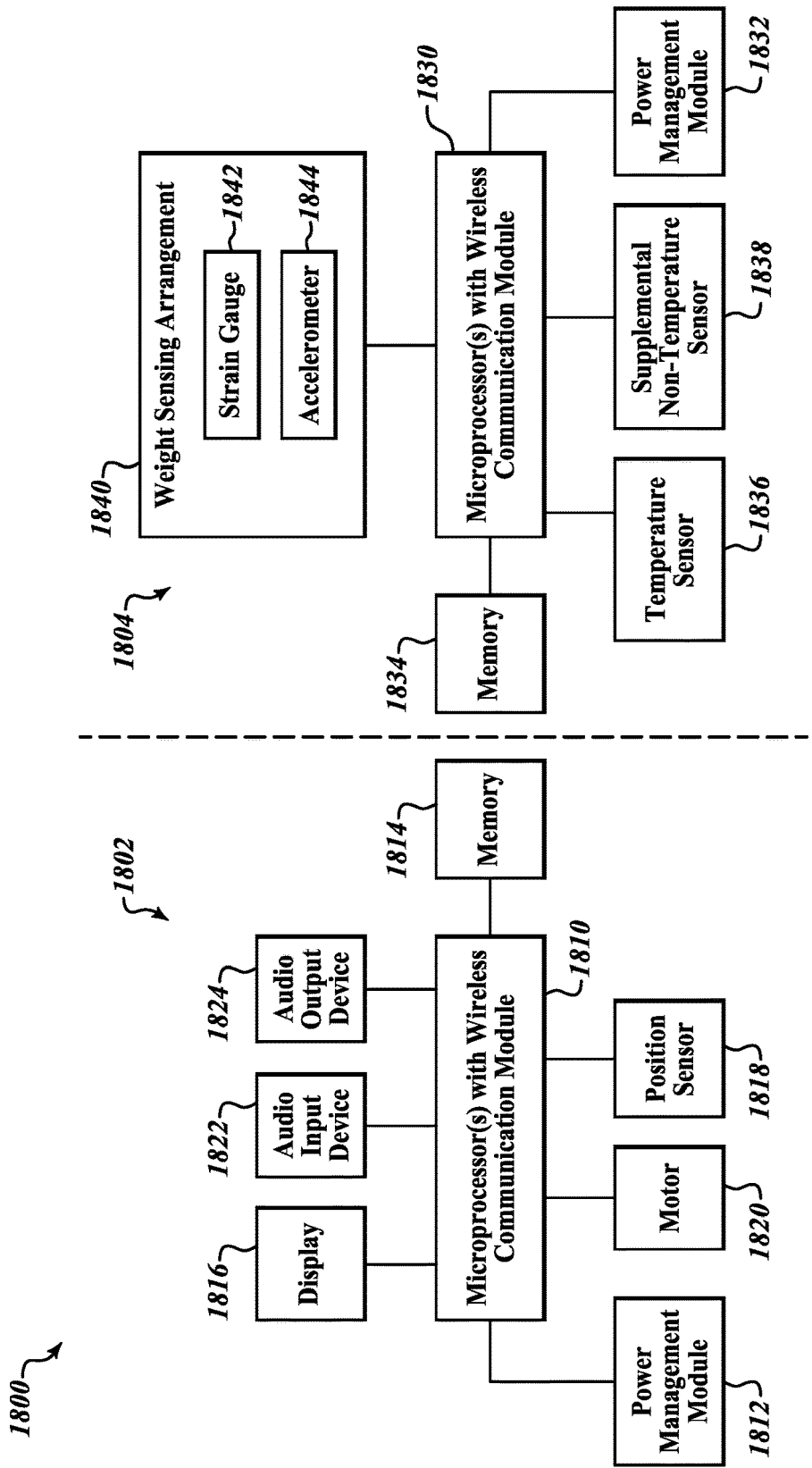
FIG. 18 is a schematic diagram of a control system suitable for use with embodiments of the cooking systems and methods described herein.

Additional features and functionality will now be described with reference to FIG. 18. FIG. 18 schematically depicts a control system 1800 suitable for use with aspects of the embodiments of the cooking systems and methods described herein. The control system 1800 includes a first control portion 1802 associated with a control knob and a second control portion 1804 associated with a temperature sensing implement, such as a piece of cooking equipment (e.g., temperature sensing pot or pan) or a temperature probe having a temperature sensor 1836 integrated therein. In the depicted embodiment, the first control portion 1802 associated with the control knob includes one or more microprocessors 1810 that include or are communicatively coupled to a wireless communication module (e.g., low-energy Bluetooth module). As depicted, the one or more microprocessors 1810 are communicatively coupled to a power management module 1812, such as for providing power to the electrical components of the control knob; one or more memories 1814, which may store various information and/or processor executed instructions related to operations of the control system 1800; a display 1816, such as to provide visual information or feedback to a user; a position sensor 1818, such as may track the rotational position of the control knob during manual adjustments so as to enable subsequent automated adjustments of the same; and a drive motor 1820, such as to provide controlled rotational adjustment of a control shaft of a host cooking appliance or apparatus based at least in part on information received from the temperature sensing implement associated with the second control portion 1804. The one or more microprocessors 1810 of the first control portion 1802 are further shown as being communicatively coupled to an audio input device 1822, such as may be used to receive adjustment instructions from a user; and an audio output device 1824, such as may be used to communicate cooking instructions or warnings to a user. As depicted, the second control portion 1802 associated with the temperature sensing implement includes one or more microprocessors 1830 that include or are communicatively coupled to a wireless communication module (e.g., low-energy Bluetooth module). As further depicted, the one or more microprocessors 1830 of the second control portion 1804 are communicatively coupled to a power management module 1832, such as may provide power to the electrical components of the temperature sensing implement; one or more memories 1834, which may store various information and/or processor executed instructions related to operations of the control system 1800; the temperature sensor 1836, such as may be used to collect temperature data from which to control the control knob; a supplemental sensor 1838, such as may be used to collect non-temperature data from which to refine the position of the control knob; and a weight sensing arrangement 1840 including a strain gauge 1842 and/or accelerometer 1844, such as may be used to sense the weight of a food item or items that may be carried by the temperature sensing implement. In accordance with the control system 1800 of FIG. 18, it is appreciated that one or more temperature sensing implements (e.g., a temperature sensing pan, a temperature sensing probe, etc.) may be used to collect temperature and non-temperature data from which to generate control signals for automatically controlling the rotational position of one or more control knobs coupled to a cooking appliance or apparatus during a cooking episode, with such automated control being supplemented, if desired or necessary, by manual adjustments of the one or more control knobs.

With reference now back to FIG. 6, food preparation system 600 may further include a camera 698 or other imaging device positioned to observe and communicate information from contents within the piece of cooking equipment 630 to the ACC system. In some instances, the camera 698 may be a thermal imaging camera that is positioned to observe and communicate thermal information from the piece of cooking equipment 630 or food item 632 received therein to the ACC system. The cooking adjustment information thereafter provided by the ACC system may be modified and/or augmented based at least in part on this information to provide yet further functionality during cooking episodes. For example, a user may select a preference for a particular level of cooking for specific food items (e.g., a medium-rare steak) and the information from the camera 698 may be used to adjustably control a relevant control device 640d to reduce or stop the application of heat as the food item approaches the desired level as observed by the camera 698. The camera or other imaging device may also be used to obtain profile data of contents within the piece of cooking equipment 630 from which cooking instructions or information provided by the ACC system may be adjusted or modified based on the size or volume of the contents (e.g., a cooking time may be increased for relatively larger items having greater heat capacities).

With reference again to FIGS. 7 and 8, the base 660 of the pan 630a may comprise a multi-ply structure including at least one layer of a first material and at least one layer of a second material that is different than the first material. For instance, in some embodiments the base 660 may include stainless steel outer layers 661, 663 and an aluminum inner layer 665 that is captured, sandwiched or encapsulated by the outer layers 661, 663. Although the illustrated embodiment of the pan 630a shown in FIGS. 7 and 8 is shown as having a 3-ply or three layer base structure, it is appreciated that in other embodiments the base 660 of the pan 630a may include more or fewer layers, such as, a 4-ply, 5-ply, 6-ply or 2-ply structure. In addition, it is appreciated that the base 660 may comprise a unitary structure of material with the base passage 680 extending therethrough. The base passage 680 may be drilled, milled or otherwise formed in one or more layers or the base 660. In some instances, a channel or path may be provided in one face of one layer, such as, for example, inner layer 665, and may be covered by an adjacent layer, such as, for example, outer layer 661 to form the base passage 680. Other features may be provided in one or more layers 661, 663, 665 to facilitate joining and/or bonding of the layers 661, 663, 665 together. The layers 661, 663, 665 may be nested or sandwiched together. According to some embodiments, the base 660 may be a welded, brazed or impact bonded structure, and the base passage 680 may be formed directly in at least one of the layers thereof. In some embodiments, the base passage 680 may comprise a void that is formed by removal of a filler material provided amongst the layers of the multi-ply structure prior to joining the same. The fill material may be removed or otherwise degraded during a base formation process, such as induction welding of the base 660.

Figure 10:
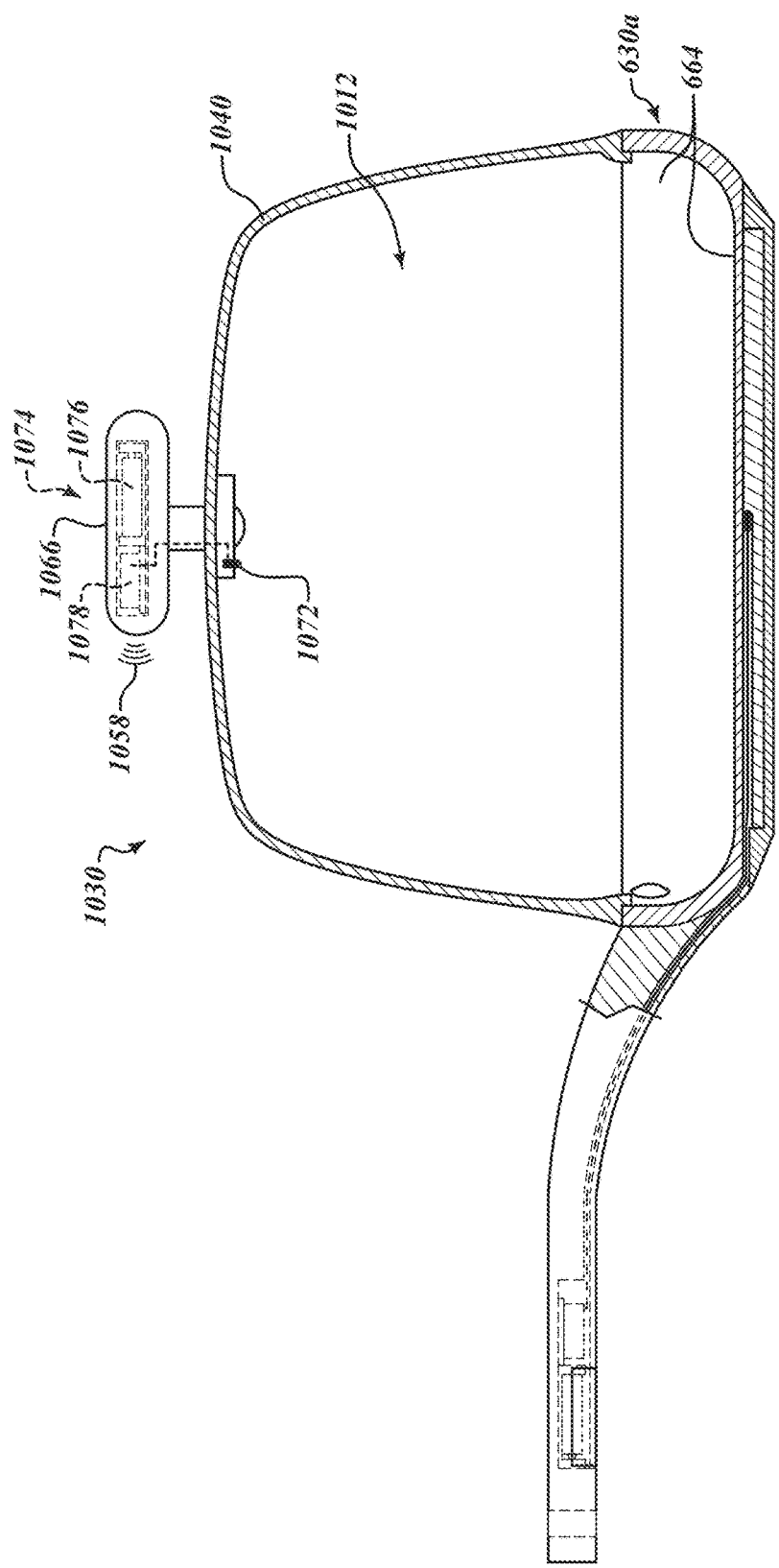
FIG. 10 is a side elevational view of a piece of cooking equipment of FIG. 7 together with a removable lid, according to yet another embodiment.

With reference to FIG. 10, a variation of a piece of temperature sensing cooking equipment 1030 is shown which includes the example pan 630a of FIGS. 7 and 8 together with a lid 1040 that is removably coupleable to the pan 630a to define a closed cooking environment 1012. The closed cooking environment 1012 may resemble that of a Dutch oven or an inverted Dutch oven, with a shallow base and a domed lid, and the piece of temperature sensing cooking equipment 1030 may provide cooking functionality similar to a Dutch oven. In other embodiments, the piece of cooking equipment may have a closed cooking environment that resembles that of a tagine, with a shallow base and a conical lid.

Referring again to the cooking equipment 1030 shown in FIG. 10, the temperature sensing cooking equipment 1030 may include at least one supplemental temperature sensor 1072 (e.g., a thermocouple or thermistor) coupled to the lid 1040 to sense a temperature within the closed cooking environment 1012. The temperature sensing cooking equipment 1030 may further include a supplemental wireless communication module 1074 that is provided in or coupled to the lid 1040 to enable temperature information sensed by the at least one supplemental temperature sensor 1072 to be transmitted from the piece of cooking equipment 1030, as represented by the wireless signal labeled 1058. More particularly, the supplemental wireless communication module 1074 may be provided in or coupled to a handle 1066 that is attached to or formed integrally with the lid 1040 and which is provided for manipulating the lid 1040 in space and selectively placing the lid 1040 on the pan 630a. The supplemental wireless communication module 1074 may include a wireless transmitter 1076 (e.g., an RF transmitter) and a power source 1078 (e.g., a battery) for powering the wireless transmitter 1076 and/or other circuitry components. The supplemental wireless communication module 1074 may be concealed or sealed entirely within the handle 1074 of the lid 1040, and may be removably or irremovably coupled thereto.

In connection with the example piece of temperature sensing cooking equipment 1030 shown in FIG. 10, temperature feedback information may be provided by the pan 630a and/or the lid 1040 to provide additional functionality in connection with the ACC systems and methods described herein. For example, a heat source may be controllably adjusted based on the temperature of a cooking surface in the pan 630a for at least some portion of a cooking episode, and may be adjusted based on the temperature at or near the top of the cooking environment 1012 for at least some other portion of the cooking episode. In other instances the heat source may be controllably adjusted based on both the temperature of a cooking surface in the pan 630a and the temperature at or near the top of the cooking environment 1012.

Although specific embodiments of temperature sensing cooking equipment are described herein with reference to covered and uncovered pans 630a, 930, 1030, it is appreciated that a wide range of pots and pans (e.g., fry pans, saucepans, sauté pans) and other cookware may be provided, such as, for example, skillets, roasters, griddles, grates, kettles and dishware. Furthermore, a temperature probe 1220 (FIGS. 12 and 13) may be used in addition to or in lieu of the cookware described herein having integrated temperature sensing functionality to provide supplemental temperature information or to otherwise gather temperature information from conventional cookware or cooking surfaces lacking integrated temperature sensing functionality. In addition, although the example embodiment of the cooking unit 610 of FIG. 6 is shown and described as a stove with a gas cooktop, it is appreciated that a wide range of cooking appliances and apparatuses may be provided in connection with the systems and techniques described herein, such as, for example, electric cooktops (e.g., induction and radiant cooktops), grilles, smokers and other cooking apparatuses having a variety of fuel sources.

Figure 11:
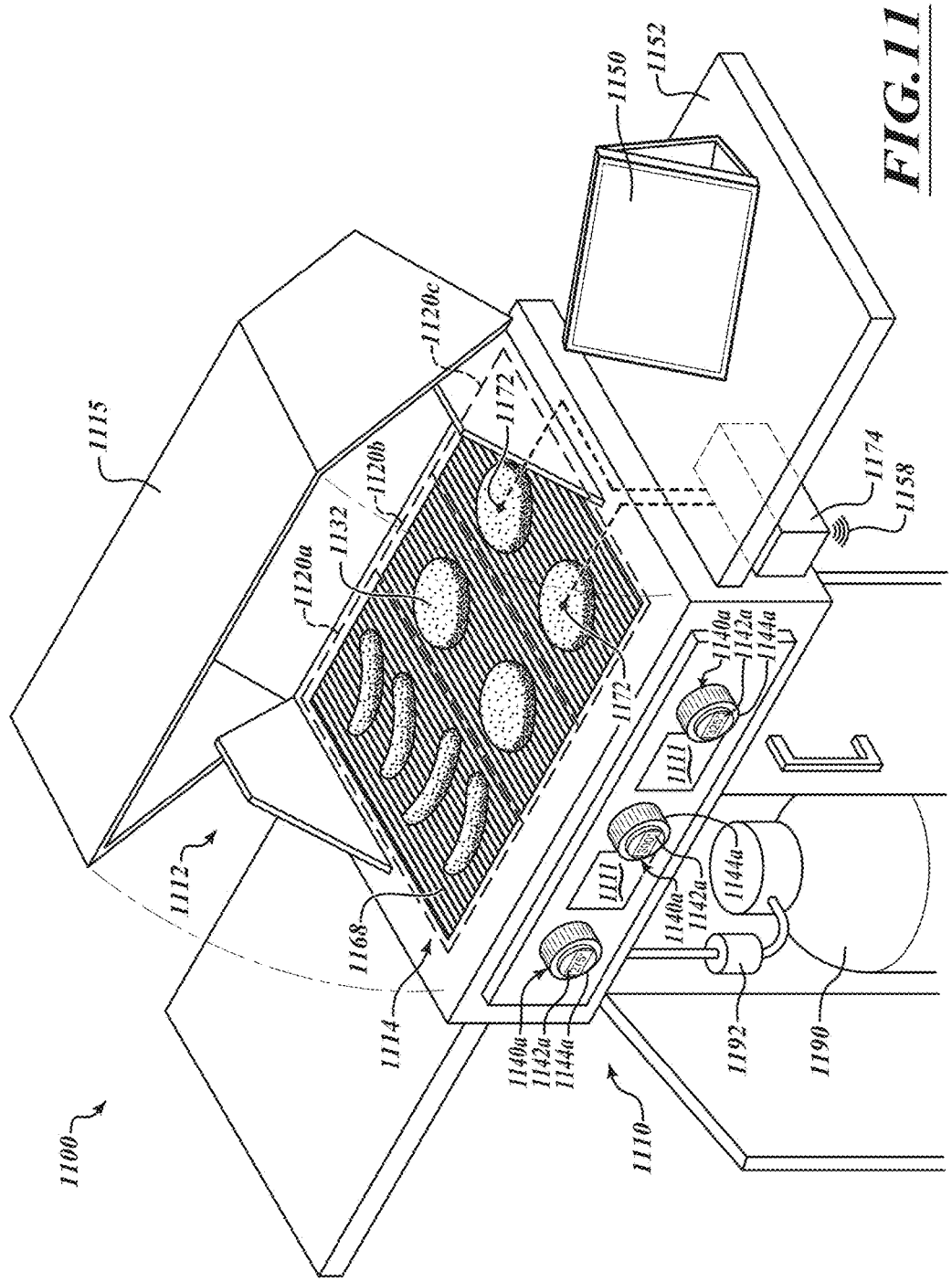
FIG. 11 is an isometric view of a food preparation system, according to another example embodiment, in connection with which the automated cooking control systems and techniques described herein may be used.

With reference to FIG. 11, an example embodiment of a food preparation system 1100 is shown in the form of an outdoor grille 1110 having a grille surface 1114 and grille hood 1115 that collectively define a cooking environment 1112. The cooking environment 1112 includes a plurality of cooking locations 1120a-1120c within or upon which to receive food items 1132 and/or, in some cases, temperature sensing cooking equipment (not shown), such as, for example, a temperature sensing roaster pan having functionality to sense and transmit temperature information in connection with aspects of the ACC systems and techniques described herein. According to the example embodiment of the food preparation system of FIG. 11, the outdoor grille 1110 is shown as including a plurality of temperature sensors 1172 embedded in a grille 1168 thereof upon which food items 1132 and/or cookware may be placed during cooking episodes.

With continued reference to FIG. 11, a plurality of control devices 1140a-1140c, each in the form of a knob or dial, are coupled to the outdoor grille 1110 to independently control a flow of fuel to burners (not visible) provided below the grille surface 1114 so as to adjust the amount of heat supplied to the respective cooking locations 1120a-1120c within the cooking environment 1112 during cooking episodes.

A computing device 1150 in the form of a tablet computer is shown in the vicinity of the cooking environment 1112, namely on a shelf 1152 next to the grille 1168. Aspects and/or modules of the ACC systems described herein may execute on the computing device 1150 to provide at least some of the functionalities described herein. As an example, the ACC system may execute on the computing device 1150 and may be configured to receive temperature information wirelessly from a piece of cooking equipment (not shown) or from a communication module or control module 1174 that is in electrical communication with one or more temperature sensors 1172 embedded in or otherwise coupled to the grille 1168, as indicated by the wireless signal labeled 1158 in FIG. 11. The ACC system may also be configured to provide cooking adjustment information for adjusting one or more of the plurality of control devices 1140a-1140c during the cooking episode based at least in part on the received temperature information. For example, in some embodiments, the ACC system may receive temperature information from a piece of cooking equipment (not shown) or the embedded temperature sensors 1172 throughout at least a portion of a cooking episode from which a temperature profile history may be monitored and recorded for each of the cooking locations 1120a-1120c. The temperature profile history may be directly or indirectly indicative of the temperature of respective food items 1132 received on the grille 1168. The ACC system may then provide cooking adjustment information for adjusting a corresponding one of the plurality of control devices 1140a-1140d during the cooking episode for approaching and arriving at a desired temperature and/or maintaining a desired temperature for a select period of time in connection with one or more cooking activities, for example.

According to some embodiments, the cooking information generated by the ACC system may include visual cooking information or cooking instructions that are conveyed to a user through one or more display units, such as a display of the computing device 1150 itself, a separate display or displays 1111 of the outdoor grille 1110, and/or displays 1142a-1142c of the control devices 1140a-1140c. The cooking information or cooking instructions may include, for example, an indication of a current temperature reading, a target temperature reading, a time remaining until arrival at a desired temperature, an elapsed time at the desired temperature or other information to assist in cooking activities. The cooking information or cooking instructions may include discrete instructions specific to particular food items or dishes, such as, for example, a "time to flip" instruction for preparing burgers to a desired doneness. In some embodiments, different cooking information and/or cooking instructions may be displayed simultaneously on more than one of the control devices 1140a-1140c for each of the cooking locations 1120a-1120c that may be active in the particular cooking episode. In this manner, a user may use multiple burners of the outdoor grille 1110 simultaneously to coordinate the preparation of multiple dishes or food items and/or to facilitate the preparation of relatively more complex dishes or food items. When provided, the display on each respective control device 1140a-1140c may be centrally located and a circumferential dial 1144a-1144c may be provided at the periphery of the control device 1140a-1140c to rotate about a central portion. The circumferential dial 1144a-1144d may be coupled to a corresponding shaft of the heat source adjustment assembly of the outdoor grille 11010, such as, for example, a "D" shaft of the heat source adjustment assembly. In other embodiments, the control devices 1140a-1140c may have a variety of different forms and may resemble various knobs and/or dials of conventional stoves and the other cooking appliances.

According to some embodiments, the cooking information generated by the ACC system may include instructions for automatically manipulating the control devices 1140a-1140d based at least in part on the received temperature information. In such instances, each of the control devices 1140a-1140d may be provided with a motor (e.g., a stepper motor) that is configured to rotate a shaft of a heat source adjustment assembly of the outdoor grille 1110 in response to the cooking adjustment information provided by the ACC system. More particularly, the motor may include a drive shaft coupler that is sized and shaped to interface with a corresponding shaft of the heat source adjustment assembly of the outdoor grille 1110, such as, for example, a "D" shaft of the heat source adjustment assembly. In some instances, the drive shaft coupler of the motor may resemble that of D shaft knobs of conventional outdoor grilles. When a motor is provided, a base portion of the motor may be fixedly secured to the outdoor grille 1110 and/or a portion of an adjacent one of the control devices 1140a-1140c to fix the base portion of the motor while the drive shaft is enabled to rotatably drive the corresponding shaft of the heat source adjustment assembly. As an example, a key may extend from the base portion of the motor or other portion of the control device to which the base portion is fixedly coupled to engage a face or other portion of the outdoor grille 1110. In other instances, a stabilizing bar, plate, bracket or other structure may extend between adjacent control devices 1140a-1140c to effectively lock the base portions of the motors of the adjacent control devices 1140a-1140d from rotating while each drive shaft is able to selectively drive a respective adjustment assembly of the outdoor grille 1110.

According to some embodiments, the outdoor grille 1110 may further comprise a sensor 1192 that is configured to sense a characteristic of a gas fuel source 1190 of the gas burners (not visible) and the control devices 1140a-1140c may be controlled to automatically adjust a gas flow rate to the gas burners based at least in part on said characteristic of the gas fuel source 1190. In some instances, for example, the sensor 1192 may be a pressure sensor that is configured to sense a pressure of the gas fuel source, and the control devices 1140a-1140c may be controlled to automatically adjust a gas flow rate based at least in part on pressure readings (e.g., increase the flow rate in response to decreasing pressure). In other instances, the sensor may be configured to sense a remaining fuel level of the gas fuel source such as by sensing the weight of the gas fuel source, and the control devices 1140a-1140c may automatically adjusted accordingly.

Another example embodiment of a food preparation system may include a cooking unit in the form of a charcoal, wood, wood pellet or other heat source cooking apparatus having at least one adjustable air flow device, such as, for example, an adjustable air flow restricting device or fan. In such an embodiment, a control device may be coupled to the at least one adjustable air flow device to enable adjustment of the temperature of a cooking environment within the cooking apparatus by adjusting air flow in response to temperature information derived from temperature sensing cooking equipment positioned in or on the cooking apparatus or from temperature sensors otherwise provided or embedded in the cooking apparatus itself.

Yet another example embodiment of a food preparation system may include a cooking unit in the form of a sous vide immersion unit. In such an embodiment, a control device may be coupled to at least one adjustable fluid circulation device to enable adjustment of fluid circulation within a cooking environment defined by the sous vide immersion unit in response to temperature information derived from one or more temperature sensors provided or embedded in the sous vide immersion unit.

Another example embodiment of a food preparation system may be summarized as including: a piece of cooking equipment having a base that defines at least a portion of a receptacle to receive a food item, a handle for manipulating the piece of cooking equipment, at least one temperature sensor integrated into the base of the piece of cooking equipment to sense temperature information indicative of a temperature of the base or of the food item during a cooking episode, and a wireless communication module coupled to the handle to transmit the temperature information from the piece of cooking equipment; a control device provided to adjust a characteristic of a cooking environment in a vicinity of the piece of cooking equipment during the cooking episode; and a cooking control system configured to receive the temperature information from the piece of cooking equipment and to provide cooking adjustment information for adjusting the control device during the cooking episode based at least in part on the received temperature information. The wireless communication module of the piece of cooking equipment may include a power source and a RF transmitter and may be concealed within the handle. The control device may be coupled to a shaft of a heat source adjustment assembly of a cooking apparatus and may include a motor for selectively rotating the shaft in response to the cooking adjustment information provided by the cooking control system. The control device may include a display unit for communicating information to a user to facilitate manual adjustment of the control device during the cooking episode. The food preparation system may further include a position sensor that is located to sense a position of the control device and communicatively coupled to the cooking control system to communicate data indicative of a position of the control device to the cooking control system upon manual adjustment of the control device. In some instances, the position sensor may be integrated into the control device. The cooking apparatus may be a stove having at least one stovetop cooking location and the piece of cooking equipment may be a pot or a pan positionable on the at least one stovetop cooking location. The food preparation system may further include a camera positioned to observe and communicate information to the cooking control system, and the cooking adjustment information may be based at least in part on said information obtained via the camera. The camera may be a thermal imaging camera that is positioned to observe and communicate thermal information from the piece of cooking equipment or food item received therein to the cooking control system. The food preparation system may further include a weight sensing device configured to sense and communicate weight information associated with the food item to the cooking control system, and the cooking adjustment information may be based at least in part on said weight information. The food preparation system may further include a supplemental sensor integrated into the piece of cooking equipment to sense supplemental non-temperature information associated with the food item and communicate said supplemental non-temperature information to the cooking control system. The supplemental sensor may include, for example, one of the following: a moisture sensor to sense moisture characteristics of the food item; a color sensor to sense a color of the food item; and a chemical sensor to sense acidity, alkalinity and/or other properties related to flavor of the food item.

According to one embodiment, the base of the piece of cooking equipment may comprise a multi-ply structure including at least one layer of a first material and at least one layer of a second material that is different than the first material, and wherein a base passage is provided in at least one of the layers of the multi-ply structure for establishing a path between a lead end of the at least one temperature sensor and the wireless communication module. In another embodiment, the base of the piece of cooking equipment may comprise a unitary structure of material and a base passage may extend through the unitary structure for establishing a path between a lead end of the at least one temperature sensor and the wireless communication module.

According to another example embodiment, a piece of cooking equipment operable with a cooking control system to prepare a food item during a cooking episode with the assistance of the cooking control system may be summarized as including: a base defining at least a portion of a receptacle to receive the food item; a handle for manipulating the piece of cooking equipment in a cooking environment; at least one temperature sensor integrated into the base to sense temperature information indicative of a temperature of the base or of the food item during the cooking episode; and a wireless communication module coupled to the handle of the piece of cooking equipment to communicate the temperature information derived from the piece of cooking equipment to the cooking control system such that at least one characteristic of the cooking environment may be adjusted during the cooking episode based at least in part on the communicated temperature information. The base may include a base passage that extends between a first location underlying a cooking surface thereof and a second location at or near a periphery of the receptacle, the handle may include a handle passage in communication with the base passage of the base, and the at least one temperature sensor may be a thermocouple having a lead end positioned at the first location and an intermediate portion that extends through the base passage and the handle passage to a cold junction located near the wireless communication module, and the thermocouple may be communicatively coupled to the wireless communication module to enable temperature information sensed by the thermocouple to be transmitted from the piece of cooking equipment by the wireless communication module. In some instance, the wireless communication module may include a power source and a RF transmitter and is concealed within the handle. The piece of cooking equipment may further include a weight sensing arrangement communicatively coupled to the wireless communication module to sense a weight of the food item and communicate weight information to the cooking control system. The weight sensing arrangement may be provided in the handle and may include at least one strain gauge arranged to sense an approximate weight of the food item based on deformation of the handle with the piece of cooking equipment in a lifted configuration. The piece of cooking equipment may further include a supplemental sensor integrated into the piece of cooking equipment to sense supplemental non-temperature information associated with the food item and communicate said supplemental non-temperature information to the cooking control system. The supplemental sensor may include, for example, one of the following: a moisture sensor to sense moisture characteristics of the food item; a color sensor to sense a color of the food item; and a chemical sensor to sense acidity, alkalinity and/or other properties related to flavor of the food item.

Another example of control knob operable with a cooking control system to prepare a food item during a cooking episode may be summarized as including: a coupler portion configured to interface with a shaft of a heat source adjustment assembly of a cooking apparatus; and a motor coupled to the coupler portion to enable selective rotation of the shaft of the heat source adjustment assembly in response to cooking adjustment information provided by the cooking control system during the cooking episode. The control knob may further include a base portion fixable to the cooking apparatus, and the coupler portion may be rotatable relative to the base portion via the motor to enable controlled rotation of the shaft of the heat source adjustment assembly. The control knob may further include a display unit configured to display the cooking adjustment information provided by the cooking control system during the cooking episode.

The control knob may further include an audio input device configured to receive audio signals for adjusting the control knob in response to cooking adjustment information provided by the cooking control system during the cooking episode and/or an audio output device configured to output an audible signal containing cooking adjustment information provided by the cooking control system during the cooking episode.

Another example of control knob operable with a cooking control system to prepare a food item during a cooking episode may be summarized as including: a base portion including a display unit configured to display cooking adjustment information provided by the cooking control system during the cooking episode; and a coupler portion configured to interface with a shaft of a heat source adjustment assembly of a cooking apparatus to enable selective adjustment of a heat source in response to the displayed cooking adjustment information. The base portion may be fixable to the cooking apparatus and the coupler portion may be rotatable relative to the base portion to enable selective rotation of the shaft of the heat source adjustment assembly in response to the displayed cooking adjustment information. The coupler portion may be manually adjustable by a user in response to cooking adjustment information provided by the cooking control system during the cooking episode. The control knob may further include a motor coupled to the coupler portion to enable selective rotation of the shaft of the heat source adjustment assembly in response to cooking adjustment information provided by the cooking control system during the cooking episode. The coupler portion may also be manually adjustable by a user to enable adjustment of the coupler portion independent of the motor.

An example embodiment of a piece of cooking equipment may be summarized as including: a base defining at least a portion of a receptacle with a cooking surface to receive and heat a food item and including a base passage that extends between a first location underlying the cooking surface and a second location at or near a periphery of the receptacle; a handle coupled to the base at or near the second location and having a handle passage in communication with the base passage of the base; a wireless communication module coupled to the handle; and at least one temperature sensor positioned at the first location and communicatively coupled to the wireless communication module via an insulated conductor that extends through the base passage and the handle passage to enable temperature information sensed by the at least one temperature sensor to be transmitted from the piece of cooking equipment by the wireless communication module. In some instances, the base piece of cooking equipment may comprise a multi-ply structure including at least one layer of a first material and at least one layer of a second material that is different than the first material, and the base passage may be provided in at least one of the layers of the multi-ply structure. The multi-ply structure may be a welded, brazed or impact bonded structure, and the base passage may be formed directly in at least one of the layers thereof. In at least one embodiment, the base passage may comprise a void formed by removal of a filler material provided amongst the layers of the multi-ply structure. In other instances, the base may comprise a unitary structure of material with the base passage extending therethrough. The piece of cooking equipment may further include a heat sink coupled to the power source and configured to recharge the power source of the wireless communication module using heat obtained from an external source during one or more cooking episodes. The piece of cooking equipment may further include a weight sensing arrangement communicatively coupled to the wireless communication module to sense a weight of the food item and communicate weight information to the cooking control system. The weight sensing arrangement may be provided in the handle and may include at least one strain gauge arranged to sense an approximate weight of the food item based on deformation of the handle with the piece of cooking equipment in a lifted configuration. The piece of cooking equipment may further include an audio input device communicatively coupled to the wireless communication module, which is configured to receive audio signals indicative of a burner ignition event or other events and to wirelessly communicate event information from the piece of cooking equipment, and/or an audio output device communicatively coupled to the at least one temperature sensor and being configured to output an audible signal based at least in part on the temperature information sensed by the temperature sensor. The piece of cooking equipment may further include a lid removably coupleable to the base to define a closed cooking environment; at least one supplemental temperature sensor coupled to the lid to sense a temperature within the closed cooking environment; and a supplemental wireless communication module coupled to the lid to enable temperature information sensed by the at least one supplemental temperature sensor to be transmitted from the piece of cooking equipment. The closed cooking environment may resemble that of a Dutch oven or an inverted Dutch oven, with a shallow base and a domed lid. In other instances, the closed cooking environment may resemble that of a tagine, with a shallow base and a conical lid.

An example embodiment of a cooking apparatus operable with temperature sensing cooking equipment to prepare food items during one or more cooking episodes may be summarized as including: a cooking unit that defines a cooking environment and has at least one cooking location or surface within or upon which to receive the temperature sensing cooking equipment; and at least one control device that is coupled to the cooking unit, the at least one control device including a motor that is configured to adjust at least one characteristic of the cooking environment in the vicinity of the at least one cooking location or surface in response to temperature information derived from the temperature sensing cooking equipment. The cooking unit may comprise, for example, a cooktop with a plurality of gas burners corresponding to each of a plurality of control devices, and each of the plurality of control devices may be configured to automatically adjust a gas flow rate to the respective gas burner in response to the temperature information derived from the temperature sensing cooking equipment. According to another aspect, the cooking unit may comprise a cooktop with a plurality of induction or radiant electric cooking locations corresponding to each of a plurality of control devices, and each of the plurality of control devices may be configured to automatically adjust a heat output of the respective induction or radiant electric cooking location in response to the temperature information derived from the temperature sensing cooking equipment. The cooking apparatus may further include a display associated with the cooking unit which is configured to display information that is based at least in part on temperature information derived from the temperature sensing cooking equipment. According to yet another aspect, the cooking unit may comprise a grille and at least one gas burner operable via the at least one control device to define the at least one cooking location or surface on the grille. The cooking unit may further comprise a sensor that is configured to sense a characteristic of a gas fuel source of the at least one gas burner, and the at least one control device may be configured to automatically adjust a gas flow rate to the at least one gas burner based at least in part on said characteristic of the gas fuel source. The sensor may be configured to sense a pressure of the gas fuel source. The sensor may be configured to sense a remaining fuel level of the gas fuel source. According to yet another aspect, the cooking unit may comprise a charcoal, wood, wood pellet or other heat source cooking unit with at least one adjustable air flow device, and the control device may be coupled to the at least one adjustable air flow device to enable adjustment of the temperature of the cooking environment of the cooking unit in response to the temperature information derived from the temperature sensing cooking equipment. The adjustable air flow device is an adjustable air flow restricting device or a fan.

Another example embodiment of a cooking apparatus operable with temperature sensing cooking equipment to prepare food items during one or more cooking episodes may be summarized as including: a cooking unit that defines a cooking environment and has at least one cooking location or surface within or upon which to receive the temperature sensing cooking equipment; and at least one control knob with an integrated display unit which is coupled to the cooking unit, the at least one control knob being configured to display information that is based at least in part on temperature information derived from the temperature sensing cooking equipment and being manipulatable by a user to adjust at least one characteristic of the cooking environment in response to the displayed information. The cooking unit may comprise, for example, a stovetop with a plurality of gas burners corresponding to each of a plurality of control knobs, and each of the plurality of control knobs may be manipulatable by the user to adjust a gas flow rate to the respective gas burner in response to the information displayed on the control knob itself.

An example embodiment of a cooking apparatus for preparing food items during one or more cooking episodes may be summarized as including: a cooking unit that defines a cooking environment and that has at least one cooking surface upon which to receive a food item during a cooking episode, the at least one cooking surface including at least one temperature sensor to sense temperature information indicative of a temperature of the food item during a cooking episode; and at least one control device that is coupled to the cooking unit, the at least one control device including a motor that is configured to automatically adjust at least one characteristic of the cooking environment in the vicinity of the at least one cooking location or surface in response to temperature information derived from the at least one temperature sensor. The cooking apparatus may further comprise a display associated with the cooking unit which is configured to display information that is based at least in part on temperature information derived from the at least one temperature sensor. The cooking unit may comprise, for example, a grille unit having at least one gas burner operable via the at least one control device, and the cooking surface may be a grille and the at least one temperature sensor may be provided within the grille. As another example, the cooking unit may comprise a cooktop and the at least one cooking surface may be provided by an induction or radiant electric cooking device, and the control device may be configured to adjust a heat output of the induction or radiant electric cooking device in response to the temperature information derived from the at least one temperature sensor. As yet another example, the cooking unit may comprise a charcoal, wood, wood pellet or other heat source cooking unit with at least one adjustable air flow device, and the control device may be coupled to the at least one adjustable air flow device to enable adjustment of the temperature of the cooking environment of the cooking unit in response to the temperature information derived from the at least one temperature sensor. The adjustable air flow device may be, for example, an adjustable air flow restricting device or a fan.

Figure 19:
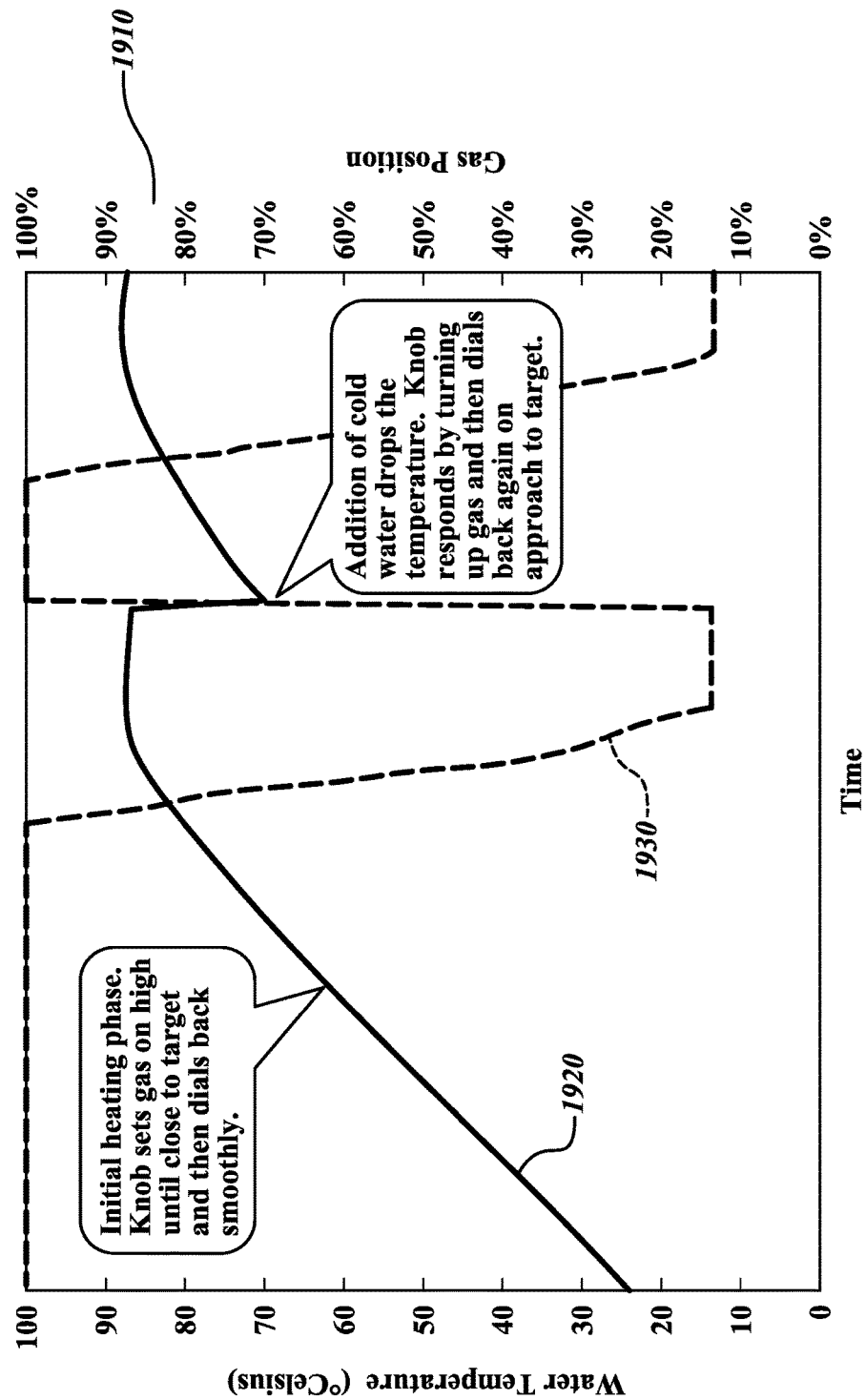
FIG. 19 is a graph illustrating example temperature changes and control device responses during a portion of an example cooking episode.

FIG. 19 illustrates a graph 1910 with example temperature changes and control device responses during a portion of an example cooking episode. In particular, in the example illustrated in graph 1910, the x-axis of the graph corresponds to time, with the left side of the graph corresponding to the beginning of the example cooking episode. The left y-axis illustrates temperature in Celsius of contents of a piece of cooking equipment (e.g., water in a pot or pan in this example) that is being controlled, with line 1920 of the graph illustrating the changing temperature over time. The right y-axis illustrates the heat being applied by the control device, which in this example is a smart control knob (or dial) device that manipulates gas being supplied to a gas burner under the cooking equipment piece, and with line 1930 of the graph illustrating the settings or positions of the control knob over time (which are expressed in this example as a percentage of full or maximum gas flow at a 'maximum' setting or position of the control knob, and with 0% corresponding to an 'off' setting or position of the control knob). Some or all of the temperature information may be supplied by, for example, the cooking equipment piece using a wireless transmitter included in the cooking equipment piece (e.g., in the handle) and based on readings provided by one or more temperature sensors integrated in the cooking equipment piece (e.g., in the base). Conversely, some or all of the temperature information may be supplied by, for example, a smart temperature probe that is temporarily attached to the cooking equipment piece and that extends into its contents, using a wireless transmitter included in the smart temperature probe and based on readings provided by one or more temperature sensors included in the smart temperature probe.

At the beginning of the example illustrated for FIG. 19, the control knob turns the gas of the associated burner to high (100%) to bring water in the cooking equipment piece to temperature as quickly as possible. As the water nears a desired temperature of 87° C., the control knob begins to dial back the gas flow to hit the target exactly. The temperature of the water drops when cold water is then added to the pan, and the control knob responds by increasing the gas flow back to 100%. As the temperature again approaches the desired level the control knob once again reduces the gas flow to the burner to achieve the desired temperature.

Figure 20:
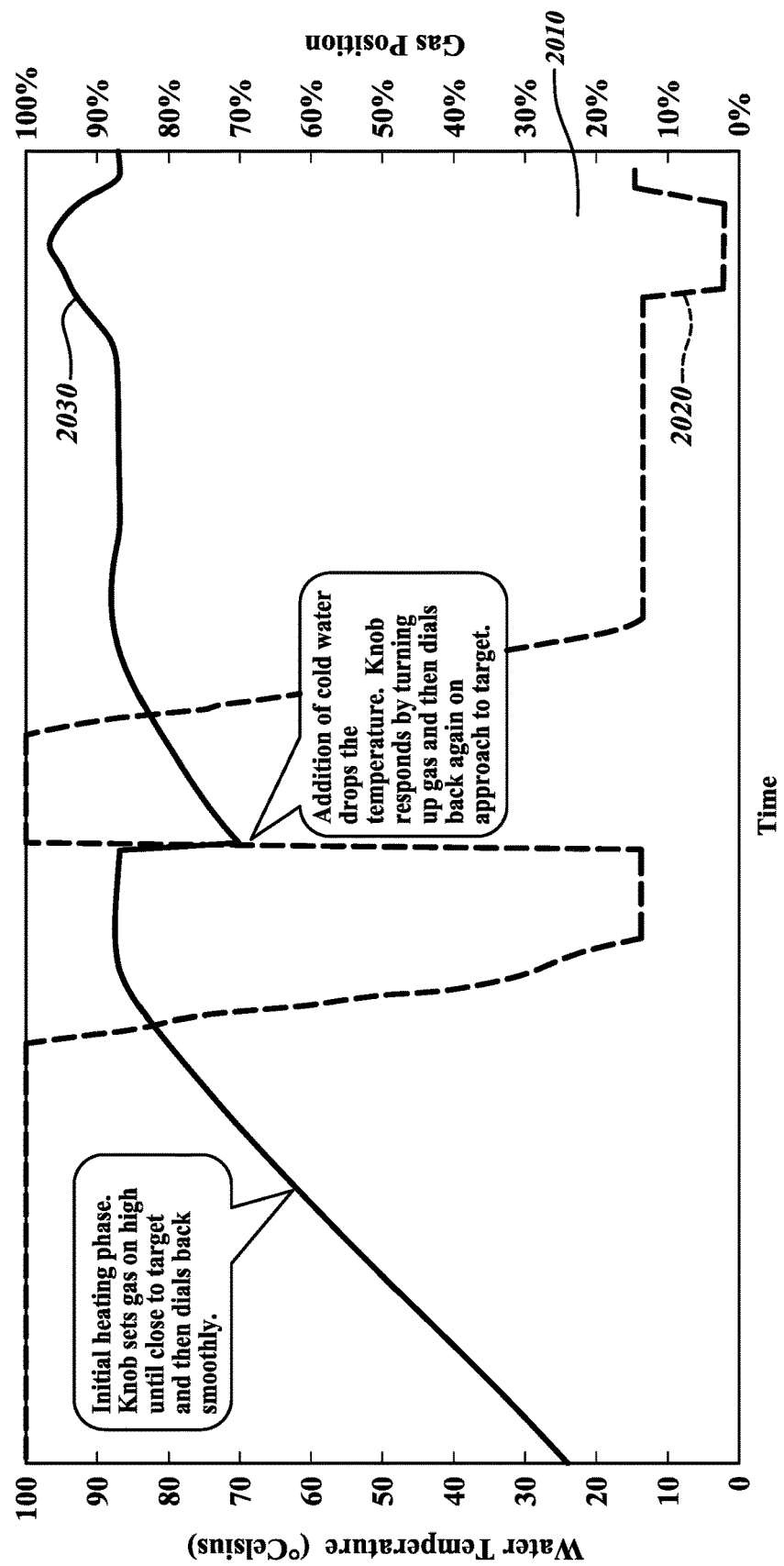
FIG. 20 is an additional graph illustrating further example temperature changes and control device responses during a portion of an example cooking episode.

FIG. 20 continues the example of FIG. 19 for an additional period of time during which additional monitoring and control device responses are performed during a further portion of the example cooking episode. In particular, FIG. 20 illustrates a graph 2010 that includes graph 1910 of FIG. 19 in approximately the left three-fourths of the graph, with approximately the right one-fourth of the graph indicating additional time that has occurred during the cooking episode. In the further example illustrated in graph 2010, after the temperature is stabilized at the desired temperature of 87° C. and the control knob returns to a maintenance level of heat corresponding to approximately 15% of the total capacity, the temperature continues at the stabilized desired temperature of 87° C. for a period of time. However, after that period of time, the temperature begins to rise rapidly without a corresponding increase in the control knob, as shown by the increase 2030 of the temperature line. In this example, the water in the cooking equipment piece has unexpectedly boiled off, leading to the unexpected increase in the temperature. The automated cooking control system determines, based on monitoring of the temperature, that a problem has occurred, such as by determining that the water has likely boiled off. The automated cooking control system performs further automated control of the cooking episode in this example to respond to the determined problem, including to sharply reduce (or turn off) the gas as shown by the decrease 2020 in this example, such as by an automated manipulation of the control knob (e.g., via use of a motor included in the control knob).

While not illustrated in FIG. 20, the automated cooking control system may take other automated actions to respond to a determined problem, whether in addition to or instead of the automated reduction of the heating, such as to provide an alert to a user who is participating in the cooking episode (e.g., via a display of the alert on a GUI displayed on a mobile device of the user and/or on a display mechanism of the control knob). While not illustrated in FIG. 20, the monitoring of the automated cooking control system may further detect and respond to problems that occur when the temperature (and/or other condition being monitored) does not change at a time when it is expected to do so, such as if an attempt was made to automatically change an associated control knob to modify an amount of heating being provided (whether an increase or a decrease in the heating, and with the lack of temperature change indicating, for example, a battery failure or other operation failure of the control knob, corresponding fuel used for heating being depleted, etc.), if a user was instructed to perform an action that should result in a change (e.g., to add contents that would be expected to decrease or increase the temperature of existing contents, such as to reflect a relative difference in temperature of the contents being added and the existing contents, with the lack of temperature change indicating that the user failed to perform the action or performed the action incorrectly), etc. In this manner, the automated cooking control system may detect and determine various types of problems, and take corresponding automated corrective actions in response, as discussed in greater detail elsewhere herein.

FIG. 21 illustrates a mobile computing device 2110 and an example screenshot 2120 of a user interface of the automated cooking control system. In this example, the screenshot includes information to display the current and historical temperature (e.g., during a current cooking episode) of one or more pieces of cooking equipment associated with the mobile device. The illustrated example screenshot further includes additional information about food that is being prepared during the cooking episode (in this example, beef), with user-selectable controls to allow the user to modify the temperature to correspond to different possible completion variations for the food (in this example, "Rare", "Medium Rare", "Medium", "Medium Well", and "Well Done"). As discussed in greater detail elsewhere herein, a variety of other types of user instructions and other information may be further displayed via such a GUI in other embodiments and situations, and information may be displayed to one or more users in manners other than via a mobile device in some embodiments and situations.

FIG. 22 illustrates examples of a display mechanism integrated in a top portion of a smart control knob control device 2210. In particular, in the example of FIG. 22, a circular area surrounding the center of the top of the smart control knob includes a display via which information may be presented. In the examples of FIG. 22, the displayed information includes information 2220 indicating a current temperature and a status toward reaching a desired temperature of a cooking location being controlled (e.g., an oven interior), and includes information 2230 providing instructions to the user to perform an action that is part of a current cooking episode. As discussed in greater detail elsewhere herein, a variety of other types of user instructions and other information may be further displayed via such a GUI in other embodiments and situations, including alerts, temperature of an associated piece of cooking equipment, etc. In addition, while not illustrated in FIG. 22, in some embodiments such a smart control knob may include a touch-sensitive display and/or other input mechanism that allows the user to provide information to the automated cooking control system, such as to set a value for a parameter, indicate that the user has completed an instructed activity, provide instructions to the automated cooking control system via performance of the current cooking episode or of another type, etc. In addition, while not illustrated here, other types of smart cooking equipment may similarly include a display mechanism that is used in a similar manner in some embodiments and situations, including to have such a display mechanism in a smart temperature probe (e.g., on the side and/or on the end opposite the cooking equipment contents being thermally measured).

The various embodiments described herein relate generally to systems, methods, techniques and related cookware devices and components that are particularly well adapted to facilitate cooking activities and include concepts applicable to aftermarket retrofit kits as well as integrated cooking appliances and apparatuses. Embodiments may also include a full-line of cooking equipment, such as, for example, a full line of pots and pans.

Non-exclusive example embodiments of the devices and techniques described herein are further described in the following clauses.

A. A method comprising:

controlling, by one or more humans who manually manipulate one or more control devices that modify heating of one or more pieces of cooking equipment, a manual portion of a cooking episode, wherein the cooking episode involves cooking food with the one or more pieces of cooking equipment, and wherein the manual portion is a subset of the cooking episode and includes making changes to the heating of the one or more pieces of cooking equipment; and controlling, by one or more configured computing devices and based on an automated control recipe for the cooking of the food, one or more automated portions of the cooking episode that are distinct from the manual portion, wherein the one or more automated portions include performing automated manipulations of the one or more control devices that make other changes to the heating of the one or more pieces of cooking equipment to progress the cooking of the food.

B. The method of clause A wherein the manual portion of the cooking episode occurs after at least one of the one or more automated portions and involves the one or more humans taking over control of the cooking episode after initial partial cooking of the food during the at least one automated portion, wherein the initial partial cooking includes one or more automated manipulations by the one or more configured computing devices of the one or more control devices to establish a temperature of at least one of the one or more pieces of cooking equipment, and wherein the manual portion of the cooking episodes includes one or more manual manipulations by the one or more humans of the one or more control devices that change the temperature of the at least one piece of cooking equipment.

C. The method of clause B wherein at least one additional automated portion is performed after the manual portion and involves the one or more configured computing devices completing the cooking of the food, and wherein the at least one additional portion of the cooking episode includes one or more additional automated manipulations by the one or more configured computing devices of the one or more control devices that further change one or more temperatures of the one or more pieces of cooking equipment.

D. The method of clause A wherein the manual portion of the cooking episode involves the one or more humans performing partial cooking of the food and includes one or more manual manipulations by the one or more humans of the one or more control devices to establish one or more temperatures of the one or more pieces of cooking equipment, wherein the one or more automated portions include at least one additional automated portion that is performed after the manual portion and involves the one or more configured computing devices completing the cooking of the food, and wherein the at least one additional portion of the cooking episode includes one or more automated manipulations by the one or more configured computing devices of the one or more control devices that change at least one of the one or more temperatures of the one or more pieces of cooking equipment.

E. The method of clause A wherein the manual portion of the cooking episode consists of one or more manual manipulations by the one or more humans of the one or more control devices to initiate operation of a heat source that is used to perform the heating of the one or more pieces of cooking equipment, to begin the heating of the one or more pieces of cooking equipment, and wherein the one or more automated portions of the cooking episode include the one or more configured computing devices performing automated manipulations of the one or more control devices to make all other changes to the heating of the one or more pieces of cooking equipment until the cooking of the food is complete, by modifications to the operation of the heat source.

F. A method comprising:
determining, by one or more configured computing devices, heating performance for one or more pieces of cooking equipment in response to manipulations of one or more control devices that modify heating; and
controlling, by the one or more configured computing devices and based at least in part on the determined heating performance for the one or more pieces of cooking equipment, a cooking episode that involves cooking food with the one or more pieces of cooking equipment over a period of time, wherein the controlling includes using an automated control recipe for the cooking of the food to direct multiple automated manipulations of the one or more control devices that make multiple changes to one or more temperatures of the one or more pieces of cooking equipment over the period of time.

G. The method of clause F wherein the determining of the heating performance for the one or more pieces of cooking equipment includes performing manipulations to the one or more control devices, and monitoring amounts of change in temperatures of the one or more pieces of cooking equipment, in response to amounts of change to the one or more control devices from the manipulations.

H. The method of clause F wherein the determining of the heating performance for the one or more pieces of cooking equipment includes performing manipulations to the one or more control devices, and monitoring changing amounts of heat that are generated by a heat source used for heating the one or more pieces of cooking equipment, in response to amounts of change to the one or more control devices from the manipulations.

I. A method comprising:
calibrating, by one or more configured computing devices, a control device that manipulates heat generated for cooking and that has a plurality of settings each corresponding to a distinct amount of generated heat, wherein the calibrating includes gathering information about multiple settings of the plurality that include an off setting corresponding to no heat being generated and a maximum setting corresponding to a maximum amount of heat being generated; and
controlling, by the one or more configured computing devices and based at least in part on the calibrating, a cooking episode that involves cooking food with one or more pieces of cooking equipment being heated via the control device, wherein the controlling includes performing automated manipulations of the control device that make changes to one or more temperatures of the one or more pieces of cooking equipment.

J. The method of clause I wherein the control device is a smart knob that has a plurality of positions corresponding to the plurality of settings and that has a location detection mechanism able to determine which of the plurality of positions that the control device is in, and wherein the calibrating of the control device includes:
displaying a prompt to a user to place the control device in the off setting, and using the location detection mechanism to record a corresponding off position of the control device; and displaying another prompt to the user to place the control device in the maximum setting, and using the location detection mechanism to record a corresponding maximum position of the control device.

K. The method of clause J wherein the smart knob further has a motor able to move the smart knob into each of the plurality of positions, and wherein the calibrating of the control device further includes using the motor to move the smart knob into each of multiple additional positions of the plurality of positions and recording corresponding responses, wherein the corresponding responses include at least one of changes to an amount of heat being generated or changes to one or more temperatures of the one or more pieces of cooking equipment.

L. A method comprising:
calibrating, by one or more configured computing devices, a piece of cooking equipment being heated using a control device that manipulates heat being generated and that has a plurality of positions each corresponding to a distinct amount of generated heat, wherein the calibrating includes using a motor to move the control device into each of multiple positions of the plurality and recording corresponding responses, wherein the corresponding responses include at least one of changes to an amount of heat being generated or changes to one or more temperatures of one or more pieces of cooking equipment; and
controlling, by the one or more configured computing devices and based at least in part on the calibrating, a cooking episode that involves cooking food based on using the control device to heat the one or more pieces of cooking equipment, wherein the controlling includes performing automated manipulations of the control device.

M. The method of clause L wherein the control device is a smart knob that includes the motor, and wherein the calibrating of the control device includes monitoring the changes to the one or more temperatures of one or more pieces of cooking equipment to determine the corresponding responses.

N. A method comprising:

controlling, by one or more configured computing devices, a cooking episode that involves cooking food with one or more pieces of cooking equipment over a period of time, wherein the controlling includes using an automated control recipe for the cooking of the food to direct multiple automated manipulations of one or more control devices that make multiple changes to one or more temperatures of the one or more pieces of cooking equipment over the period of time;

determining, by the one or more configured computing devices and based on monitoring the cooking episode, a problem that occurs during the period of time before the cooking of the food is complete; and in response to the determining and before the cooking of the food is complete, performing, by the one or more configured computing devices, one or more activities to resolve the determined problem.

O. The method of clause N wherein the monitoring of the cooking episode includes monitoring the temperatures of the one or more pieces of cooking equipment and detecting an increase in a temperature of at least one of the one or more pieces of cooking equipment that exceeds a threshold and that does not correspond to any of the multiple automated manipulations of one or more control devices.

P. The method of clause O wherein the determining of the problem includes determining that the detected increase in the temperature is caused by water in the at least one piece of cooking equipment having boiled off.

Q. The method of clause P wherein the determining of the problem includes determining that the detected increase in the temperature is not caused by any manual manipulations by any users of the one or more control devices.

R. The method of clause P wherein the performing of the one or more activities to resolve the determined problem includes performing one or more additional automated manipulations of the one or more control devices to reduce the temperature of the at least one piece of cooking equipment.

S. The method of clause P wherein the performing of the one or more activities to resolve the determined problem includes performing one or more additional automated manipulations of the one or more control devices to turn off a source of heating of the at least one piece of cooking equipment.

T. The method of clause P wherein the performing of the one or more activities to resolve the determined problem includes sending one or more electronic notifications to one or more mobile devices of one of more users participating in the cooking episode.

U. The method of clause N wherein the monitoring of the cooking episode includes monitoring a wireless connection between a mobile device of a user participating in the cooking episode and at least one of the one or more pieces of cooking equipment or the one or more control devices, and detecting that the wireless connection has ended.

V. The method of clause U wherein the determining of the problem includes determining that the mobile device of the user has moved outside of a range in which the wireless connection is able to be maintained, and wherein the performing of the one or more activities to resolve the determined problem includes performing one or more additional automated manipulations of the one or more control devices to reduce heating of the at least one piece of cooking equipment.

W. The method of clause N wherein the controlling of the cooking episode includes providing instructions to a user to add indicated food to at least one of the pieces of cooking equipment at an indicated time during the cooking episode, and wherein the monitoring of the cooking episode includes monitoring the temperature of the at least one piece of cooking equipment and detecting a lack of expected decrease in the temperature of the at least one piece of cooking equipment corresponding to the indicated food being added to the at least one piece of cooking equipment.

X. The method of clause N wherein the performing of the one or more activities to resolve the determined problem includes performing one or more additional automated manipulations of the one or more control devices to reduce the temperature of the at least one piece of cooking equipment.

Y. The method of clause N wherein the performing of the one or more activities to resolve the determined problem includes performing one or more additional automated manipulations of the one or more control devices to turn off a source of heating of the at least one piece of cooking equipment.

Z. The method of clause N wherein the performing of the one or more activities to resolve the determined problem includes sending one or more electronic notifications to one or more mobile devices of one of more users participating in the cooking episode.

A1. The method of clause N wherein the monitoring of the cooking episode includes monitoring the temperatures of the one or more pieces of cooking equipment, and wherein the determining of the problem includes detecting that, in response to at least one of the multiple automated manipulations that is expected to cause at least one corresponding change in temperature of at least one of the one or more pieces of cooking equipment, the at least one corresponding change in temperature does not occur within a defined threshold of time.

A2. The method of clause N wherein at least one of the one or more control devices manipulates an amount of flammable gas that is supplied to a heating element designed to burn the flammable gas, wherein the monitoring of the cooking episode includes determining that flammable gas is being supplied to the heating element while the supplied flammable gas is not being burned by the heating element, and wherein the multiple automated manipulations include turning off supply of the flammable gas to the heating element.

A3. A method comprising:

receiving, by one or more configured computing devices, information regarding a user initiating use of a control device that modifies heating to one or more locations in which one or more pieces of cooking equipment may be used to cook food during a cooking episode;

determining, by the one or more configured computing devices, a problem that indicates that the user is not authorized to use the control device; and inhibiting, by the one or more configured computing devices and in response to the determining, the use of the control device by the user.

A4. The method of clause A3 further comprising, before the receiving of the information, initiating a wireless connection between a mobile device of an authorized user and at least one of the one or more pieces of cooking equipment or the control device, and wherein the determining of the problem includes determining that the wireless connection is not available at a time of the receiving of the information.

A5. The method of clause A3 further comprising, before the receiving of the information, configuring security information for use of the control device, and wherein the determining of the problem includes determining that the security information is not provided at a time of the receiving of the information.

A6. The method of clause A5 further comprising, before the receiving of the information, initiating a wireless connection with a mobile device of the user, and wherein the receiving of the information includes receiving instructions sent by the user via the wireless connection.

A7. The method of clause A5 wherein the control device is located at a first geographical location, and wherein the receiving of the information includes receiving instructions sent by the user over one or more computer networks from a remote second geographical location.

A8. The method of clause A3 wherein the control device is a smart knob that has a plurality of positions and that has a location detection mechanism able to determine which of the plurality of positions that the control device is in, and wherein the receiving of the information includes using the location detection mechanism to determine that the user has moved the control device.

A9. The method of clause A3 wherein the control device has a plurality of positions including an off position and has a motor able to move the control device into each of the plurality of positions, and wherein the inhibiting of the use of the control device includes using the motor to perform at least one of moving the control device into the off position or of preventing the control device from being moved from the off position.

A10. A method comprising:
controlling, by one or more configured computing devices, a cooking episode that involves cooking food by using an automated control recipe for the cooking of the food to direct multiple automated manipulations of a smart knob device that manipulates heat provided to a piece of cooking equipment, wherein the smart knob device has a motor able to move the smart knob device into each of a plurality of positions and has a display mechanism integrated as part of the smart knob device; and
providing, by the one or more configured computing devices and during the controlling of the cooking episode, information regarding the cooking episode to the display mechanism for display to a user participating in the cooking episode.

A11. The method of clause A10 wherein the providing of the information includes displaying instructions to the user on the display mechanism regarding one or more interactions for the user to perform with the piece of cooking equipment.

A12. The method of clause A10 wherein the providing of the information includes displaying information to the user on the display mechanism regarding a current temperature of the piece of cooking equipment.

A13. The method of clause A10 wherein the providing of the information includes displaying changing information to the user on the display mechanism regarding a status of performing a current step of the cooking episode.

A14. The method of clause A10 wherein the providing of the information includes displaying an alert to the user on the display mechanism regarding a problem detected during the cooking episode.

A15. The method of clause A10 wherein the smart knob device further includes a wireless transceiver, and wherein the providing of the information includes wirelessly transmitting information to the wireless transceiver from a mobile device of a user who is participating in the cooking episode.

A16. The method of any of clauses A-Z or any of clauses A1-A15 wherein the configured one or more computing devices include a smart cooking knob that manipulates heat provided to a cooking location and that includes a motor able to move the smart cooking knob into each of a plurality of positions corresponding to different amounts of provided heat.

A17. The method of any of clauses A-Z or any of clauses A1-A15 wherein the configured one or more computing devices include a smart cooking knob that manipulates heat provided to a piece of cooking equipment and that includes a motor able to move the smart cooking knob into each of a plurality of positions corresponding to different amounts of provided heat.

A18. The method of any of clauses A-Z or any of clauses A1-A15 wherein the configured one or more computing devices include a mobile device of a user that performs wireless interactions with at least one control device to cause heat provided to at least one of a cooking location or a piece of cooking equipment to be manipulated, and wherein the at least one control device includes a motor able to move the at least one control device into each of a plurality of positions corresponding to different amounts of provided heat.

A19. The method of any of clauses A-Z or any of clauses A1-A15 wherein the piece of cooking equipment includes a temperature sensor and a wireless transmitter to send temperatures from the temperature sensor to the configured one or more computing devices.

A20. The method of clause A19 wherein the piece of cooking equipment is at least one of a pan or a pot.

A21. The method of clause A19 wherein the piece of cooking equipment is a temperature probe designed to attach to another piece of cooking equipment.

A22. The method of any of clauses A-Z or any of clauses A1-A15 further comprising using an automated control recipe to direct multiple changes in temperature of the piece of cooking equipment during the cooking episode.

A23. The method of clause A22 further comprising performing multiple interactions with a user during the cooking episode as directed by the automated control recipe.

AA1. A configured system comprising:
one or more hardware processors; and
one or more memories with software instructions that, when executed, cause at least one of the one or more hardware processors to perform some or all of the method of any of clauses A-Z or any of clauses A1-A23, wherein the some or all of the method includes all actions of the method that are performed in the method by one or more configured computing devices.

AA2. The configured system of clause AA1 wherein the configured system includes the one or more configured computing devices.

AA3. The configured system of clause AA1 wherein the one or more configured computing devices are one or more smart devices.

BB1. A non-transitory computer-readable medium having stored contents that, when executed, configure at least one computing device to perform some or all of the method of any of clauses A-Z or any of clauses A1-A23, wherein the some or all of the method includes all actions of the method that are performed in the method by one or more configured computing devices, and wherein the configured at least one computing device is at least one of the one or more configured computing devices.

BB2. A non-transitory computer-readable medium having stored contents that, when executed, configure a smart device to perform the method of any of clauses A-Z or any of clauses A1-A23, wherein the some or all of the method includes all actions of the method that are performed in the method by one or more configured computing devices, and wherein the configured smart device is one of the one or more configured computing devices.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

Aspects of the various embodiments described above can be combined to provide further embodiments. In addition, the teachings of Provisional Patent Application No. 62/039,262, filed Aug. 19, 2014, and U.S. Provisional Patent Application No. 62/143,655, filed Apr. 6, 2015, are incorporated herein by reference in their entirety. Aspects of the embodiments can be modified, if necessary to employ aspects or concepts of the applications to provide yet further embodiments.

What is claimed is:

1. A food preparation system comprising:
   an implement having at least one temperature sensor integrated therein to sense temperature information indicative of a temperature of a food item during a cooking episode and having a wireless communication module to transmit the temperature information from the implement;
   a control knob for adjusting a characteristic of a cooking environment in a vicinity of the implement during the cooking episode, the control knob being controllably adjustable via a drive motor contained within the control knob while also remaining manually adjustable by a user, the control knob including a base assembly fixedly secured to a cooking apparatus and further including a cover rotatably supported by the base assembly, the control knob further including a rotatable drive shaft contained within the control knob, the rotatable drive shaft being coupled to each of the drive motor, a shaft of a heat source adjustment assembly of the cooking apparatus, and the cover; and
   a cooking control system configured to receive the temperature information from the implement and to provide cooking adjustment information for adjusting the control knob during the cooking episode based at least in part on the received temperature information, wherein the drive motor and the rotatable drive shaft enable, during operation, selective rotation of the shaft of the heat source adjustment assembly in response to the cooking adjustment information provided by the cooking control system during the cooking episode.

2. The food preparation system of claim 1 wherein the control knob includes a display unit for communicating information to a user to facilitate manual adjustment of the control knob during the cooking episode.

3. The food preparation system of claim 1 wherein the control knob further comprises a position sensor communicatively coupled to the cooking control system to communicate data indicative of a position of the control knob upon manual adjustment thereof.

4. The food preparation system of claim 1, further comprising:
   a camera positioned to observe and communicate information to the cooking control system, and wherein the cooking adjustment information is based at least in part on said information.

5. The food preparation system of claim 1, further comprising:
   a supplemental sensor integrated into the implement to sense supplemental non-temperature information associated with the food item and communicate said supplemental non-temperature information to the cooking control system.

6. The food preparation system of claim 5 wherein the supplemental sensor comprises one of the following:
   a moisture sensor to sense moisture characteristics of the food item; a color sensor to sense a color of the food item; and a chemical sensor to sense acidity, alkalinity and/or other properties related to flavor of the food item.

7. The food preparation system of claim 1 wherein the control knob further comprise a printed circuit board assembly and a power source concealed therein to implement at least some aspects of the cooking control system.

8. The food preparation system of claim 1 wherein the control knob further includes a wireless communication module concealed therein to receive the temperature information from the implement for controllably adjusting a rotational position of the control knob.

9. The food preparation system of claim 1 wherein the control knob includes a drive gear for rotating the rotatable drive shaft, and wherein the control knob remains manually adjustable by a user while the drive motor of the control knob is engaged with the drive gear.

10. The food preparation system of claim 1 wherein the implement is a piece of cooking equipment comprising:
    a base defining at least a portion of a receptacle to receive the food item, the at least one temperature sensor being integrated into the base to sense the temperature information indicative of the temperature of the food item during the cooking episode; and
    a handle for manipulating the piece of cooking equipment in the cooking environment, the wireless communication module being located in the handle.

11. The food preparation system of claim 10,
    wherein the base of the piece of cooking equipment includes a base passage that extends between a first location underlying a cooking surface thereof and a second location at or near a periphery of the receptacle,
    wherein the handle includes a handle passage in communication with the base passage of the base,
    wherein the at least one temperature sensor is a thermocouple having a lead end positioned at the first location and an intermediate portion that extends through the base passage and the handle passage to a cold junction located near the wireless communication module, and
    wherein the thermocouple is communicatively coupled to the wireless communication module to enable temperature information sensed by the thermocouple to be transmitted from the piece of cooking equipment by the wireless communication module.

12. The food preparation system of claim 1 wherein the implement is a temperature probe including a handle and an elongated probe member extending from the handle, and wherein a wireless communication module is sealed within the handle along with a power source.

13. A control knob operable with a cooking control system to prepare a food item during a cooking episode, the control knob comprising:
a base assembly fixedly secured to a cooking apparatus;
a cover rotatably supported by the base assembly;
a rotatable drive shaft contained within the control knob and coupled to the cover, the drive shaft being configured to interface with a shaft of a heat source adjustment assembly of the cooking apparatus; and
a drive motor contained within the control knob and operatively coupled to the drive shaft to enable, during operation, selective rotation of the shaft of the heat source adjustment assembly in response to cooking adjustment information provided by the cooking control system in response to temperature information received by the cooking control system.

14. The control knob of claim 13 wherein the drive shaft is rotatable relative to the base assembly via the drive motor to enable controlled rotation of the shaft of the heat source adjustment assembly.

15. The control knob of claim 13, further comprising:
a display unit configured to display the cooking adjustment information provided by the cooking control system during the cooking episode.

16. The control knob of claim 13, further comprising:
an audio input device configured to receive audio signals for adjusting the control knob in response to cooking adjustment information provided by the cooking control system during the cooking episode.

17. The control knob of claim 13, further comprising:
an audio output device configured to output an audible signal containing cooking adjustment information provided by the cooking control system during the cooking episode.

18. The control knob of claim 13 wherein the drive shaft is manually adjustable about a rotation axis by a user in response to cooking adjustment information provided by the cooking control system during the cooking episode by manipulating the cover relative to the base assembly.

19. The control knob of claim 13, further comprising: a position sensor concealed within control knob for sensing and tracking a rotational position of the cover upon manual adjustment of the control knob by a user.

20. The control knob of claim 13, further comprising:
a printed circuit board assembly and a power source concealed within the control knob to implement at least some aspects of the cooking control system.

21. The control knob of claim 13, further comprising:
a wireless communication module concealed within the control knob for receiving information from which to adjust a rotational position of the cover.

22. The control knob of claim 13 wherein the drive motor is operatively coupled to the drive shaft via a drive gear, and wherein the cover of the control knob is manually adjustable by a user while the drive motor is engaged with the drive gear.

23. A kit to assist in the preparation of food items during one or more cooking episodes, the kit comprising:
the control knob of claim 13; and
one or more couplers removably coupleable to the drive shaft, each coupler being configured to interface with a shaft of a heat source adjustment assembly of a different respective cooking apparatus for coupling the control knob to one of a variety of different cooking apparatuses.

24. The kit of claim 23, further comprising:
a temperature probe including a handle and an elongated probe member extending from the handle, and further including a wireless communication module and a power source sealed within the handle for transmitting temperature information from the temperature probe to the control knob.

25. The kit of claim 24, further comprising:
a probe mounting device, the probe mounting device including a body defining an aperture sized to receive the elongated probe member extending from the handle of the temperature probe and including opposing arm members rotationally biased to, in conjunction with the body, clamp the temperature probe to a piece of cooking equipment.

26. The food preparation system of claim 1, wherein the implement is a piece of cooking equipment or a temperature probe.

* * * * *